(12) United States Patent
Dumas et al.

(10) Patent No.: US 12,355,942 B2
(45) Date of Patent: Jul. 8, 2025

(54) ADAPTING THE TRANSFORM PROCESS TO NEURAL NETWORK-BASED INTRA PREDICTION MODE

(71) Applicant: INTERDIGITAL CE PATENT HOLDINGS, SAS, Paris (FR)

(72) Inventors: Thierry Dumas, Rennes (FR); Franck Galpin, Thorigne-Fouillard (FR); Philippe Bordes, Laille (FR); Fabrice Le Leannec, Betton (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 180 days.

(21) Appl. No.: 18/011,184

(22) PCT Filed: Jun. 8, 2021

(86) PCT No.: PCT/EP2021/065209
§ 371 (c)(1),
(2) Date: Dec. 18, 2022

(87) PCT Pub. No.: WO2021/254812
PCT Pub. Date: Dec. 23, 2021

(65) Prior Publication Data
US 2023/0224454 A1     Jul. 13, 2023

(30) Foreign Application Priority Data

Jun. 18, 2020  (EP) .................................... 20305668
Sep. 30, 2020  (EP) .................................... 20306137
Mar. 26, 2021  (EP) .................................... 21305378

(51) Int. Cl.
*H04N 19/105*    (2014.01)
*H04N 19/12*     (2014.01)
(Continued)

(52) U.S. Cl.
CPC ........... *H04N 19/105* (2014.11); *H04N 19/12* (2014.11); *H04N 19/176* (2014.11); *H04N 19/593* (2014.11)

(58) Field of Classification Search
CPC .. H04N 19/176; H04N 19/105; H04N 19/159; H04N 19/132; H04N 19/70;
(Continued)

(56) References Cited

U.S. PATENT DOCUMENTS

2020/0186808 A1* 6/2020 Joshi .................... H04N 19/159
2020/0389661 A1* 12/2020 Zhao .................... H04N 19/134
(Continued)

FOREIGN PATENT DOCUMENTS

EP          3310058 A1    4/2018

OTHER PUBLICATIONS

Dumas et al., "Iterative Training of Neural Networks for Intra Prediction", Institute of Electrical and Electronics Engineers (IEEE), IEEE Transactions on Image Processing, vol. 30, Nov. 23, 2020, 15 pages.
(Continued)

*Primary Examiner* — Nathnael Aynalem
(74) *Attorney, Agent, or Firm* — Condo Roccia Koptiw LLP

(57) ABSTRACT

At least a method and an apparatus are presented for efficiently encoding or decoding video. For example, an intra prediction of an image block using at least one neural network from a context comprising pixels surrounding the image block is determined and an information relative to a transform method to apply for decoding the image block is also determined. The transform method is adapted to the neural network intra prediction mode of the block to encode or decode. The information relative to the transform method is inferred from the at least one neural network used in intra
(Continued)

prediction of the image block at the encoding and either signaled or also inferred at the decoding.

24 Claims, 29 Drawing Sheets

(51) Int. Cl.
*H04N 19/176* (2014.01)
*H04N 19/593* (2014.01)

(58) Field of Classification Search
CPC ........ H04N 19/12; H04N 19/11; H04N 19/18; H04N 19/61; H04N 19/186; H04N 19/119; H04N 19/46; H04N 19/593; H04N 19/124; H04N 19/13; H04N 19/184; H04N 19/82; H04N 19/91; H04N 19/96; H04N 19/129; H04N 19/174; H04N 19/59; H04N 19/60; H04N 19/107; H04N 19/136; H04N 19/172; H04N 19/42; H04N 19/573; H04N 19/85; H04N 19/117; H04N 19/167; H04N 19/134; H04N 19/147; H04N 19/177; H04N 19/187; H04N 19/196; H04N 19/40; H04N 19/463; H04N 19/48; H04N 19/51; H04N 19/80; H04N 19/625; H04N 19/62; H04N 19/649; H04N 19/63
USPC ............................................. 375/240–240.29
See application file for complete search history.

(56) References Cited

U.S. PATENT DOCUMENTS

2020/0396455 A1* 12/2020 Liu ..................... H04N 19/70
2022/0070482 A1*  3/2022 Kang .................. H04N 19/159
2022/0201316 A1*  6/2022 Coelho ................ H04N 19/19

OTHER PUBLICATIONS

Pfaff et al., "Intra prediction Modes based on Neural Networks", Joint Video Experts Team (JVET) of ITU-T SG 16 WP 3 and ISO/IEC JTC 1/SC 29/WG 11, Document: JVET-J0037-v1, 10th Meeting: San Diego, California, USA, Apr. 10, 2018, 14 pages.

Dumas et al., "Context-Adaptive Neural Network-Based Prediction for Image Compression", Institute of Electrical and Electronics Engineers (IEEE), IEEE Transactions on Image Processing, vol. 29, Aug. 16, 2019, 16 pages.

Dumas et al., "AHG11: Neural Network-based intra prediction with transform selection in VVC", Joint Video Experts Team (JVET) of ITU-T SG 16 WP 3 and ISO/IEC JTC 1/SC 29, Document: JVET-T0073, 20th Meeting, Oct. 7, 2020, teleconference, 11 pages.

Anonymous, "Reference software for ITU-T H.265 high efficiency video coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.265.2, Oct. 2014, 12 pages.

Anonymous, "Series H: Audiovisual and Multimedia Systems, Infrastructure of audiovisual services—Coding of moving video—Information Technology—Generic coding of moving pictures and associated audio information: Video", International Telecommunication Union, ITU-T Telecommunication Standardization Sector of ITU, Recommendation ITU-T H.262, Feb. 2000, 220 pages.

Li et al., "Fully-Connected Network-Based Intra Prediction for Image Coding", Institute of Electrical and Electronics Engineers (IEEE), IEEE Transactions on Image Processing, vol. 27, No. 7, Jul. 2018, 12 pages.

Bross et al, "Versatile video coding (draft 9)", Joint Video Experts Team (JVET) of ITU-T SG 16 WP 3 and ISO/IEC JTC 1/SC 29/WG 11, Document: JVET-R2001-vA, 18th Meeting, by teleconference, Apr. 15, 2020, 524 pages.

Pfaff et al., "Neural Network based intra prediction for video coding", International Society for Optics and Photonics (SPIE), SPIE Proceedings, vol. 10752, Applications of Digital Image Processing XLI, 1075213, Sep. 17, 2018, 7 pages.

Anonymous, "Transmission of Non-Telephone Signals: Information Technology—Generic Coding of Moving Pictures and Associated Audio Information: Systems", International Telecommunication Union, ITU-T Telecommunication Standardization Sector of ITU, Recommendation ITU-T H.222.0, Jul. 1995, 135 pages.

Pfaff et al., "Intra Prediction Modes based on Neural Networks", Joint Video Experts Team (JVET) of ITU-T SG 16 WP 3 and ISO/IEC JTC 1/SC 29, Fraunhofer Heinreich Hertz Institute, Document: JVET0037-v2, 10th Meeting, San Diego, California, USA, Apr. 13, 2018, 19 pages.

* cited by examiner heightCb: Height of the Luminance CB
widthCb: Width of the Luminance CB
heightTb: Height of the TBs of the Luminance CB
widthTb: Width of the TBs of the Luminance CB ispCond = ispMode != 0 && (heightTb < 4 || widthTb < 4)

mipCond = mipFlag != 0 && (heightCb < 16 || widthCb < 16)

dimCond = (heightLumaCb > maxTbSize || widthLumaCb > maxTbSize)
 || (isSepTree && isChroma && (heightCb < 4 || widthCb < 4))

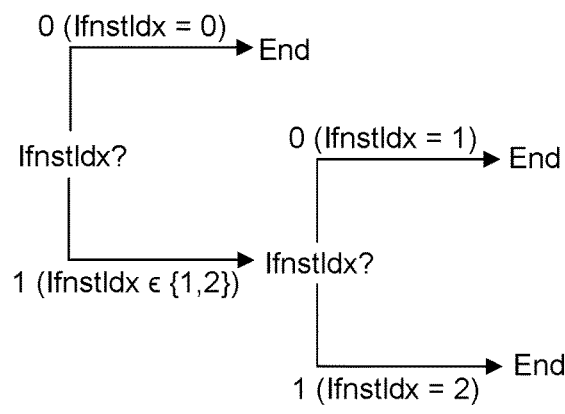
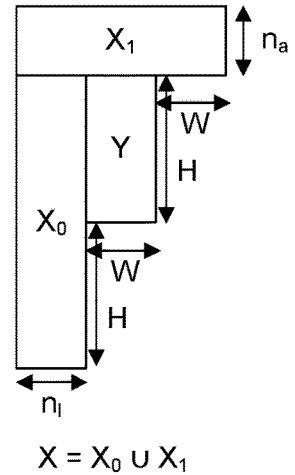
Figure 5
Figure 6
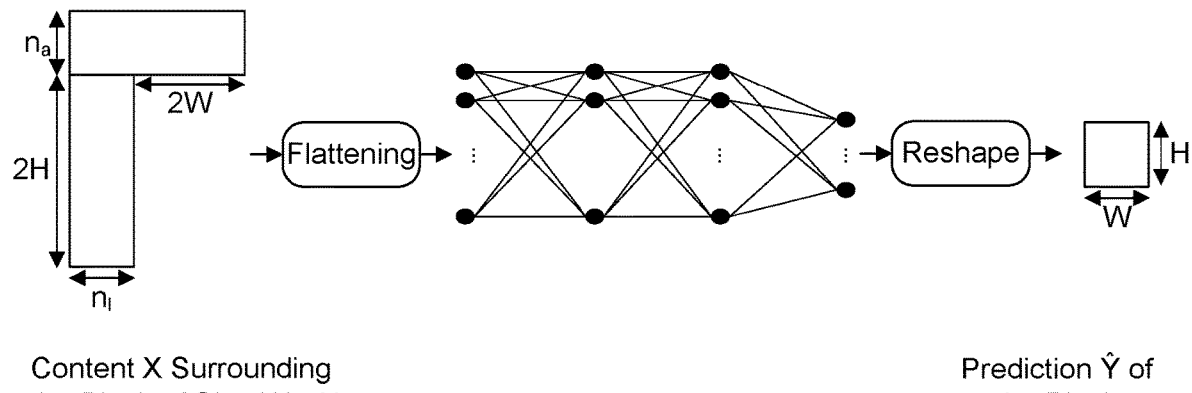
Content X Surrounding
the Block of Size W × H
Prediction Ŷ of
the Block
— Connection in the Fully-connected Layer
Figure 7

NN Mode:

trIdx ∈ {0, n − 1}
Signaled in the Bitstream

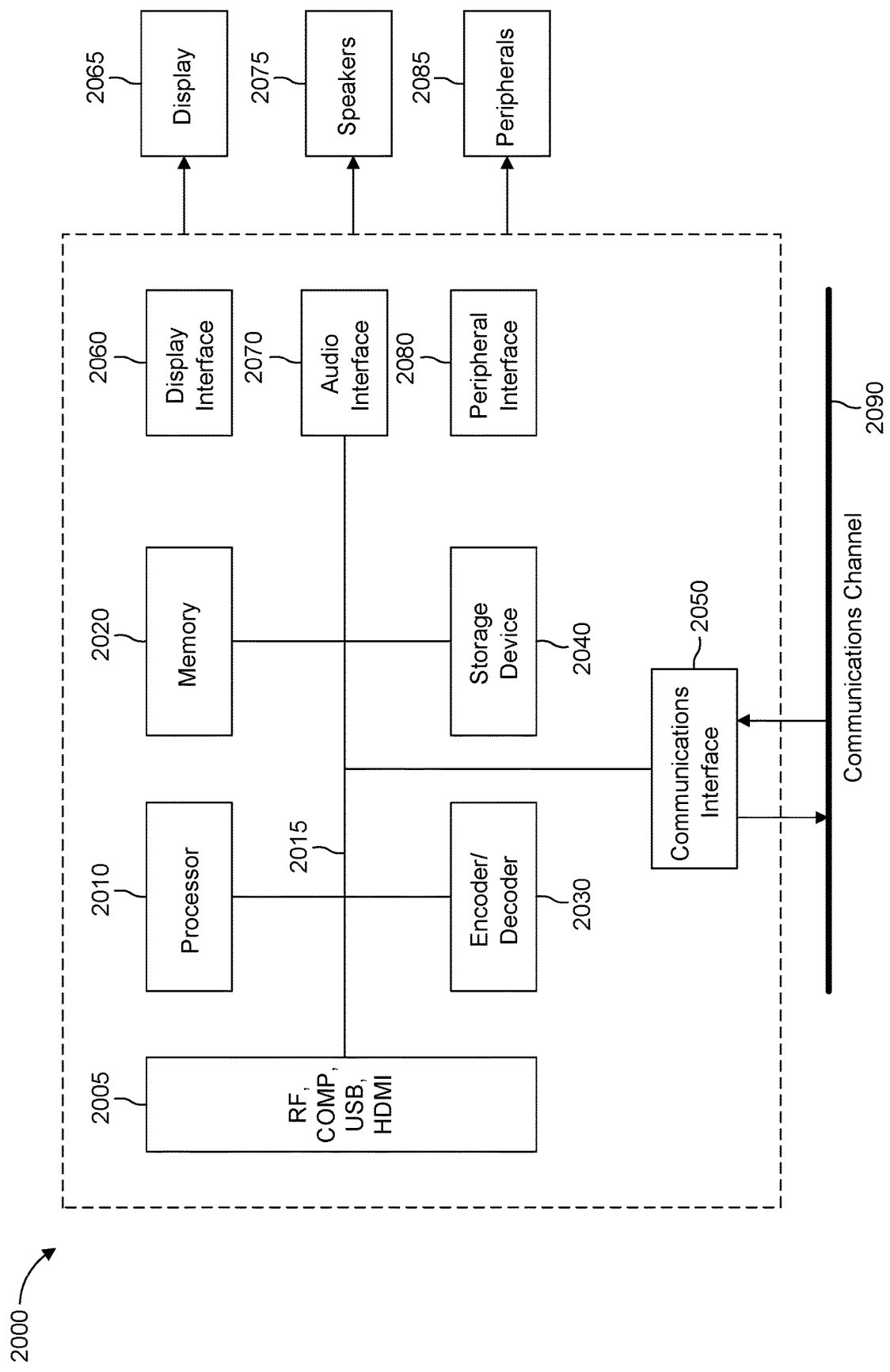

ADAPTING THE TRANSFORM PROCESS TO NEURAL NETWORK-BASED INTRA PREDICTION MODE

CROSS REFERENCE TO RELATED APPLICATIONS

This application is a U.S. National Stage Application under 35 U.S.C. 371 of International Patent Application No. PCT/EP2021/065209, filed Jun. 8, 2021, which is incorporated herein by reference in its entirety.

This application claims the benefit of European Patent Application Nos. 20305668.4, filed Jun. 18, 2020; 20306137.9, filed Sep. 30, 2020; and 21305378.8, filed Mar. 26, 2021.

TECHNICAL FIELD

At least one of the present embodiments generally relates to a method or an apparatus for video encoding or decoding, and more particularly, to a method or an apparatus featuring a new information being representative of at least a transform to be applied to the residue of an image block when this block is predicted by a neural network-based intra prediction mode.

BACKGROUND

To achieve high compression efficiency, image and video coding schemes usually employ prediction, including motion vector prediction, and transform to leverage spatial and temporal redundancy in the video content. Generally, intra or inter prediction is used to exploit the intra or inter frame correlations, then the difference between an original image block and its prediction, often denoted as prediction error or prediction residual, is transformed, quantized, and entropy coded. To reconstruct the video, the compressed data are decoded by inverse processes corresponding to the entropy coding, quantization, transform, and prediction.

Recent additions to video compression technology include various industry standards, versions of the reference software and/or documentations such as Joint Exploration Model (JEM) and later VTM (Versatile Video Coding (VVC) Test Model) being developed by the JVET (Joint Video Exploration Team) group. The aim is to make further improvements to the existing HEVC (High Efficiency Video Coding) standard.

Existing methods for coding and decoding show some limitations in the choice of the one or more transform(s) to apply to the residue of an image block, for example when this block is predicted by a neural network-based intra prediction mode. Therefore, there is a need to improve the state of the art.

SUMMARY

The drawbacks and disadvantages of the prior art are solved and addressed by the general aspects described herein.

According to a first aspect, there is provided a method. The method comprises video decoding by determining an intra prediction of an image block using at least one neural network from a context comprising pixels surrounding the image block; obtaining an information relative to a transform method to apply for decoding the image block, the transform method being adapted to a neural network-based intra prediction mode; obtaining a block of residue of the image block by applying at least one inverse transform to a block of transform coefficients according to the information relative to the transform method; and decoding the image block based on the intra prediction and the block of residue.

According to another aspect, there is provided a second method. The method comprises video encoding by determining an intra prediction of the image block using at least one neural network from a context comprising pixels surrounding the image block; obtaining an information relative to a transform method to apply for encoding the image block, said transform method being adapted to a neural network-based intra prediction mode; obtaining a block of residue from the image block and said intra prediction; obtaining a block of transform coefficients by applying at least one transform to the block of residue according to the information relative to the transform method; and encoding the block of transform coefficients.

According to another aspect, there is provided an apparatus. The apparatus comprises one or more processors, wherein the one or more processors are configured to implement the method for video decoding according to any of its variants. According to another aspect, the apparatus for video decoding comprises means for determining an intra prediction of an image block using at least one neural network from a context comprising pixels surrounding the image block; means for obtaining an information relative to a transform method to apply for decoding the image block, the transform method being adapted to a neural network-based intra prediction mode; means for obtaining a block of residue of the image block by applying at least one inverse transform to a block of transform coefficients according to the information relative to the transform method; and means for decoding the image block based on the intra prediction and the block of residue.

According to another aspect, there is provided another apparatus. The apparatus comprises one or more processors, wherein the one or more processors are configured to implement the method for video encoding according to any of its variants. According to another aspect, the apparatus for video encoding comprises means for determining an intra prediction of the image block using at least one neural network from a context comprising pixels surrounding the image block; means for obtaining an information relative to a transform method to apply for encoding the image block, said transform method being adapted to a neural network-based intra prediction mode; means for obtaining a block of residue from the image block and said intra prediction; means for obtaining a block of transform coefficients by applying at least one transform to the block of residue according to the information relative to the transform method; and means for encoding the block of transform coefficients.

According to another general aspect of at least one embodiment, the information is inferred by the at least one neural network used in intra prediction of the image block from a context comprising pixels surrounding said image block.

According to another general aspect of at least one embodiment, the information relative to a transform method is decoded/encoded in a bitstream.

According to another general aspect of at least one embodiment, the information comprises a transform group index (trGrpIdx) representative of a mapping between a neural network intra prediction mode and a group of transforms among a plurality of groups of transforms.

According to another general aspect of at least one embodiment, the information comprises a transform index (trIdx) representative of a mapping between a neural network intra prediction mode and a transform among a plurality of transforms.

According to another general aspect of at least one embodiment, the information comprises a transform macro group index (trMacroGrpIdx) representative of a mapping between a neural network intra prediction mode and a hierarchical group of transforms.

According to another general aspect of at least one embodiment, one neural network inferring the information relative to a transform method to apply for encoding the image block (or decoding the image block) further comprises one or more output data being any of a scalar, a vector, a tensor from which at least one of a transform group index (trGrpIdx), a transform index (trIdx), a transform macro group index (trMacroGrpIdx) is determined.

According to another general aspect of at least one embodiment, at least one transform among a plurality of transforms of a transform method is learned and the parameters ($\phi$) of the learned transforms are signaled in the bitstream.

According to another general aspect of at least one embodiment, at least one neural network inferring information relative to a transform method to apply for encoding the image block (or decoding the image block) is learned and the parameters of the at least one neural network inferring information relative to a transform method to apply are signaled in the bitstream.

According to another general aspect of at least one embodiment, a prediction of the information relative to a transform method to apply for encoding the image block (or decoding the image block) is determined and the information relative to a transform method to apply is predictively encoded/decoded based on the prediction.

According to another general aspect of at least one embodiment, for iterative testing of the encoding parameters of a given image block, the intra prediction of the image block determined by the neural network-based intra prediction mode is saved to the memory the first time it is computed, and the intra prediction of the image block is loaded during each subsequent test.

According to another general aspect of at least one embodiment, at least one neural network inferring information relative to a transform method to apply for encoding the image block (or decoding the image block) is adapted to coding with separate luminance and chrominance tree.

According to another general aspect of at least one embodiment, for iterative testing of the encoding parameters of a given image block, the block of primary transform coefficients resulting from the application of a primary transform to the block of residue of the neural network intra prediction is saved to memory the first time it is computed, and this block of primary transform coefficients is loaded during each subsequent test that requires it According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of the video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described encoding/decoding embodiments or variants.

These and other aspects, features and advantages of the general aspects will become apparent from the following detailed description of exemplary embodiments, which is to be read in connection with the accompanying drawings.

BRIEF DESCRIPTION OF THE DRAWINGS

In the drawings, examples of several embodiments are illustrated.

FIG. 5 shows an example of a decision tree representative of the signaling of lfnstIdx in the case of a CB predicted in intra.

FIG. 6 shows an example of a context surrounding a current block.

FIGS. 7 and 8 show examples of intra-prediction process using neural networks.

FIG. 50 illustrates a block diagram of an example apparatus in which various aspects of the embodiments may be implemented.

DETAILED DESCRIPTION

Figure 1:
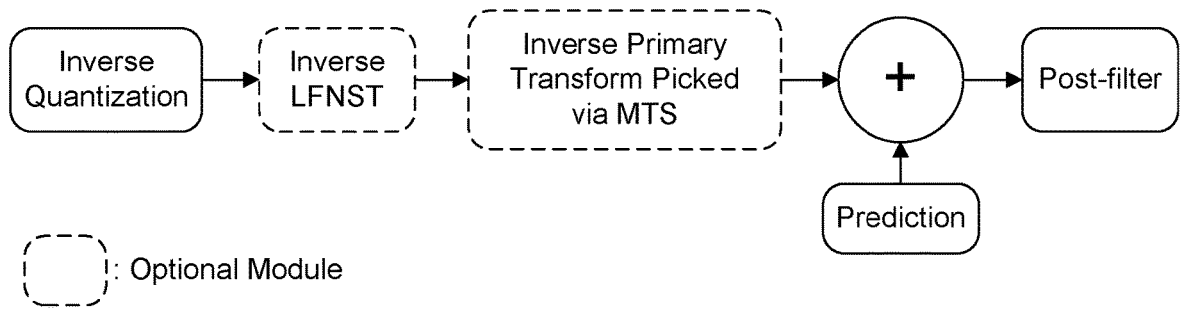
FIG. 1 illustrates a partial block diagram of an embodiment of a VVC video decoder.

In block-based video codec, intra prediction is employed to exploit the spatial redundancy that exists in an image. For a given image block predicted in intra, the residue, as known as residual block, which corresponds to the difference between the original block and its intra prediction, is transformed and quantized, and the quantized transformed coefficients are entropy coded into the bitstream. According to different coding modes, one or more transform(s) is applied to the residual block and the one or more transform(s) is either explicitly signaled in the bitstream or derived based on available information among which intra prediction mode. The present principles relate to the signaling/deriving of the one or more transform(s) after determining the intra prediction mode predicting a given block. The term "transform(s)" refers to the primary transform(s) and, optionally, the secondary transform(s), the ternary transform(s). For example, in VVC, the transform process is composed of a primary transform picked via the Multiple Transform Selection (MTS) and, optionally, a secondary transform, called Low Frequency Non-Separable Transform (LFNST).

Recent developments of video codec also introduce deep intra prediction which infers an intra prediction of an image block using at least one neural network from a context surrounding this current image block. One of the challenges is to deal with the one or more transform(s) to apply to the residue of an image block when this block is predicted by a neural network-based intra prediction mode.

This is solved and addressed by the general aspects described herein, which are directed to an intra prediction of a current image block using at least one neural network and obtaining an information relative to at least a transform to apply to the residue of image block wherein the information is either signaled in the bitstream and/or inferred by a neural network along with the neural network intra prediction of the current block.

Advantageously, the information on the transform to apply allows to adapt the transform process to any deep intra prediction mode without having a fixed predefined mapping between a deep intra prediction mode and a transform scheme in the encoder and/or decoder. Various embodiments of adaptation are described from the signaling of transform indices according to VVC standard, the signaling of hierarchical groups of transforms, or signaling parameters of a transform or even signaling parameters of neural network inferring transforms for deep intra prediction mode allowing full configurability of the transform scheme.

In the case of an image block predicted via a deep intra prediction mode, when the indices of the transforms to be applied to the residue of prediction are signaled in the bitstream instead of using a fixed predefined mapping between the deep intra prediction mode and the transform scheme, the encoder must run additional tests to find these transform indices. If each of these additional tests implies re-computing the neural network prediction, the running time of the encoder explodes as a neural network inference requires a lot of arithmetic operations.

Similarly, if each of these additional tests implies re-computing the same primary transform coefficients resulting from the application of a given primary transform to the residue of the neural network prediction, the running time of the encoder grows noticeably. That is why, on the encoder side, for a given image block, for the deep intra prediction mode exclusively, the predicted block is saved after being computed the first time. Then, it is loaded during each subsequent test. Similarly, the primary transform coefficients resulting from the application of a given primary transform to the residue of the neural network prediction is saved after being computed the first time. Then, it is loaded during each subsequent test if needed.

FIG. 1 illustrates a partial block diagram of an embodiment of a VVC video decoder in which blocks are represented from the inverse quantization to the post-filter in the case of an intra predicted block. In VVC, an intra predicted block is computed as the sum of intra prediction plus residual samples block. The residual samples are transformed, and then the transform coefficients are quantized. The transform process is composed of a primary transform picked via the Multiple Transform Selection (MTS) and, optionally, a secondary transform, called Low Frequency Non-Separable Transform (LFNST). Note that, in FIG. 1, the primary transform is illustrated by a dashed frame as it is optional. Indeed, VVC allows to skip the transform step. In that case, a transform skip flag, denoted tsFlag, is coded in the bitstream. tsFlag=1 indicates that the transforms are skipped. From now on, the possibility of skipping the transforms will be ignored, i.e. tsFlag=0.

Since at least some embodiments relates to the signaling of the transform(s) for a block predicted via a neural network-based intra prediction mode, MTS and the signaling of LFNST are firstly described, the neural network-based intra prediction is then introduced.

Signaling of the Transforms in VVC

The primary transform in VVC is separable. This means that the primary transform coefficients of a given Transform Block (TB) result from the application of a horizontal transform followed by a vertical transform to the difference between this TB and its prediction, called "residue of prediction". For a luminance TB, the possible pairs of a horizontal transform and a vertical transform are (DCT2, DCT2)

(DST7, DST7)

(DST7, DCT8)

(DCT8, DST7)

whereas, for a chrominance TB, the pair (DCT2, DCT2) is systematically used. DCT and DST stand respectively for Discrete Cosine Transform and Discrete Sine Transform.

Figure 2:
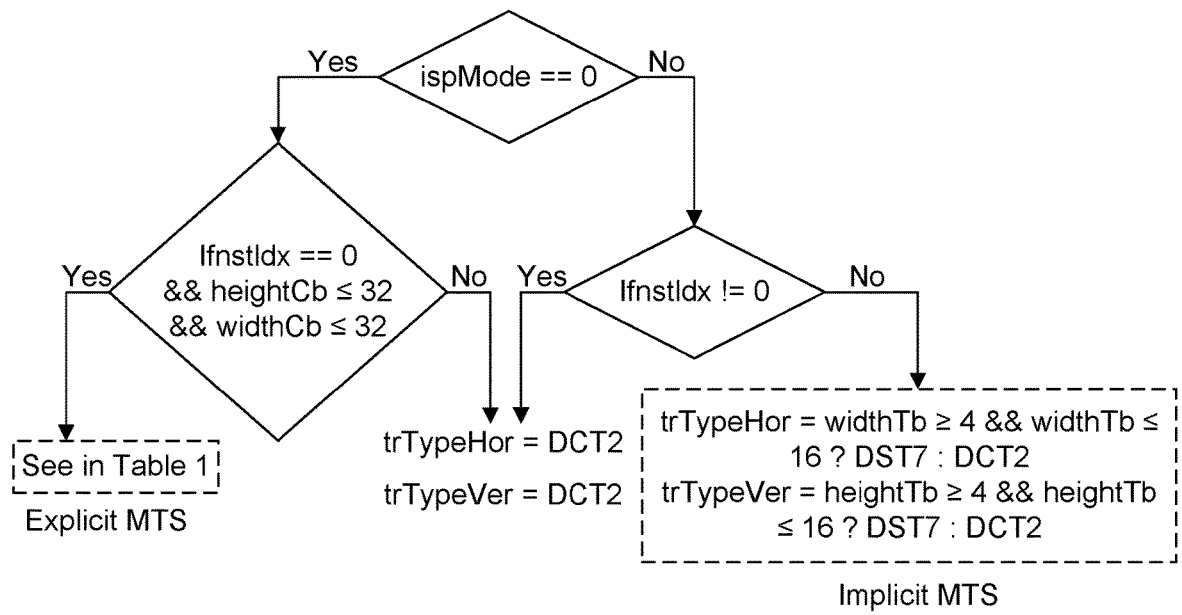
FIG. 2 shows an example of a process for determining a transform method between explicit MTS and implicit MTS when the luminance CB is predicted in intra.

In the case of a luminance Coding Block (CB), MTS can be explicit, i.e. flags are written to the bitstream to signal the pair of transforms used by its luminance TBs, or implicit, i.e. the pair of transforms is inferred from available information. FIG. 2 illustrates the choice between explicit MTS and implicit MTS when the luminance CB is predicted in intra. In FIG. 2 and in the following, it is assumed that, in the Sequence Parameter Set (SPS), sps_mts_enabled_flag=1 and sps_explicit_mts_intra_enabled_flag=1, which corresponds to a standard configuration. In FIG. 2, lfnstIdx∈{0, 1, 2} denotes the index signaling LFNST. ispMode∈{0, 1, 2} signals Intra Sub-Partition (ISP), ispMode=0 meaning that the luminance CB is not split into luminance TBs. Note that, in FIG. 2, inside the condition on the left side, additional restrictions linked to the coding of the quantized transform coefficients are omitted for conciseness.

For a luminance CB with explicit MTS, the horizontal and vertical transforms used by its luminance TBs, denoted trTypeHorizontal and trTypeVertical respectively, are specified by mtsIdx∈{0, 1, 2, 3, 4} as shown in Table 1.

TABLE 1 specification of trTypeHor and trTypeVer depending on mtsIdx.

| mtsIdx | 0 | 1 | 2 | 3 | 4 |
|---|---|---|---|---|---|
| trTypeHor | DCT2 | DST7 | DCT8 | DST7 | DCT8 |
| trTypeVer | DCT2 | DST7 | DST7 | DCT8 | DCT8 |

Figure 3:
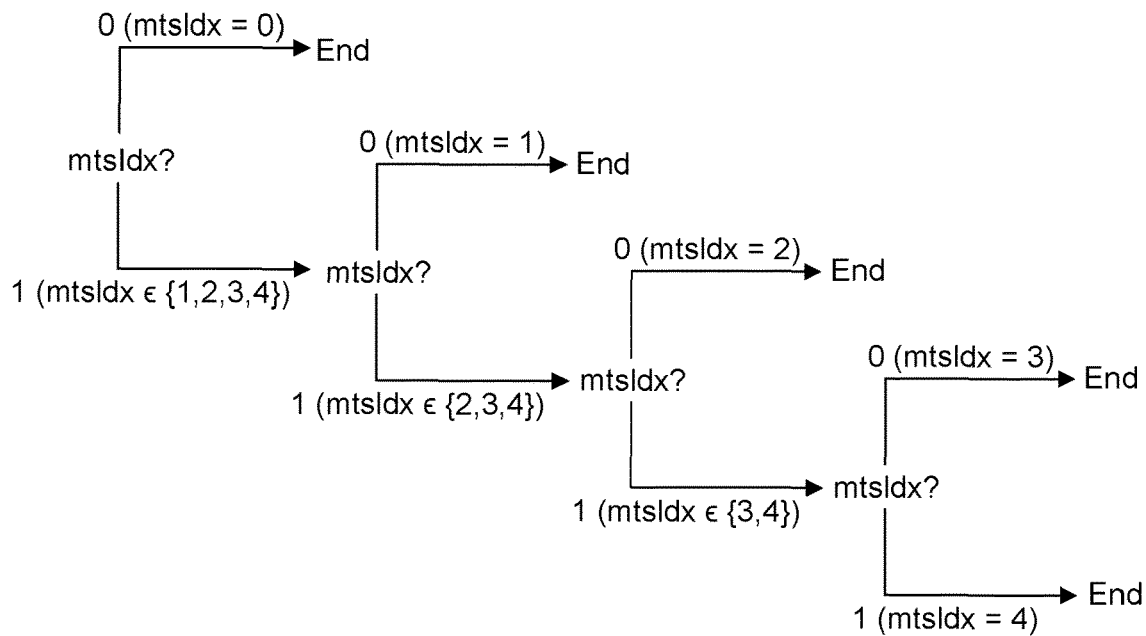
FIG. 3 shows an example of a decision tree representative of the signaling of mtsIdx in the case of a luminance CB.

FIG. 3 shows an example of a decision tree representative of the signaling of mtsIdx in the case of a luminance CB. In FIG. 3, at each node of the decision tree, the index value is written between brackets and in gray. The bin value is written in bold gray.

For a luminance CB predicted in intra with implicit MTS, trTypeHorizontal and trTypeVertical are inferred from the available information as shown by the right side of FIG. 2.

LFNST is a non-separable secondary transform applied to the primary transform coefficients of a given TB predicted in intra. For TBs of sizes 4×N and N×4, there exists 8 different 16×16 LFNST matrices, N∈{4, 8, 16, 32}. For the other TB sizes, there exist 8 different 48×16 LFNST matrices. In each case, the 8 possible LFNST matrices are grouped into 4 sets of 2 LFNST matrices.

Figure 4:
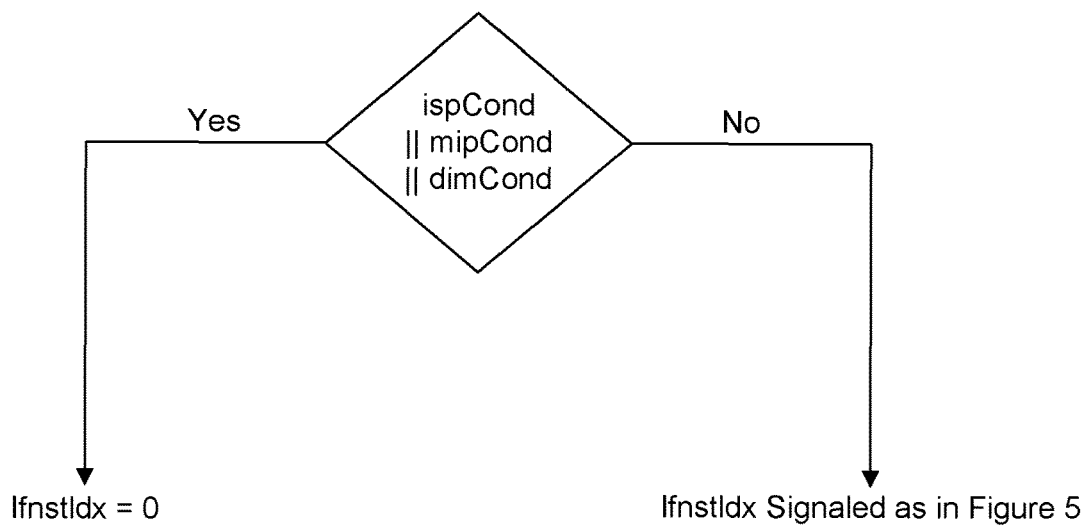
FIG. 4 shows an example of conditional process for inferring lfnstIdx to 0 in the case of a CB predicted in intra.

For a given CB, lfnstIdx∈{0, 1, 2} signals, in a set, which of the 2 LFNST matrices applies to the primary transform coefficients of each of its TBs. lfnstIdx=0 means that LFNST is not used. lfnstIdx∈{1, 2} refer to respectively the first and second LFNST matrices of this set. The signaling of lfnstIdx is depicted in FIG. 4 and in FIG. 5. In FIG. 4, mipFlag∈{0, 1} indicates whether a Matrix Intra Prediction (MIP) mode predicts the CB, mipFlag=0 meaning that the CB is not predicted by a MIP mode. heigthCb and widthCb denote respectively the height and width of the CB. isSepTree is true if two separate partitioning trees are used for luminance and chrominance. heightLumaCb and widthLumaCb denote respectively the height and width of the CB scaled via the channel subsampling factor. For example, if the current $YC_bC_r$ frame is encoded in 4:2:0 and a chrominance CB is considered in FIG. 4, heightLumaCb is equal to the height of this chrominance CB times 2. widthLumaCb is equal to the width of this chrominance CB times 2. Note that, in FIG. 4, inside the condition, additional restrictions linked to the coding of the quantized transform coefficients are omitted as they have little interest in the present principles and impair readability.

Now, for a given CB predicted in intra with lfnstIdx∈{1, 2}, the set of 2 LFNST matrices to be picked among the 4 possible sets is still to be determined. It is inferred from the index of the intra prediction mode selected to predict this CB, as shown in Table 2. Moreover, the decision of transposing the primary transform coefficients of each TB in this CB is also inferred from the index of the intra prediction mode selected to predict this CB as also shown in Table 2.

TABLE 2 inference of the index of the set of 2 LFNST matrices from the index of the wide angle intra prediction mode for a CB with lfnstIdx ∈ {1, 2}.

| | | | | | | | | |
|---|---|---|---|---|---|---|---|---|
| wide angle intra mode index | <0 | [0, ] | [2, 1] | [13, 2] | [24, 3] | [35, 4] | [45, 5] | [56, 8] |
| index of the set of 2 LFNST matrices | 1 | 0 | 1 | 2 | 3 | 3 | 2 | 1 |
| transposition of the primary transform coefficients | false | false | false | false | false | true | true | true |

For a luminance CB predicted via a MIP mode, i.e. mipFlag=1, if its height and width are larger than 16, lfnstIdx can belong to {1, 2} as shown on FIG. 4. If lfnstIdx∈{1, 2}, the set of 2 LFNST matrices of index 0 is picked and the primary transform coefficients of the TB of this luminance CB are not transposed.

For a chrominance CB predicted via a Cross-Component Linear Model (CCLM) mode, if lfnstIdx∈{1, 2}, LFNST for this chrominance CB is defined as follows. If the luminance CB that is collocated with this chrominance CB is predicted by a MIP mode, the index of the set of 2 LFNST matrices and the decision of transposing the primary transform coefficients of the TB of this chrominance CB are inferred from the wide angle intra mode index 0 using Table 2. Otherwise, the index of the set of 2 LFNST matrices and the decision of transposing the primary transform coefficients of the TB of this chrominance CB are inferred from the wide angle intra mode selected to predict this collocated luminance CB using Table 2.

Acceleration of the Intra Search in the Encoder of the VVC Reference Software (VTM)

In a latest version of VTM, for a given image block, the search for the intra prediction mode used to predict this block and the transform(s) to be applied to the residue of prediction is speeded up by saving and loading a given predicted block instead of re-computing this predicted block several times. To illustrate this, let us take a given image block, the intra prediction mode of index intraModeIdx∈[ 0, 66]] and analyze when the predicted block is computed/saved/loaded over the different full rate-distortion tests during the intra search of VTM. Here, the "full rate-distortion" test means the computation of the rate-distortion cost of the complete encoding of the image block predicted via the mode of index intraModeIdx. In Table 3, during "Test 0", the predicted block given by the mode of index intraModeIdx is saved. Then, during the test of Transform Skip (TS) called "Test 1", this predicted block is loaded. But, apart from this load and save, the same predicted block is re-computed from "Test 2" to "Test 7". In this variant encoder, we assume that, for a given image block, the predicted block given by each intra prediction mode is not saved once and then loaded when needed as this requires to store at least n predicted blocks, incurring a large memory cost. n denotes the number of intra prediction modes involved in the full rate-distortion tests. Note that, in Table 3, all the heuristics that could stop the series of tests from "Test 0" to "Test 7" early are ignored for clarity. Note also that, in Table 3, during "Test 0", the primary transform coefficients resulting from the application of the DCT2 horizontally and the DCT2 vertically to the residue of prediction is saved and loaded as they are first used by a heuristic comparing the Sum of Absolute Differences (SAD) of DCT2-DCT2 and the SAD of TS to decide whether "Test 1" will be skipped, then used to compute the full rate-distortion cost of "Test 0".

TABLE 3 choice of computing/saving/loading the predicted block and computing/saving/loading the primary transform coefficients resulting from the application of the DCT2 horizontally and the DCT2 vertically to the residue of prediction in the case of a given image block predicted via the intra prediction mode of index intraModeIndex according to the encoder of VTM.

|  | Test 0 | Test 1 (TS) | Test 2 | Test 3 |
|---|---|---|---|---|
| primary transform | DCT2-DCT2 | none | DST7-DST7 | DCT2-DCT2 |
| secondary transform | none | none | none | lfnstIdx = 1 |
| intra mode prediction | computed, saved | loaded | computed | computed |
| DCT2-DCT2 primary transform coefficients | computed, saved, loaded | none | none | computed |

|  | Test 4 | Test 5 | Test 6 | Test 7 |
|---|---|---|---|---|
| primary transform | DCT2-DCT2 | (*) | (**) | DCT8-DCT8 |
| secondary transform | lfnstIdx = 2 | none | none | none |
| intra mode prediction | computed | computed | computed | computed |
| DCT2-DCT2 primary transform coefficients | computed | none | none | none |

(*): intraModeIdx < 34 ? DST7-DCT8:DCT8-DST7
(**): intraModeIdx < 34 ? DCT8-DST7:DST7-DCT8

Neural Network-Based Intra Prediction

A neural network for intra prediction infers from the context surrounding the current block a prediction of this current block. FIG. 6 shows an example of a context X surrounding the current block Y of size W×H. The context X is composed of decoded pixels located above the current block Y and on its left side, similarly to the set of decoded reference samples for the intra prediction in VVC. But, unlike it, the context X can be extended towards the left and the top. Accordingly, as shown on FIG. 7, the context X contains $n_l$ lines of 2H decoded pixels located on the left side of Y and $n_a$ lines of $n_l$+2 W decoded pixels located above Y.

FIG. 7 shows an example of an intra-prediction process using neural networks. As shown on FIG. 7, if the neural network is fully-connected, the context is typically re-arranged into a vector by a flattening process, and the resulting vector is fed into the neural network. Then, the vector provided by the neural network is reshaped to the shape of the current block, yielding the prediction Ŷ.

Figure 8:
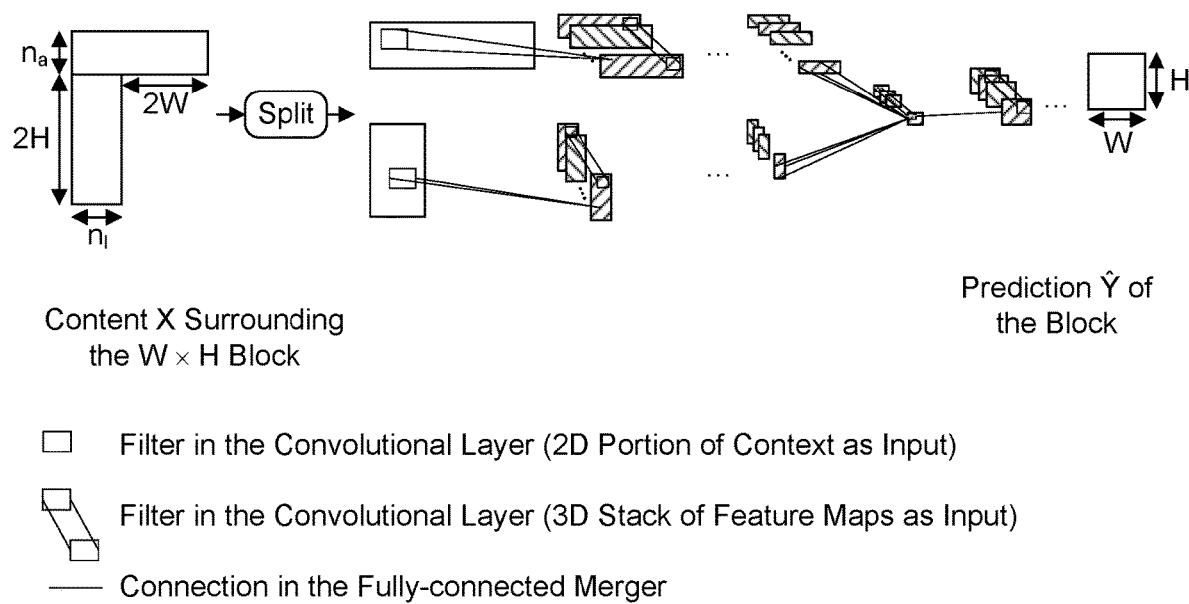

FIG. 8 shows another example of an intra-prediction process using neural networks. As shown on FIG. 8, if the neural network is convolutional, the context can be split into two portions. Then, each portion is fed into a stack of convolutional layers. The two stacks of feature maps at the output of the two stacks of convolutional layers are merged via full connectivity. Finally, the result of the merge is inserted into a stack of transpose convolutional layers, yielding the prediction Ŷ.

In the previous work, two distinct approaches aim at integrating neural network-based intra prediction mode(s) into VVC: the integration of a single generic neural network-based intra prediction mode and the integration of multiple specialized neural network-based intra prediction modes.

An example of deep intra prediction is described in the article entitled "*Iterative training of neural networks for intra prediction*", Thierry Dumas, Franck Galpin, and Philippe Bordes, arXiv:2003.06812v1, March 2020). This article describes a first approach of deep intra prediction wherein a single generic neural network-based intra prediction mode is introduced. The single neural network-based intra prediction mode is usually composed of several neural networks, each predicting blocks of a different size. For instance, the neural network in the single neural network-based mode includes 11 neural networks, each predicting blocks of a different size in T={4×4, 4×8, 8×4, 4×16, 16×4, 8×8, 8×16, 16×8, 16×16, 32×32, 64×64}. For a given W×H block, if W×H∈T, the neural network in the single neural network-based mode predicting W×H blocks is used for prediction. Otherwise, the single neural network-based mode is not able to predict this block.

In terms of signaling, fora given W×H luminance CB predicted in intra, if W×H∈T, a single flag is written to the bitstream to indicate whether the single neural network-based intra prediction mode or an intra prediction mode in VVC is selected.

The thrust of this first approach is, roughly speaking, for a given block, to have a neural network inferring from the context of this block the "direction of propagation(s)" that are the most likely to give high quality of prediction while using these directions to compute a prediction of this block from the context. To do so, the neural network must be fed with a large context. That is why, $n_a \geq 4$, $n_l \geq 4$, $n_a$ and $n_l$ growing with the size of the block.

Figure 9:
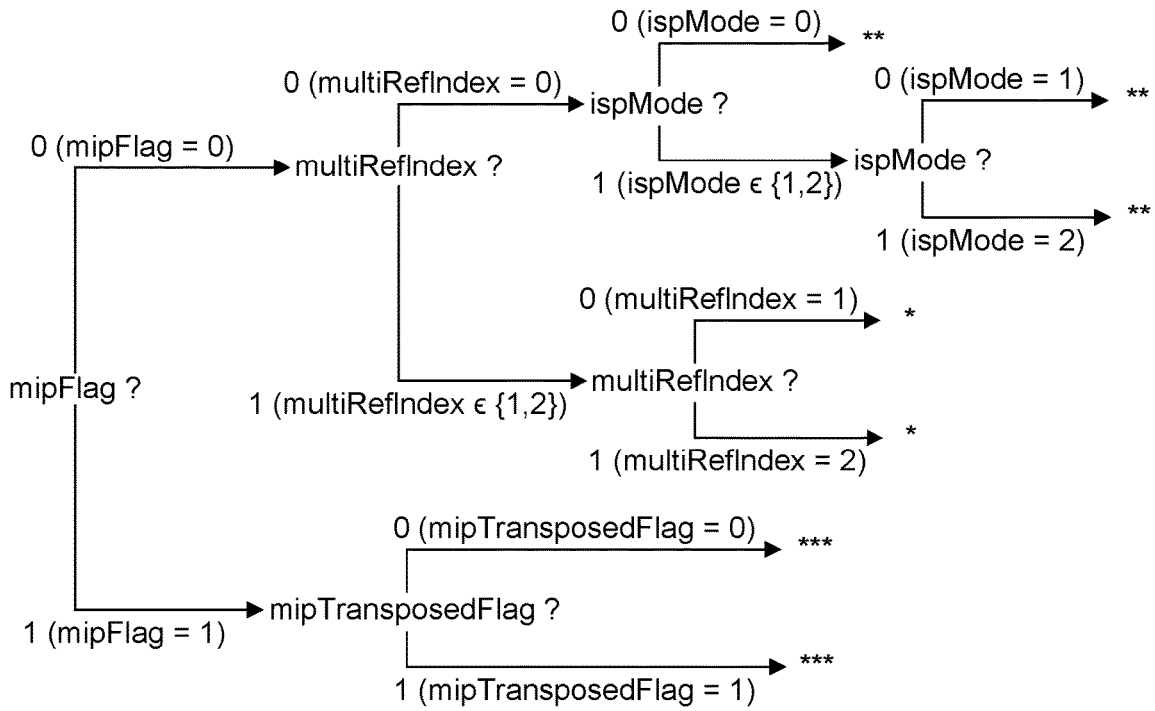
FIG. 9 shows an example of a decision tree representative the intra prediction signaling for a luminance CB.
Figure 9:
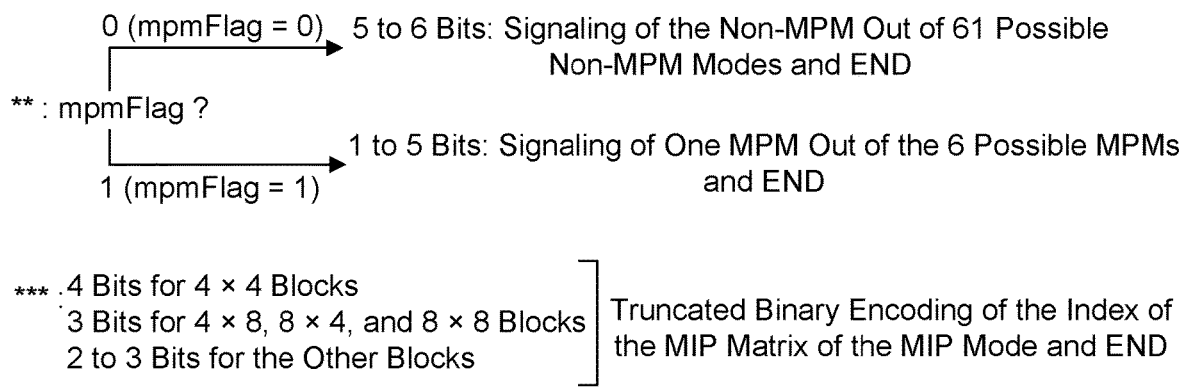

According to a second approach, multiple specialized neural network-based intra prediction modes are introduced as with the tool Matrix Intra Prediction (MIP) in VVC. The MIP gathers specialized neural network-based intra prediction modes. MIP contains 32 modes for 4×4 luminance CBs, 16 modes for 4×8, 8×4, and 8×8 luminance CBs, and 12 modes for the other luminance CB sizes. FIG. 9 shows an example of a decision tree representative the intra prediction signaling for a luminance CB. In terms of signaling, for a given W×H luminance CB predicted in intra, mipFlag∈{0, 1} is written to the bitstream to indicate whether a MIP mode or a non-MIP intra prediction mode in VVC is selected. Then, if a MIP mode is selected, i.e. mipFlag=1, other flags are written to the bitstream to indicate which MIP mode is selected. In FIG. 9, at each node of the decision tree, the index/flag value is written between brackets and in gray. Either the bin value or the coding cost is written in bold gray. MultiRefIndex∈{0, 1, 2} signals Multiple Reference Lines (MRL). MPM stands for Most Probable Mode.

Unlike in the first approach, a neural network in MIP is not designed to infer from the context of a given luminance CB the "direction of propagation(s)" that are the most likely to give high quality of prediction. Instead, the "direction of propagation" is found by the encoder search among the different MIP modes. That is why, in MIP, the context of a luminance CB is small, and the neural networks do not need a large capacity of representation. Consequently, the context of a luminance CB only comprises a line of W decoded pixels above it and a line of H decoded pixels on its left side. Besides, each neural network in MIP has a single layer, without non-linearity, without bias, which amounts to a linear transformation.

Now, when integrating a neural network-based intra prediction mode into a block-based video codec with existing transforms, one of the challenges is to deal with the signaling of the transforms that are inferred from existing intra prediction modes. Note that these transforms can be a series of individual transforms (like MTS and LFNST in VVC), or a transform in a large set of adaptive transforms.

This problem is well illustrated by LFNST. The set of 2 LFNST matrices of index i was trained on examples, each example being the primary transform coefficients obtained by applying (DCT2, DCT2) to the residue resulting from the prediction of a block via an intra prediction mode whose index belongs to the range $R_i$, i∈⟦0, 3⟧. For instance, $R_3$= ⟦24, 34⟧∪⟦35, 44⟧, the primary transform coefficients being transposed if the intra prediction mode index belongs to ⟦35, 44⟧ This justifies the mapping in Table 2. However, the skilled in the art faces an issue while trying to infer the index of the set of 2 LFNST matrices for a block predicted via a new neural network-based intra prediction mode.

This problem is critical when the single neural network-based intra prediction mode is integrated into the video codec. Indeed, as a neural network in this mode can infer from the context of a block the "direction of propagation(s)" that are the most likely to give high quality of prediction, from the prediction of one block to the prediction of another block, this mode can yield different directions of propagation. Therefore, the systematic inference of the same set of 2 LFNST matrices from the index of the neural network-based intra prediction mode underperforms in terms of rate-distortion.

This is solved and addressed by the general aspects described herein, which are directed to an intra prediction of an image block using at least one neural network and obtaining an information relative to at least a transform method to apply to the residue of the neural network prediction if this transform is primary, or to the block of transform coefficients obtained by applying other transforms to the residue of the neural network prediction if this transform is not primary. In at least one embodiment, for a given block predicted via a neural network-based intra prediction mode, all the transform indices that are commonly inferred from the index of the selected intra prediction mode are signaled by writing flags to the bitstream. Alternatively, in at least another embodiment, each neural network involved in the neural network-based intra prediction mode is trained at inferring, from the context of a block, the transform indices that are commonly inferred from the index of the selected intra prediction mode. Then, on both the encoder and decoder sides, for a given block predicted via a neural network-based intra prediction mode, the neural network used for prediction directly returns the needed transform indices.

Figure 10A:
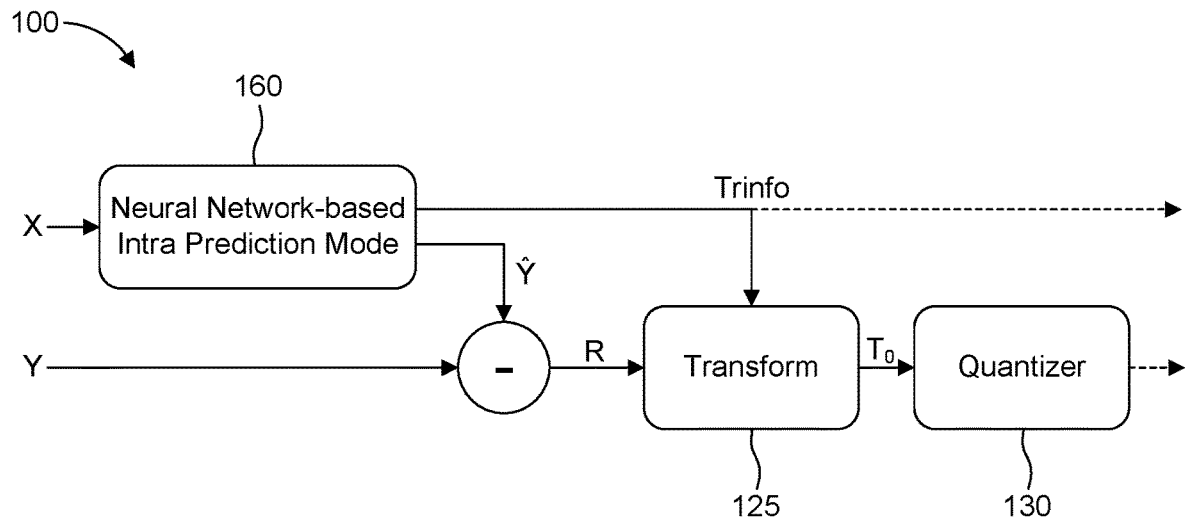
FIG. 10a illustrates a generic encoding method according to a general aspect of at least one embodiment.
Figure 10B:
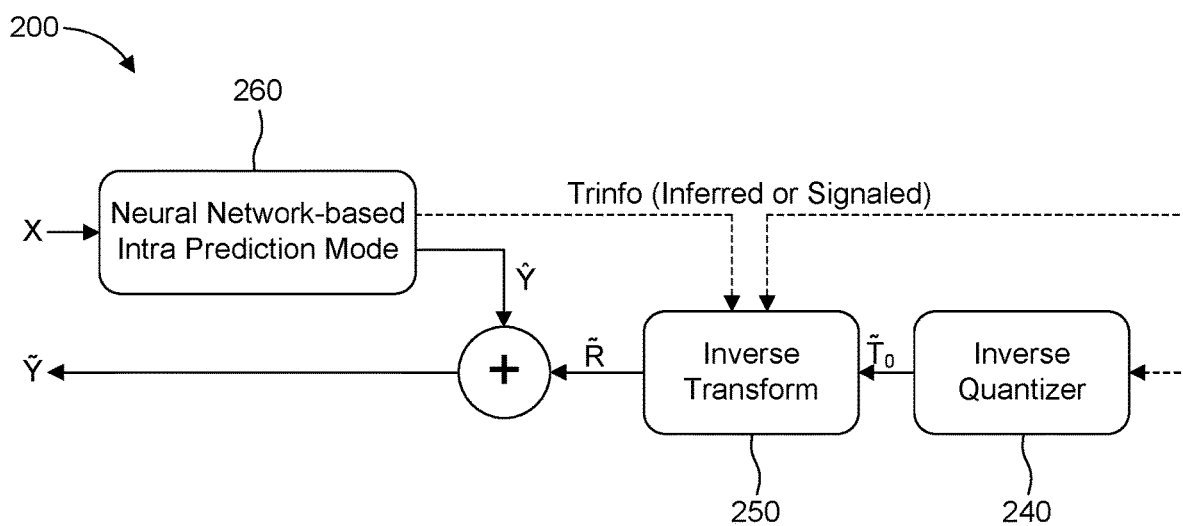
FIG. 10b illustrates a generic decoding method according to a general aspect of at least one embodiment.

FIG. 10a illustrates a generic encoding method (100) according to a general aspect of at least one embodiment. The block diagram of FIG. 10a partially represents modules of an encoder or encoding method, for instance implemented in the exemplary encoder of FIG. 48. FIG. 10a shows a generic example of the inference on the encoder side (100) of an information on the one or more transforms to apply for encoding a block. The neural network-based intra prediction mode (160) computes from the context X of the block Y a prediction $\hat{Y}$ of Y and a generic information Trinfo. The residue of prediction R=Y—$\hat{Y}$ is fed into the transform module (125). The generic information Trinfo of the used transform is optionally written to the bitstream. The resulting transform coefficients $T_0$ are fed into the quantizer (130). FIG. 10b illustrates a generic decoding method (200) according to a general aspect of at least one embodiment. The block diagram of FIG. 10b partially represents modules of a decoder or decoding method, for instance implemented in the exemplary decoder of FIG. 49. The neural network-based intra prediction mode (260) computes from the context X of the current block Y a prediction $\hat{Y}$ of this block. The inverse quantizer (240) provides the reconstructed/decoded transform coefficients $\hat{T}_0$. The generic information Trinfo on the transform method to apply is either inferred from available information in the neural network-based intra prediction on the decoder side or read from the bitstream. The inverse transform (250) computes the reconstructed residue $\hat{R}$ from $\hat{T}_0$. Finally, the reconstructed block is $\hat{Y}=\hat{R}+\hat{Y}$.

Various embodiments of the generic encoding or decoding method are described in the following.

Figure 11:
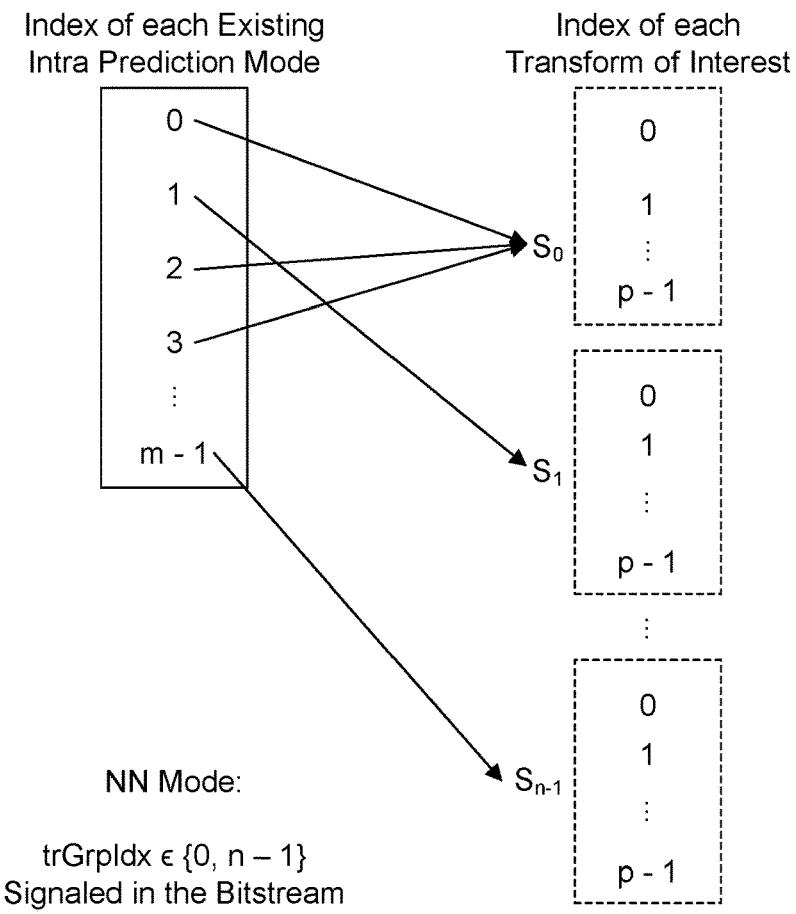
FIG. 11 illustrates an example of generic mapping between regular intra prediction modes and groups of transforms while the mapping between a neural network-based intra prediction mode and a group of transforms is represented by a transform group index trGrpIdx signaled in the bitstream according to at least one embodiment.

Signaling the Transform Indices that are Usually Inferred from the Selected Intra Prediction Mode Index FIG. 11 illustrates an example of an information representative of generic mapping between a neural network-based intra prediction mode and a group of transforms according to at least one embodiment. According to this non-limiting example, the video codec contains m intra prediction modes and n groups $\{S_0, \ldots, S_{n-1}\}$ of p transforms. In any of the n groups of transforms, any of the p transforms can be either linear or non-linear. Any of them can be either separable or non-separable. Moreover, the above-mentioned transforms can be primary, secondary, ternary, or any additional level of transforms. As shown in FIG. 11, an information mappingIntraTrGrp representative of a generic mapping between the index of each of the m intra prediction modes and the index trGrpIdx∈〚 0, n−1〛 of a group of transforms is determined. If a given block is predicted via the intra prediction mode of index i⊂〚 0, m−1〛, the used transform belongs to the group of index trGrpIdx=mappingIntraTrGrp(i). Then, in this group, the index of the used transform (belonging to 〚 0, p−1〛 is optionally written to the bitstream. The exemplary mapping of FIG. 11 is given for illustrative purpose and any other mapping is compatible with the present principles. If a block is predicted by the added neural network-based intra prediction mode, the index trGrpIdx of the group containing the used transform is written to the bitstream.

Figure 12:
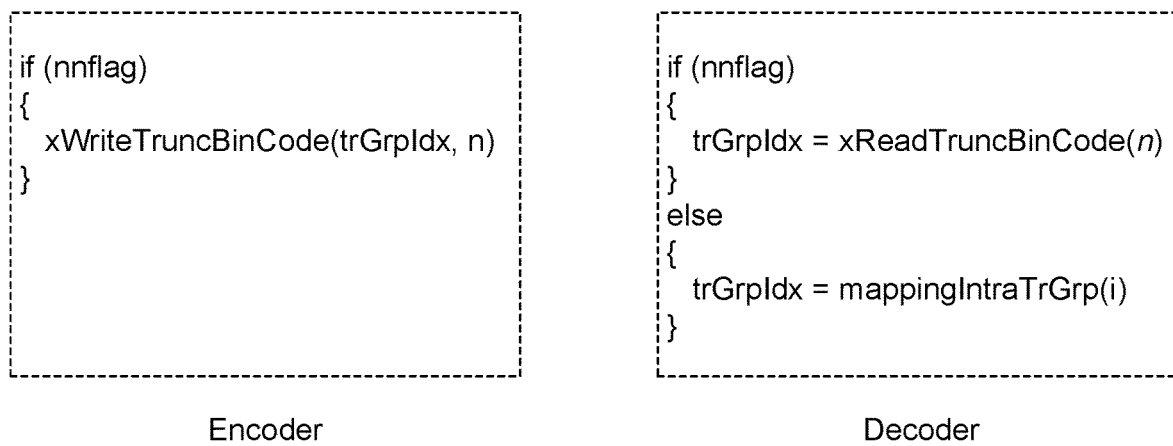
FIG. 12 illustrates a signaling method of an information representative of generic mapping between an intra prediction mode and a group of transforms according to at least one embodiment.

FIG. 12 illustrates a signaling method of an information of generic mapping between an intra prediction mode and a group of transforms according to at least one embodiment. For instance, if the selection of the neural network-based intra prediction mode to predict this block is signaled via nnFlag∈{0, 1}, and trGrpIdx is encoded using a truncated binary code, the encoding of trGrpIdx and its decoding are depicted in FIG. 12. Accordingly, for the encoding of trGrpIdx, the function xWriteTruncBinCode(idx, n) runs the truncated binary encoding of the symbol idx among n possible symbols and writes the resulting bits to the bitstream. In a corresponding decoding method, the function xReadTruncBinCode(n) reads bits from the bitstream to truncated binary decode the current symbol idx among n possible symbols and determined the index trGrpIdx.

According to a first variant embodiment, the coding of the index trGrpIdx is compatible with any code. As previously described, if a block is predicted by the added neural network-based intra prediction mode, the index trGrpIdx of the group including the used transform is encoded and decoded via a truncated binary code. The truncated binary code can be replaced by any other code. For instance, it can be replaced by a unary code.

According to a second variant embodiment, the transforms are no longer grouped. The notion of groups of transforms is removed. In this case, the video codec contains m intra prediction modes and n transforms.

Figure 13:
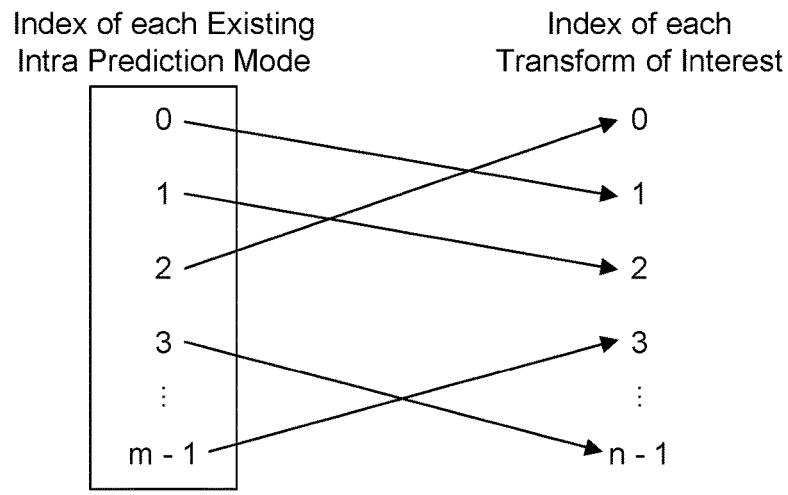
FIG. 13 illustrates another example of generic mapping between regular intra prediction modes and transforms while the mapping between a neural network-based intra prediction mode and a transform is represented by a transform index trIdx signaled in the bitstream according to at least one embodiment.

FIG. 13 illustrates an example of an information representative of generic mapping between a neural network-based intra prediction mode and a transform according to at least one embodiment. Now, mappingIntraTr maps the index of each of the m intra prediction modes to the index trIdx∈〚 0, n−1〛 of a transform. If a given block is predicted via the intra prediction mode of index i∈〚 0, m−1〛, the transform of index trIdx=mappingIntraTr(i) is used for the given block. If a block is predicted by the added neural network-based intra prediction mode, the index trIdx of the used transform is written to the bitstream.

Figure 14:
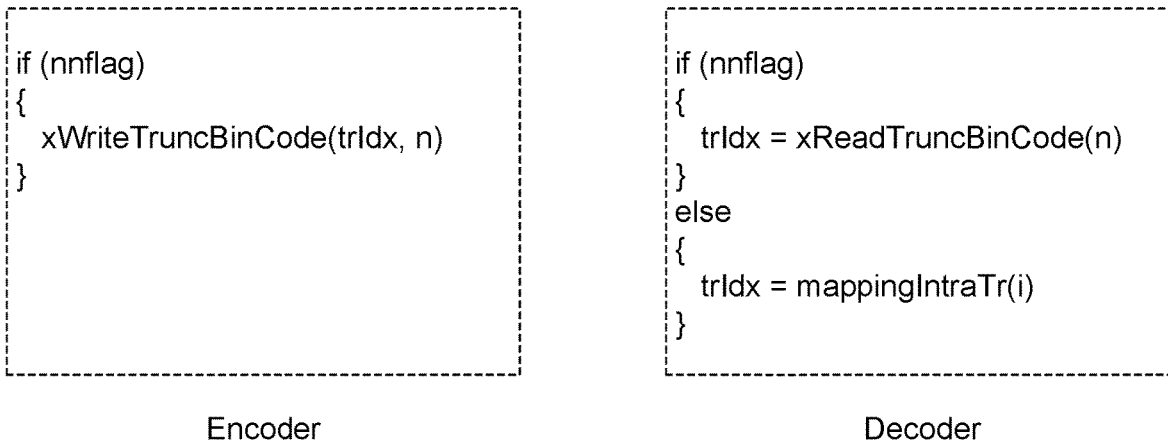
FIG. 14 illustrates another signaling method of an information representative of generic mapping between an intra prediction mode and a transform according to at least one embodiment.

FIG. 14 illustrates a signaling method of an information of generic mapping between an intra prediction mode and a transform according to at least one embodiment. If a block is predicted by the added neural network-based intra prediction mode, the index trIdx of the used transform is written to the bitstream. For instance, if the selection of the neural network-based intra prediction mode to predict this block is signaled via nnFlag∈{0, 1}, and trIdx is encoded using a truncated binary code, the encoding of trIdx and its decoding are shown in FIG. 14 and a similar processing to the encoding/decoding of FIG. 12 is performed.

Figure 15:
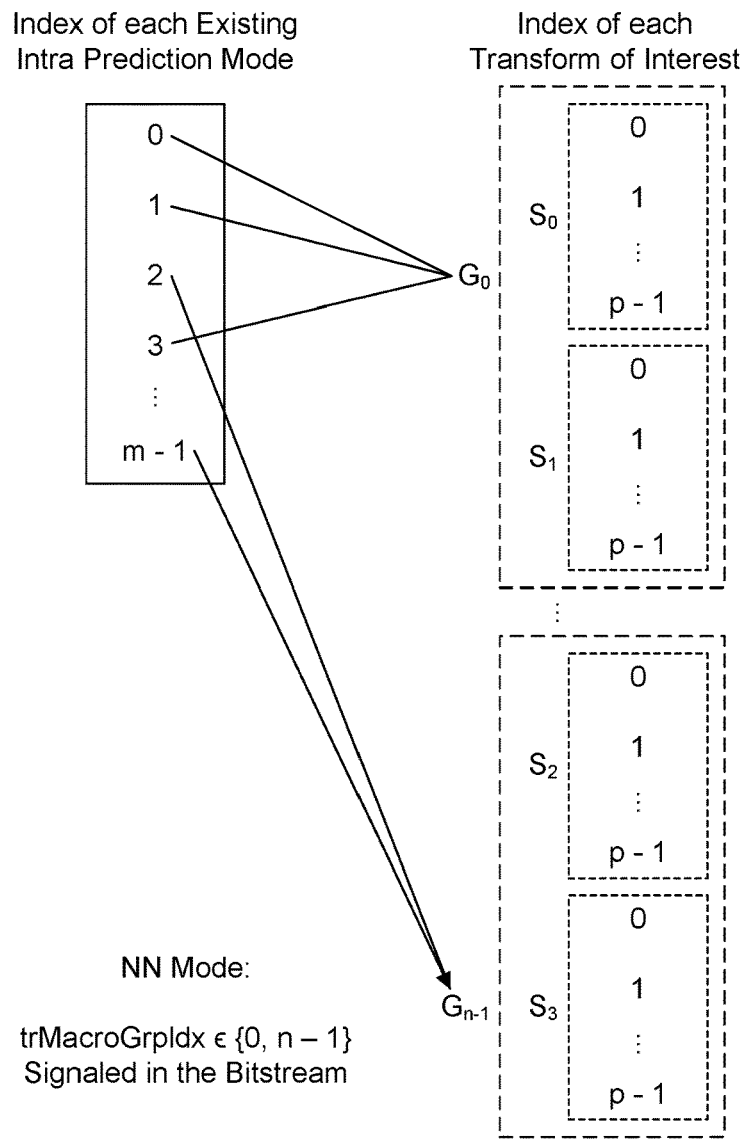
FIG. 15 illustrates another example of generic mapping between regular intra prediction modes and hierarchical groups of transforms while the mapping between a neural network-based intra prediction mode and a hierarchical group of transforms is represented by a transform macro group index trMacroGrpIdx signaled in the bitstream according to at least one embodiment.

According to a third variant embodiment, the transforms can be grouped hierarchically. FIG. 15 illustrates an example of an information representative of generic mapping between a neural network-based intra prediction mode and a hierarchical group of transforms according to at least one embodiment. In FIG. 15, the video codec contains m intra prediction modes and n macro groups $\{G_0, \ldots, G_{n-1}\}$ of 2 sub-groups of p transforms each. Now, mappingIntraTrMacroGrp maps the index of each of the m intra prediction modes to the index trMacroGrpIdx∈〚 0, n−1〛 of a macro group. If a given block is predicted via the intra prediction mode of index i∈〚 0, m−1〛 the used transform will belong to the macro group of index trMacroGrpIdx=mappingIntraTrMacroGrp(i). Then, in this macro group, the index of the sub-group containing the used transform is optionally signaled by writing a flag to the bitstream. Finally, in the used sub-group, the index of the used transform is optionally written to the bitstream. If a block is predicted by the added neural network-based intra prediction mode, the index trMacroGrpIdx of the macro group containing the used transform is written to the bitstream.

Figure 16:
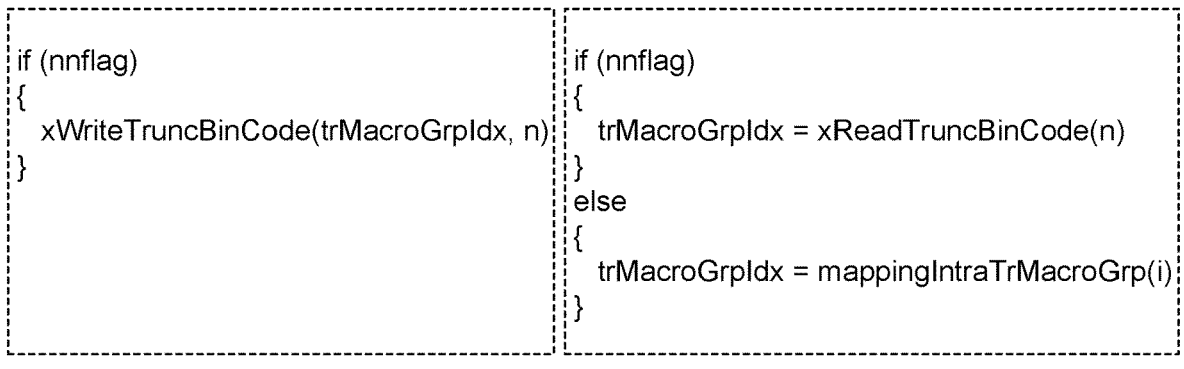
FIG. 16 illustrates another signaling method of an information representative of generic mapping between an intra prediction mode and a hierarchical group of transforms according to at least one embodiment.

FIG. 16 illustrates another signaling method of an information representative of a generic mapping between an intra prediction mode and a hierarchical group of transforms according to at least one embodiment. If a block is predicted by the added neural network-based intra prediction mode, the index trMacroGrpIdx of the macro group containing the used transform is written to the bitstream. For instance, if the selection of the neural network-based intra prediction mode to predict this block is signaled via nnFlag∈{0, 1}, and trMacroGrpIdx is encoded using a truncated binary code, the encoding and decoding of trMacroGrpIdx are shown in FIG. 16 and a similar processing to the encoding/decoding of FIG. 12 is performed.

According to a fourth variant embodiment, the approach described by FIG. 11 and FIG. 12 can be straightforwardly applied to the signaling of LFNST as in VVC. Precisely, m=67, excluding the MIP modes. The signaling of LFNST in the case of a luminance CB predicted via a MIP mode was previously described for n=7 and p=2. FIG. 11 is linked to Table 2 via the above Table 4.

TABLE 4 association between each group of transforms $S_i$, i ∈[ 0, 6] in
FIG. 11 and its group of transforms in Table 2.

| group of transforms | $S_0$ | $S_1$ | $S_2$ | $S_3$ | $S_4$ | $S_5$ | $S_6$ |
|---|---|---|---|---|---|---|---|
| index of the set of 2 LFNST matrices | 0 | 1 | 2 | 3 | 3 | 2 | 1 |
| transposition of the primary transform coefficients | false | false | false | false | true | true | true |

According to a fifth variant embodiment, the transforms are learned and signaled. In the previous approaches, the transforms are assumed to be fixed at both the encoder and decoder sides throughout the encoding and decoding. However, according to another variant embodiment, the different transforms are learned on the encoder side. Then, the transform parameters are transmitted from the encoder to the decoder. Finally, the decoder retrieves the transforms by reading their parameters from the bitstream. This variant embodiment is advantageously compatible with the signaling of transforms from the encoder to the decoder.

Neural Network-Based Mode Inferring the Transform Indices

According to at least another embodiment, the information on the one or more transform(s) to be applied is inferred at both the encoder and decoder. Considering the non-limiting example of generic mapping of FIG. 11, when a block is predicted by the added neural network-based intra prediction mode, the index trGrpIdx∈[ 0, n−1] of the group containing the used transform is not written to the bitstream. Instead, it is inferred from the context of this block by the neural network-based intra prediction mode.

Figure 17:
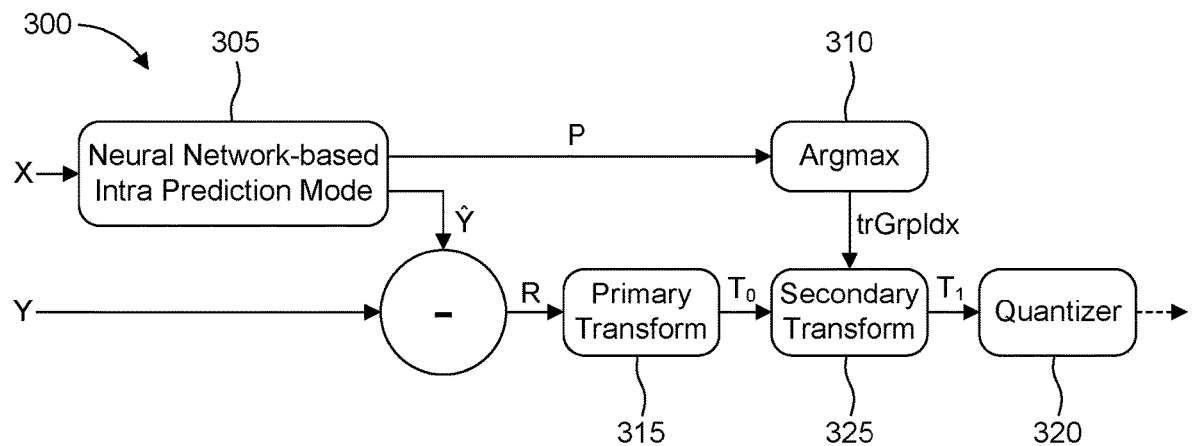
FIGS. 17, 19, 21, 23, 25, 27, 29, 31 illustrate different variants of a neural network-based intra prediction method inferring an information on a transform to apply in a video encoder according to at least one embodiment.

FIG. 17 illustrates a neural network-based intra-prediction method inferring an information on a transform to apply in a video encoder according to at least one embodiment. FIG. 17 shows an example of the inference on the encoder side (300) wherein the information on the one or more transforms to apply is a mapping index trGrpIdx with a group of transforms. The neural network-based intra prediction mode (305) computes from the context X of the block Y a prediction $\hat{Y}$ of Y and a vector P∈[0, 1]$^n$ whose coefficient of index j is the probability that trGrpIdx=j. Then, trGrpIdx=argmax(P) (310) where argmax is a function that returns the value trGrpIdx at which the probability vector P is maximized. Note that, here, trGrpIdx is a secondary transform group index. Yet, the described approach can be generalized to the cases where trGrpIdx is a primary transform group index, ternary transform group index, or group index for additional transform level. The residue of prediction R=Y−$\hat{Y}$ is fed into the primary transform (315). The resulting primary transform coefficients $T_0$ are fed into the secondary transform (325) belonging to the group of secondary transforms of index trGrpIdx. In this group, the index of the used transform (belonging to [ 0, p−1]) is optionally written to the bitstream. Alternatively, it may be inferred from available information. The resulting secondary transform coefficients $T_1$ are fed into the quantizer (320).

Figure 18:
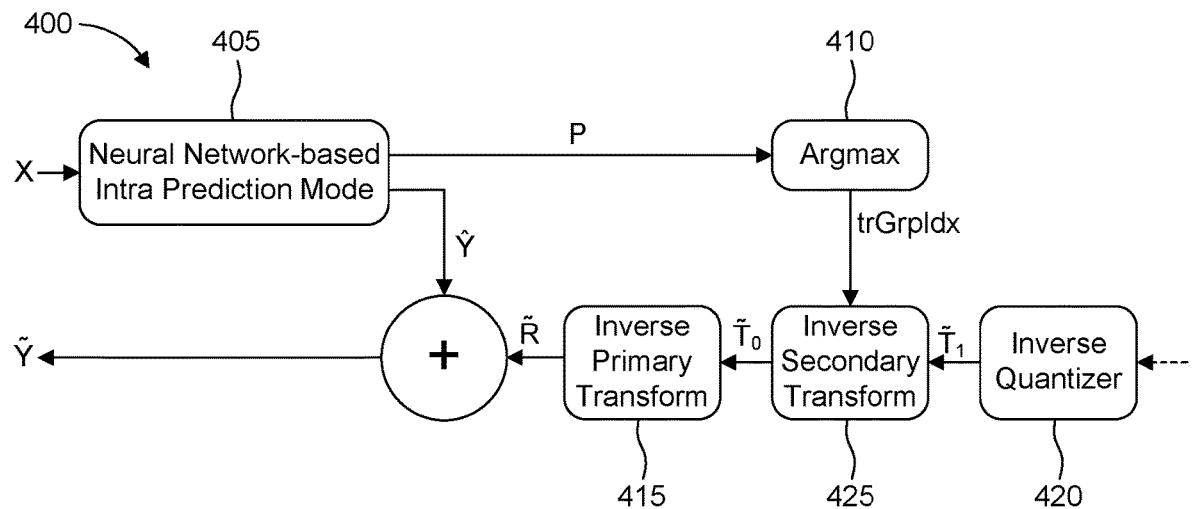
FIGS. 18, 20, 22, 24, 26, 28, 30, 32, 33 illustrate different variants of a neural network-based intra prediction method inferring an information on a transform to apply in a video decoder according to at least one embodiment.

FIG. 18 illustrates a neural network-based intra-prediction method inferring an information on a transform to apply in a video decoder according to at least one embodiment. FIG. 18 shows an example of the inference on the decoder side (400). The neural network-based intra prediction mode (405) computes from the context X of the current block a prediction $\hat{Y}$ of this block and P. Then, trGrpIdx=argmax(P) (410). The inverse quantizer (420) provides the reconstructed secondary transform coefficients $\tilde{T}_1$. The inverse secondary transform (425), belonging to the group of inverse secondary transforms of index trGrpIdx, turns $\tilde{T}_1$ into the reconstructed primary transform coefficients $\tilde{T}_0$. In this group, the index of the used inverse transform (belonging to [ 0, p−1]) is read from the bitstream if the encoder wrote it into the bitstream. It is inferred from available information if the encoder did so. The inverse primary transform (415) computes the reconstructed residue $\tilde{R}$ from $\tilde{T}_0$. Finally, the reconstructed block is $\tilde{Y}=\tilde{R}+\hat{Y}$.

Figure 19:
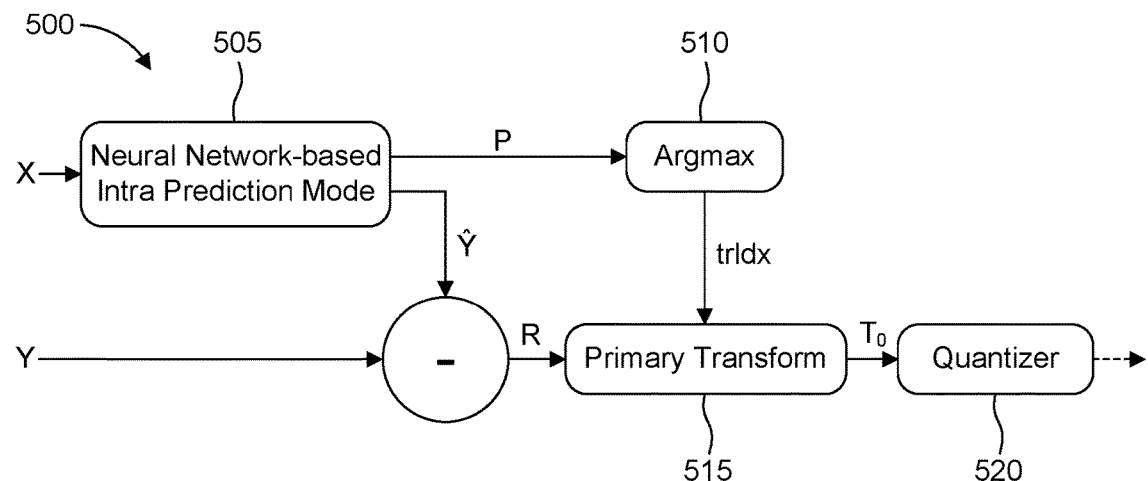
Figure 20:
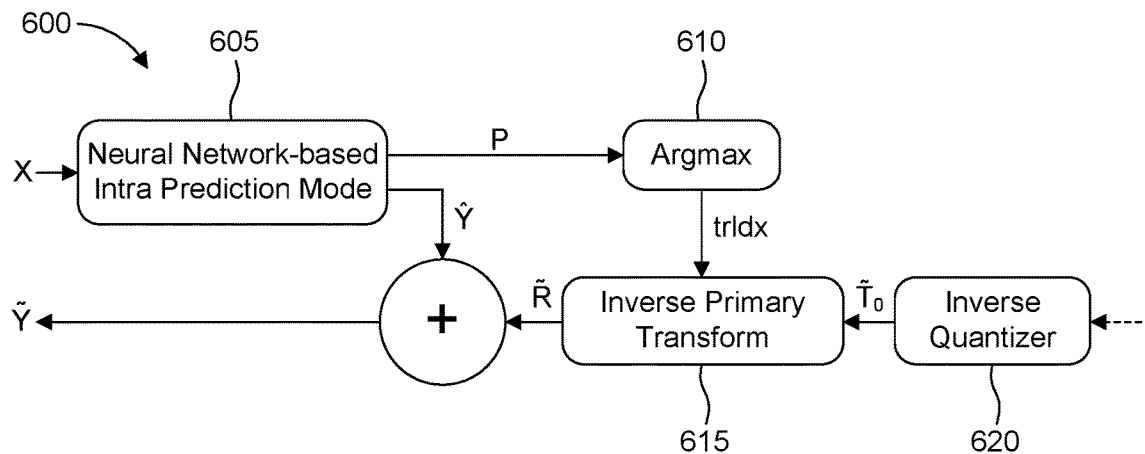

According to a first variant embodiment, the transforms are no longer grouped. Indeed, the notion of groups of transforms is removed. This corresponds to the generic case presented with reference to FIG. 13 wherein a mapping mappingIntraTr maps the index of each of the m intra prediction modes to the index trIdx∈[ 0, n−1] of a transform. According to this first variant, if a block is predicted by the added neural network-based intra prediction mode, the index trIdx∈[ 0, n−1] of the used transform is not written to the bitstream. Instead, it is inferred from the context of this block by the neural network-based intra prediction mode. This inference on the encoder side (500) is described in FIG. 19. The neural network-based intra prediction mode (505) computes from the context X of Y a prediction $\hat{Y}$ of Y and a vector P∈[0, 1]$^n$ whose coefficient of index j is the probability that trIdx=j. Then, trIdx=argmax(P) (510). Note that, here, trIdx is a primary transform index. Yet, the proposed approach can be generalized to the cases where trIdx is a secondary transform index, ternary transform index or any additional transform level. The residue R=Y−$\hat{Y}$ is fed into the primary transform (515) of index trIdx. The resulting primary transform coefficients $T_0$ are fed into the quantizer (520). The corresponding inference of trIdx on the decoder side (600) is shown by FIG. 20. The neural network-based intra prediction mode (605) computes from the context X of the current block a prediction $\hat{Y}$ of this block and P. Then, trIdx=argmax(P) (610). The inverse quantizer (620) provides the reconstructed primary transform coefficients $\tilde{T}_0$. The inverse primary transform (615) of index trIdx computes the reconstructed residue $\tilde{R}$ from $\tilde{T}_0$. Finally, the reconstructed block is $\tilde{Y}=\tilde{R}+\hat{Y}$.

According to a second variant embodiment, the transforms are grouped hierarchically. This corresponds to the generic case presented with reference to FIG. 15 wherein the mapping mappingIntraTrMacroGrp maps the index of each of the m intra prediction modes to the index trMacroGrpIdx∈[ 0, n−1] of a macro group. According to this second variant, if a block is predicted by the added neural network-based intra prediction mode, the index trMacroGrpIdx∈[ 0, n−1] of the macro group containing the used transform is not written to the bitstream. Instead, it is inferred from the context of this block by the neural network-based intra prediction mode. This inference on the encoder and decoder sides can be straightforwardly deduced from FIG. 17 and FIG. 18 by grouping the transforms hierarchically and substituting trGrpIdx with trMacroGrpIdx.

Figure 21:
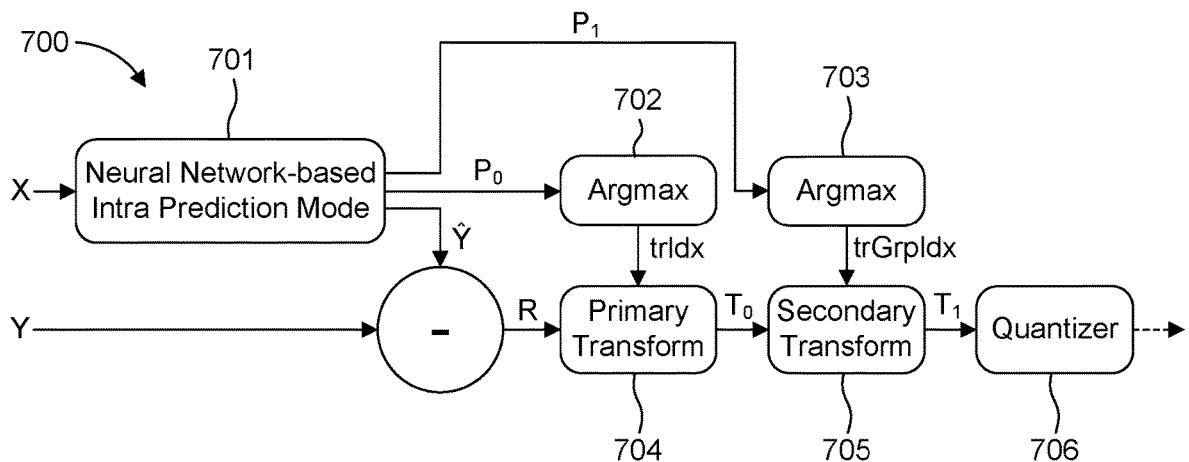
Figure 22:
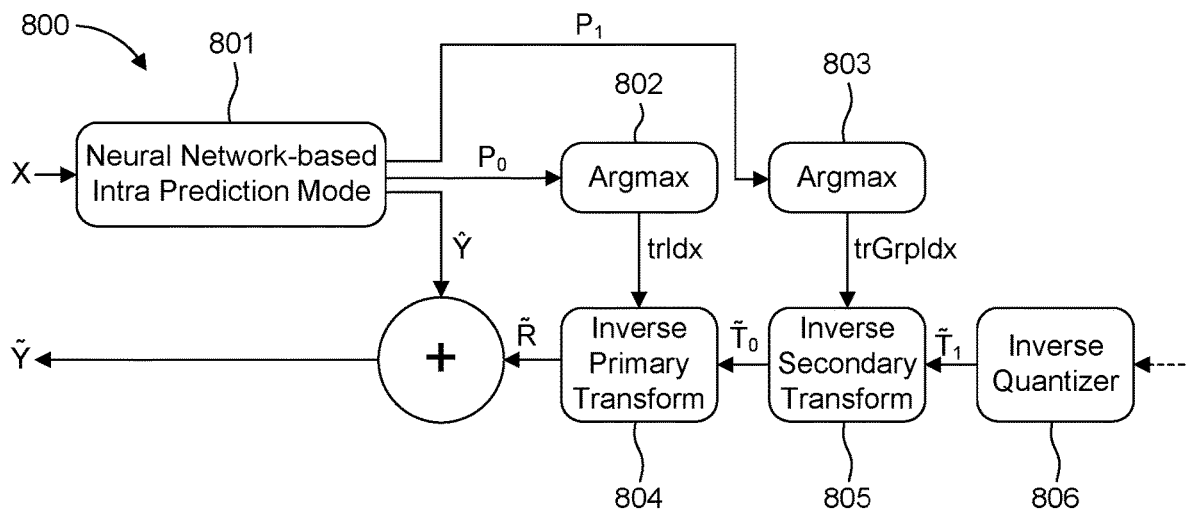

According to a third variant embodiment, the indices of different types of transforms are inferred from neural network-based intra prediction mode. In the case of a block predicted by the added neural network-based intra prediction mode, the indices of several different used transforms can be inferred from the context of this block by the neural network-based mode. FIGS. 21 and 22 illustrates a third variant embodiment respectively combining the exemplary embodiments of FIG. 17 and FIG. 18 with the exemplary embodiments of FIG. 19 and FIG. 20.

The portion of the encoder (700) resulting from the combination is depicted in FIG. 21. According to this variant, the neural network-based intra prediction mode infers both trIdx and trGrpIdx on the encoder side. The neural network-based intra prediction mode (701) computes from the context X of the block Y a prediction $\hat{Y}$ of Y, the vector $P_0 \in [0, 1]^{n_0}$ whose coefficient of index j is the probability that trIdx=j, and the vector $P_1 \in [0, 1]^{n_1}$ whose coefficient of index k is the probability that trGrpIdx=k. Then, trIdx=argmax($P_0$) (702). trGrpIdx=argmax($P_1$) (703). The residue of prediction $R=Y-\hat{Y}$ is fed into the primary transform (704) of index trIdx. The resulting primary transform coefficients $T_0$ are fed into the secondary transform (705) belonging to the group of secondary transforms of index trGrpIdx. In this group, the index of the used transform (belonging to $[\![0, p-1]\!]$) is optionally written to the bitstream. Alternatively, it may be inferred from available information. The resulting secondary transform coefficients $T_1$ are fed into the quantizer (706).

The portion of the decoder (800) resulting from the combination is shown on FIG. 22. According to this variant, the neural network-based intra prediction mode infers both trIdx and trGrpIdx on the decoder side. The neural network-based intra prediction mode (801) computes from the context X of the current block a prediction $\hat{Y}$ of this block, $P_0$, and $P_1$. Then, trIdx=argmax($P_0$) (802). trGrpIdx=argmax($P_1$) (803). The inverse quantizer (806) provides the reconstructed secondary transform coefficients $\tilde{T}_1$. The inverse secondary transform (805), belonging to the group of inverse secondary transforms of index trGrpIdx, turns $\tilde{T}_1$ into the reconstructed primary transform coefficients $\tilde{T}_0$. In this group, the index of the used inverse transform (belonging to $[\![0, p-1]\!]$) is read from the bitstream if the encoder wrote it into the bitstream. It is inferred from available information if the encoder did so. The inverse primary transform (804) of index trIdx computes the reconstructed residue $\tilde{R}$ from $\tilde{T}_0$. Finally, the reconstructed block is $\hat{Y}=\tilde{R}+\hat{Y}$.

In FIG. 21 and FIG. 22, the third variant embodiment is illustrated when the primary transforms are not grouped and the secondary transforms are grouped. However, the third variant embodiment also applies when the primary transforms are either not grouped, grouped or hierarchically grouped. The same goes for the secondary transforms, the ternary transforms or any additional transforms. Then, the neural network-based intra prediction mode is designed to infer a vector of probability from which any trIdx, trGrpIdx, trMacroGrpIdx is computed via argmax.

According to a fourth variant embodiment, various additional inputs are fed into the neural network-based intra prediction mode. The additional of inputs does not modify the core of the disclosed approach. These additional inputs can be
- the Quantization Parameter (QP) used to encode and decode the blocks that are either partially or fully included in the context of the current block
- the index of the intra prediction mode used to predict the block that is located at the top-right of the context of the current block, if the block at the top-right of the context is predicted in intra
- the index of the intra prediction mode used to predict the block that is located at the bottom-left of the context of the current block, if the block at the bottom-left of the context is predicted in intra.

Note that, for any other block that is either partially or fully included in the context of the current block, if this block is predicted in intra, the index of the intra prediction mode used to predict this block can also be fed into the neural network-based intra prediction mode.

Figure 23:
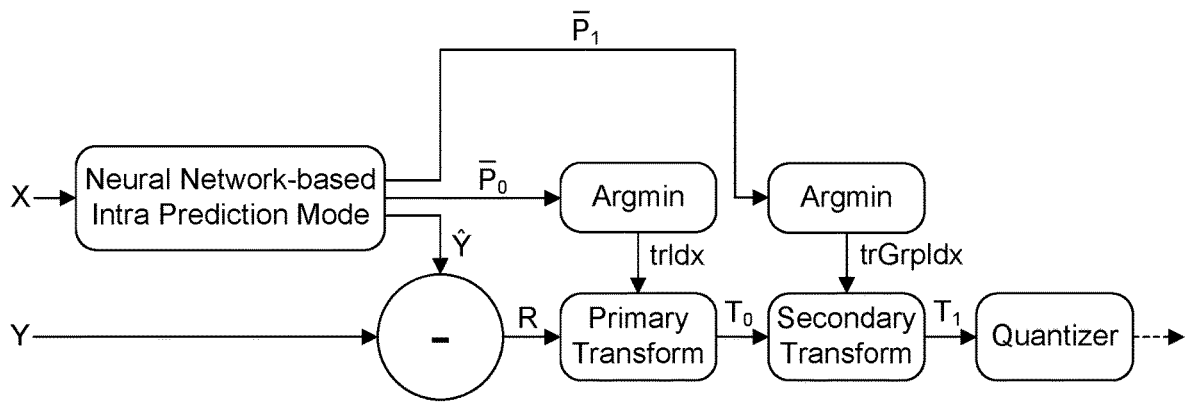
Figure 24:
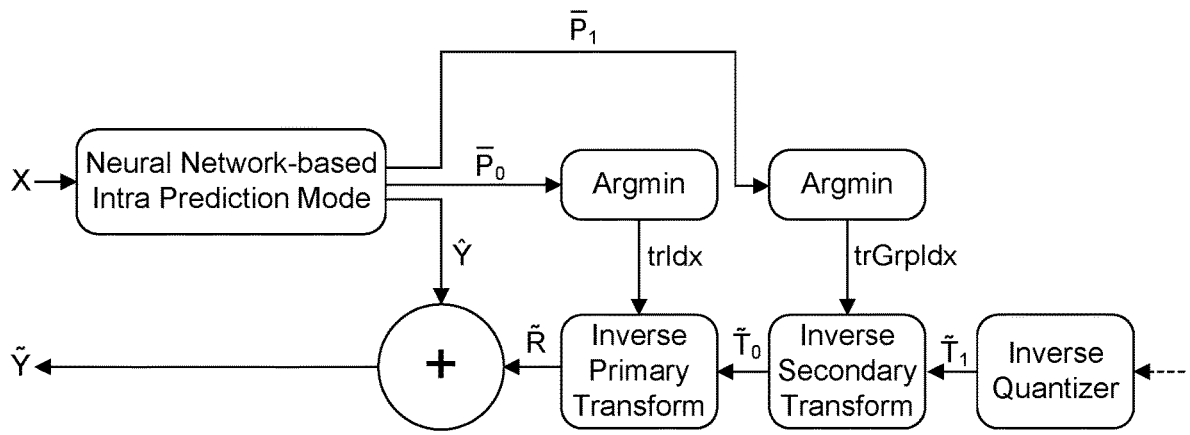

According to a fifth variant embodiment, the output of the neural network-based intra prediction changes. FIG. 23 illustrates a neural network-based intra prediction mode inferring both trIdx and trGrpIdx on the encoder side using the fifth variant embodiment. FIG. 24 illustrates neural network-based intra prediction mode inferring both trIdx and trGrpIdx on the decoder side using the fifth variant embodiment. As described above, the neural network-based intra prediction mode returns at least one vector whose coefficient of index j is the probability that a transform index (or transform group index or a transform macro group index) is equal to j. Instead, the neural network-based intra prediction mode can return any scalar/vector/tensor from which the transform index of interest (or transform group index or a transform macro group index) can be computed. Then, argmax is replaced by the transformation allowing the computation.

For example, in the third variant embodiment, if the neural network-based intra prediction mode returns the vector $\overline{P}_0 \in (\mathbb{R}_+)^{n_0}$ whose coefficient of index j is the opposite log-probability that trIdx=j and the vector $\overline{P}_1 \in (\mathbb{R}_+)^{n_1}$ whose coefficient of index k is the opposite log-probability that trGrpIdx=k instead of $P_0$ and $P_1$, each argmax is replaced by argmin, as shown on FIG. 23 and FIG. 24.

Figure 25:
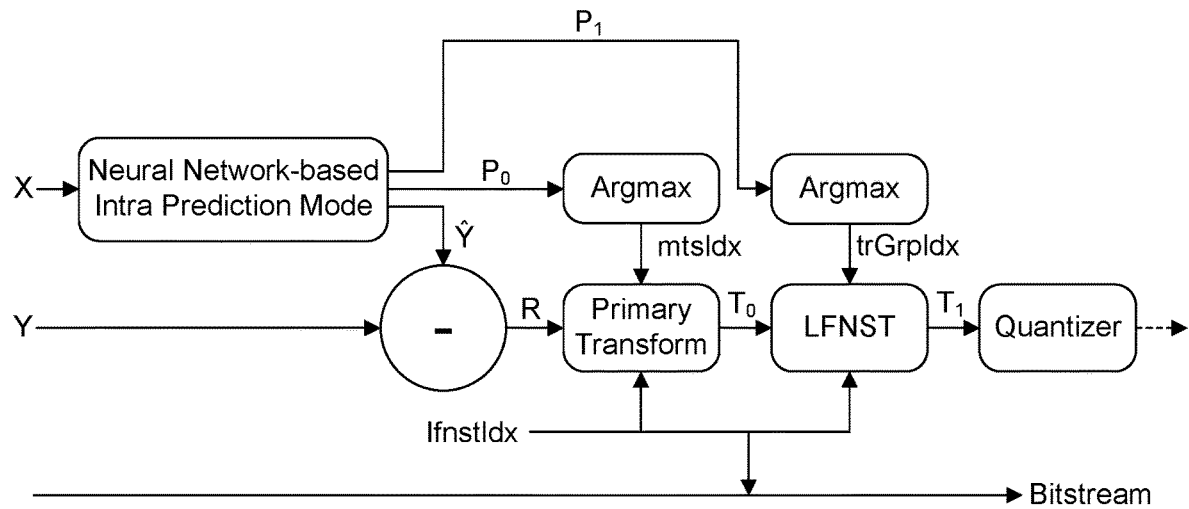
Figure 26:
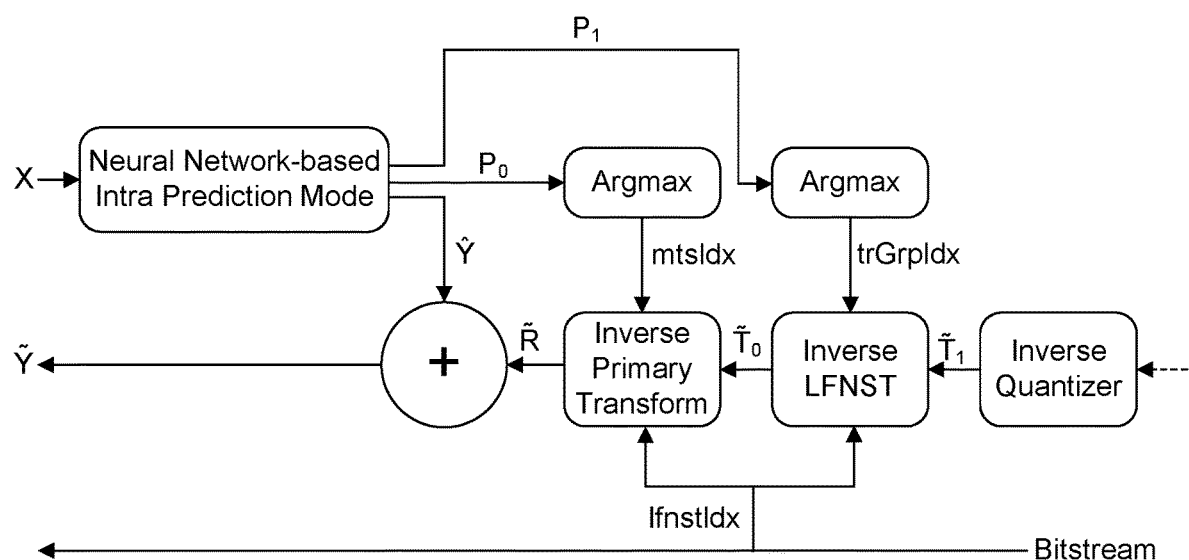

According to a sixth variant embodiment, additional outputs are returned by the neural network-based intra prediction. The additional of outputs does not change the core of the proposed approach. These additional outputs can be
- the Quantization Parameter (QP) to be applied to encode and decode the block predicted by the neural network-based intra prediction mode
- a prediction of the QP to be applied to encode and decode the block predicted by the neural network-based intra prediction mode According to a seventh variant embodiment, the inference of the transform indices by the neural network-based intra prediction mode can be straightforwardly applied to VVC. FIG. 25 illustrates the neural network-based intra prediction mode inferring mtsIdx and trGrpIdx on the encoder side. FIG. 26 illustrates the neural network-based intra prediction mode inferring mtsIdx and trGrpIdx on the decoder side. More specifically, this example derives from the third variant embodiment described above, which explains the inference of the indices of different types of transforms by the neural network-based mode. m=67, excluding the MIP modes. The signaling of LFNST in the case of a luminance CB predicted via a MIP mode as previously explained.

Let the current luminance CB be predicted by the added neural network-based intra prediction mode. In this case, mtsIdx∈{0, 1, 2, 3, 4} is inferred from the context of the CB by the neural network-based intra prediction mode instead of being written to the bitstream as shown on FIG. 25 and FIG. 26. Therefore, $n_0$=5. As usual, lfnstIdx∈{0, 1, 2} is signaled in the bitstream. The index trGrpIdx∈$[\![0, 6]\!]$ of the used group of a set of 2 LFNST matrices and the decision of transposing the primary transform coefficients (c.f. Table 4) is inferred from the context of the CB by the neural network-based intra prediction mode as shown on FIG. 25 and FIG. 26. Thus, $n_1$=7.

Note that, in FIG. 25, lfnstIdx is inserted into the primary transform as, if lfnstIdx is equal to 0, the primary transform is indicated by mtsIdx. Otherwise, the primary transform is (DCT2, DCT2), similarly to FIG. 2. The same goes for FIG. 26.

For the sake of clarity, we consider in the following that the neural network-based intra prediction mode is applied to determine a prediction of a given CB, not a TB. In other words, although the neural network-based intra prediction is compatible with a tool such as ISP in VVC, the exemplary embodiments are described for the case where a CB is equivalent to a TB, that is a tool such as ISP is disabled.

Figure 27:
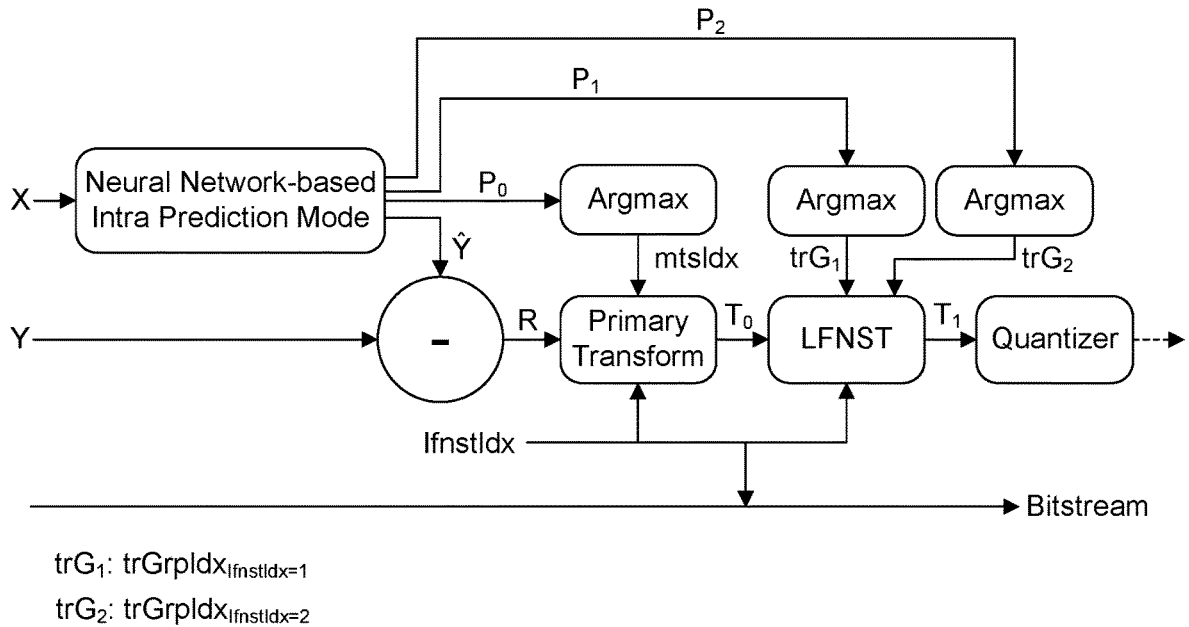
Figure 28:
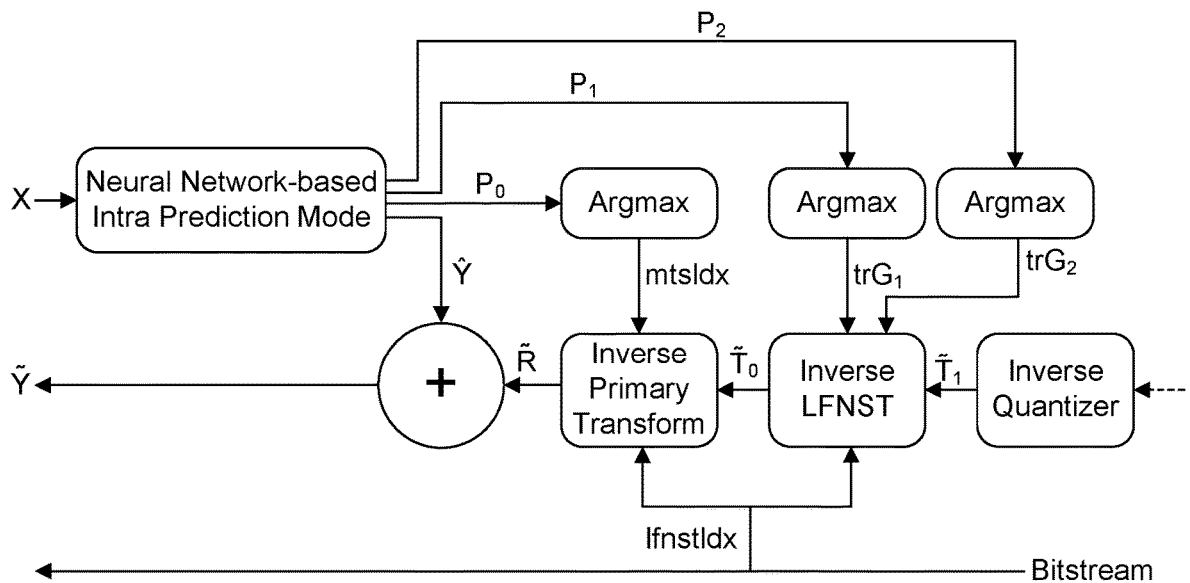

According to an eighth variant embodiment, the inference of the transform indices by the neural network-based mode is applied to VVC, and, for the current CB predicted by the neural network-based intra prediction mode, the index trGrpIdx$_{lfnstIdx=1}$∈⟦0, 6⟧ used when lfnstIdx is equal to 1 and the index trGrpIdx$_{lfnstIdx=2}$∈⟦0, 6⟦ used when lfnstIdx is equal to 2 are inferred from the context of the current CB by the neural network-based intra prediction mode instead of trGrpIdx. FIG. 27 and FIG. 28 respectively illustrate a modified version of FIG. 25 and FIG. 26 according to the eighth variant embodiment.

FIG. 27 illustrates a neural network-based intra prediction mode inferring mtsIdx, trGrpIdx$_{lfnstIdx=1}$, and trGrpIdx$_{lfnstIdx=2}$ on the encoder side. The neural network-based intra prediction mode computes from the context X of the block Y a prediction Ŷ of Y, the vector $P_0$∈[0, 1]$^5$ whose coefficient of index j is the probability that mtsIdx=j, the vector $P_1$∈[0, 1]$^7$ whose coefficient of index k is the probability that trGrpIdx$_{lfnstIdx=1}$=k, and the vector $P_2$∈[0, 1]$^7$ whose coefficient of index l is the probability that trGrpIdx$_{lfnstIdx=2}$=l. Then, mtsIdx=argmax($P_0$). trGrpIdx$_{lfnstIdx=1}$=argmax($P_1$). trGrpIdx$_{lfnstIdx=2}$=argmax($P_2$). The residue of prediction R=Y−Ŷ is fed into the primary transform of index mtsIdx. If lfnstIdx=1, trGrpIdx=trGrpIdx$_{lfnstIdx=1}$. If lfnstIdx=2, trGrpIdx=trGrpIdx$_{lfnstIdx=2}$. The resulting primary transform coefficients $T_0$ are fed into LFNST using the LFNST matrix of index lfnstIdx in the group of index trGrpIdx. The resulting secondary transform coefficients $T_1$ are fed into the quantizer. lfnstIdx is signaled in the bitstream.

FIG. 28 illustrates a neural network-based intra prediction mode inferring mtsIdx, trGrpIdx$_{lfnstIdx=1}$, and trGrpIdx$_{lfnstIdx=2}$ on the decoder side. lfnstIdx is read from the bitstream. The neural network-based intra prediction mode computes from the context X of the current block a prediction Ŷ of this block, $P_0$, $P_1$, and $P_2$. Then, mtsIdx=argmax($P_0$). trGrpIdx$_{lfnstIdx=1}$=argmax($P_1$). trGrpIdx$_{lfnstIdx=2}$=argmax($P_2$). The inverse quantizer gives the reconstructed secondary transform coefficients $\tilde{T}_1$. If lfnstIdx=1, trGrpIdx=trGrpIdx$_{lfnstIdx=1}$. If lfnstIdx=2, trGrpIdx=trGrpIdx$_{lfnstIdx=2}$. $\tilde{T}_1$ is turned into the reconstructed primary transform coefficients $\tilde{T}_0$ by the inverse LFNST using the LFNST matrix of index lfnstIdx in the group of index trGrpIdx. The inverse primary transform of index mtsIdx computes the reconstructed residue $\tilde{R}$ from $\tilde{T}_0$. Finally, the reconstructed block is $\tilde{Y}$=$\tilde{R}$+Ŷ.

According to a ninth variant embodiment, the approach described above wherein the neural network-based mode infers the transforms indices is generalized to the case of transforms that are learned on the encoder side. Then, the transform parameters are transmitted from the encoder to the decoder. Finally, the decoder recovers the learned transforms by reading their parameters from the bitstream.

A non-limiting example of the third variant embodiment adapted to transmitted learned transforms is described below. In this example, it is assumed that only the primary transforms are learned. It is also assumed that the primary transforms for a given frame are learned before encoding this frame, using data from the past reconstructed frames.

Figure 29:
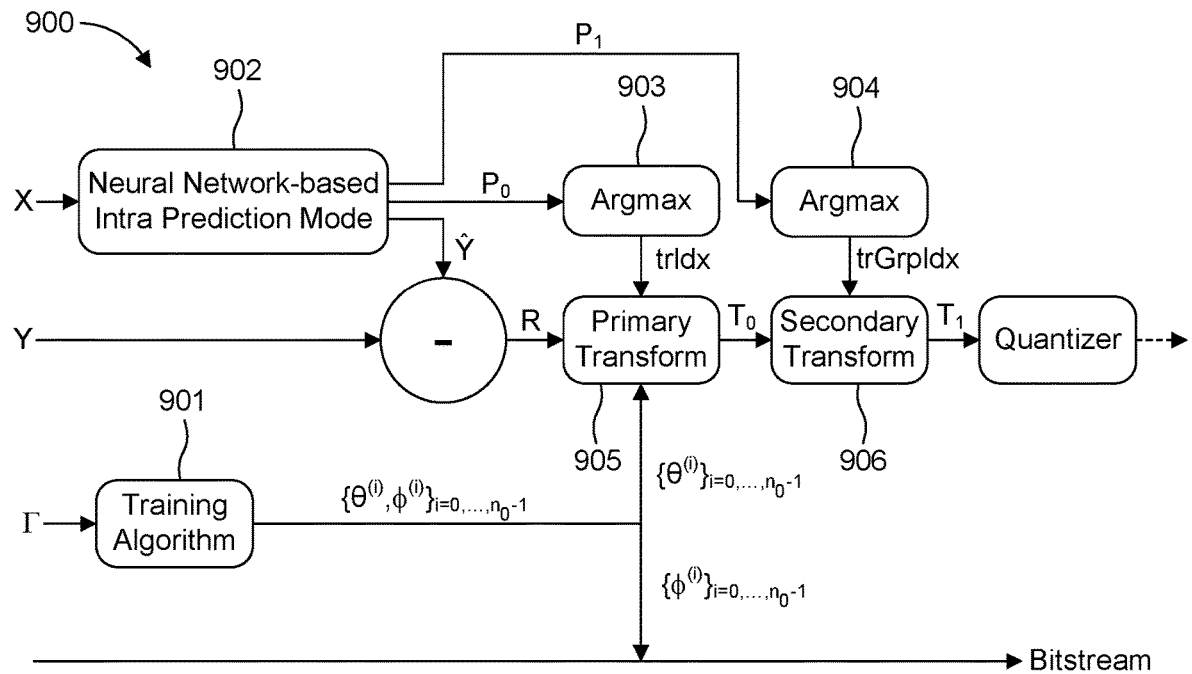
Figure 30:
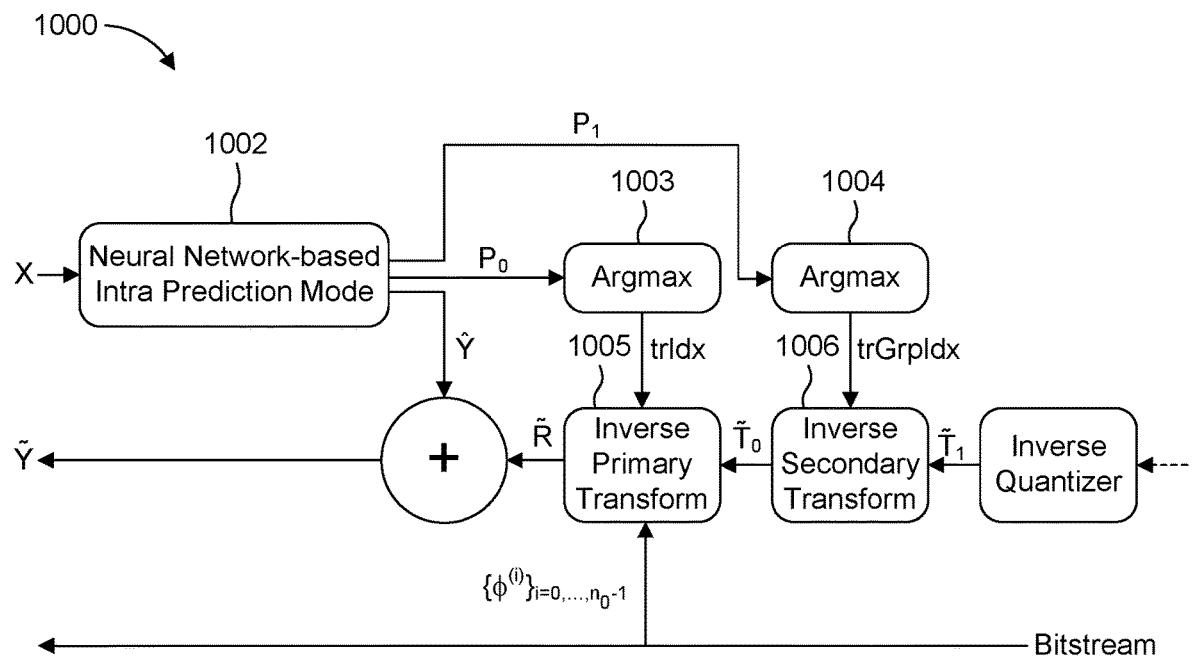

FIG. 29 illustrates a neural network-based intra prediction mode inferring both trIdx and trGrpIdx on the encoder (900) side when the primary transforms are learned on the encoder side and their parameters are transmitted from the encoder to the decoder. The training algorithm (901) takes a training set F of data extracted from the past reconstructed frames to generate the parameters $\{\theta^{(i)}\}_{i=0, \ldots, n_0-1}$ of the $n_0$ primary transforms and the parameters $\{\phi^{(i)}\}_{i=0, \ldots, n_0-1}$ of the $n_0$ inverse primary transforms for the current frame. $\{\phi^{(i)}\}_{i=0, \ldots, n_0-1}$ is encoded and written to the bitstream. Now, let us focus on the block Y at the position (x, y) in the current frame. The neural network-based intra prediction mode (902) creates from the context X of Y a prediction Ŷ of Y, $P_0$, and $P_1$. Then, trIdx=argmax($P_0$) (903). trGrpIdx=argmax($P_1$) (904). The residue of prediction R=Y−Ŷ is fed into the learned primary transform (905) of index trIdx and parameters $\theta^{(trIdx)}$. The resulting primary transform coefficients $T_0$ are fed into the secondary transform (906) belonging to the group of secondary transforms of index trGrpIdx. In this group, the index of the used transform (belonging to ⟦0, p−1⟧) is eventually written to the bitstream. Alternatively, it may be inferred from available information. The resulting secondary transform coefficients $T_1$ are fed into the quantizer. FIG. 30 illustrates a neural network-based intra prediction mode inferring both trIdx and trGrpIdx on the encoder (1000) side when the primary transforms are learned on the encoder side and their parameters are transmitted from the encoder to the decoder. The parameters $\{\phi^{(i)}\}_{i=0, \ldots, n_0-1}$ of the $n_0$ inverse primary transforms for the current frame are read from the bitstream and decoded. Now, let us say that the block Y at the above-mentioned position (x, y) in the current frame must be decoded. The neural network-based intra prediction mode (1002) computes from the context X of Y a prediction Ŷ, $P_0$, and $P_1$. Then, trIdx=argmax($P_0$) (1003). trGrpIdx=argmax($P_1$) (1004). The inverse quantizer provides the reconstructed secondary transform coefficients $\tilde{T}_1$. The inverse secondary transform (1006), belonging to the group of inverse secondary transforms of index trGrpIdx, turns $\tilde{T}_1$ into the reconstructed primary transform coefficients $\tilde{T}_0$. In this group, the index of the used inverse transform (belonging to ⟦0, p−1⟧) is read from the bitstream if the encoder wrote it into the bitstream. It is inferred from available information if the encoder did so. The inverse primary transform (1005) of index trIdx and parameters $\phi^{(trIdx)}$ computes the reconstructed residue $\tilde{R}$ from $\tilde{T}_0$. Finally, the reconstructed block is $\tilde{Y}$=$\tilde{R}$+Ŷ.

This example can be straightforwardly extended to the case of transmitted learned secondary transforms, transmitted learned ternary transforms, and so on. Note that, in the above example, the transforms are learned for a given frame, before encoding this frame. This can be straightforwardly extended to the case of transforms learned at a different level. For instance, the transforms can be learned for a given group of t frames, before encoding this group. Also note that, in the above example, a learned transform and its inverse transform have different parameters. But, they can be identical. Finally, unlike in the above example, only a subset of the transforms of a given type can be learned, the remaining transforms of this type being fixed and known at both the encoder and decoder sides throughout the encoding and the decoding.

According to a tenth variant embodiment, the learned neural network-based intra prediction mode itself is transmitted to the decoder. In the different propositions of the previous embodiments and its variants, instead of learning the neural network-based intra prediction mode offline and fixing it at both the encoder and decoder sides throughout the encoding and decoding, this mode can be learned on the encoder side. Then, its parameters are transmitted from the encoder to the decoder. Finally, the decoder recovers the neural network-based intra prediction mode by reading its parameters from the bitstream.

Figure 31:
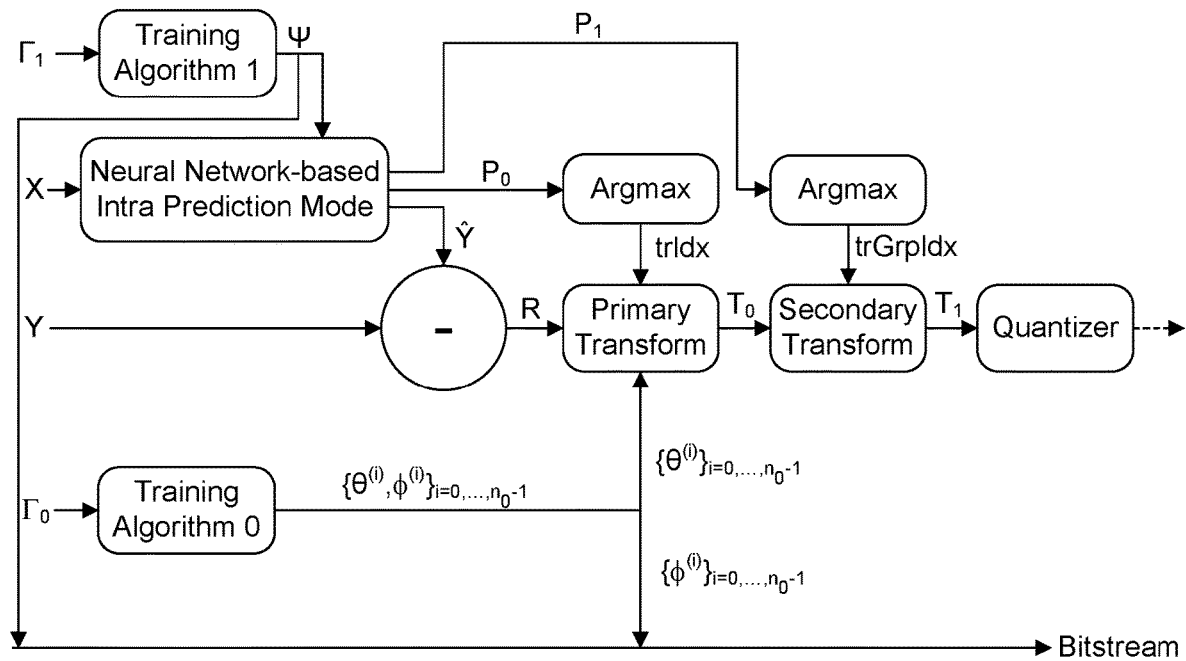

FIG. 31 illustrates a neural network-based intra prediction mode inferring both trIdx and trGrpIdx on the encoder side when both the neural network-based intra prediction mode and the primary transforms are learned on the encoder side and their parameters are transmitted from the encoder to the decoder.

Figure 32:
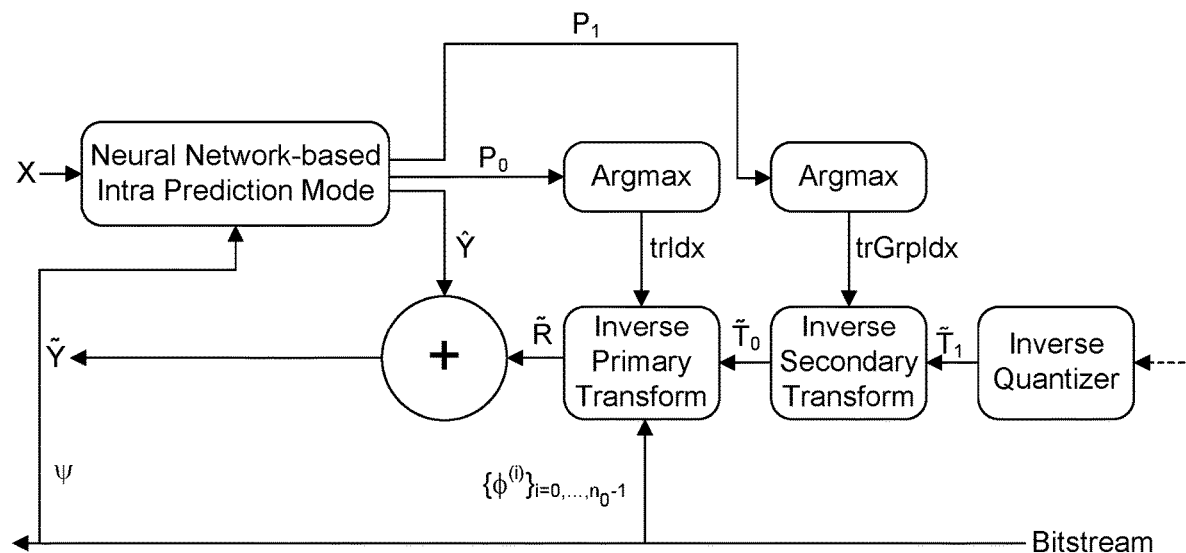

FIG. 32 illustrates neural network-based intra prediction mode inferring both trIdx and trGrpIdx on the decoder side when both the neural network-based intra prediction mode and the primary transforms are learned on the encoder side and their parameters are transmitted from the encoder to the decoder.

On FIG. 31 and FIG. 32, the parameters ψ of the different neural networks in the neural network-based intra prediction mode are transmitted from the encoder to the decoder.

According to an eleventh variant embodiment, the inference of the transform indices by the neural network-based mode is applied to VVC for a CU in separate tree in luminance and chrominance wherein a current chrominance CB is predicted by a CCLM mode. Advantageously, the index (trGrpIdx$^Y$) representative of a group of 2 LFNST matrices with the decision of transposing the primary transform coefficients is inferred for luminance component and a transform method to apply for decoding the chrominance components of the image block is determined from said index (trGrpIdx$^Y$) representative of a group of 2 LFNST matrices with the decision of transposing the primary transform coefficients of a collocated luminance components according to the value of the respective lfnstIdx.

Figure 33:
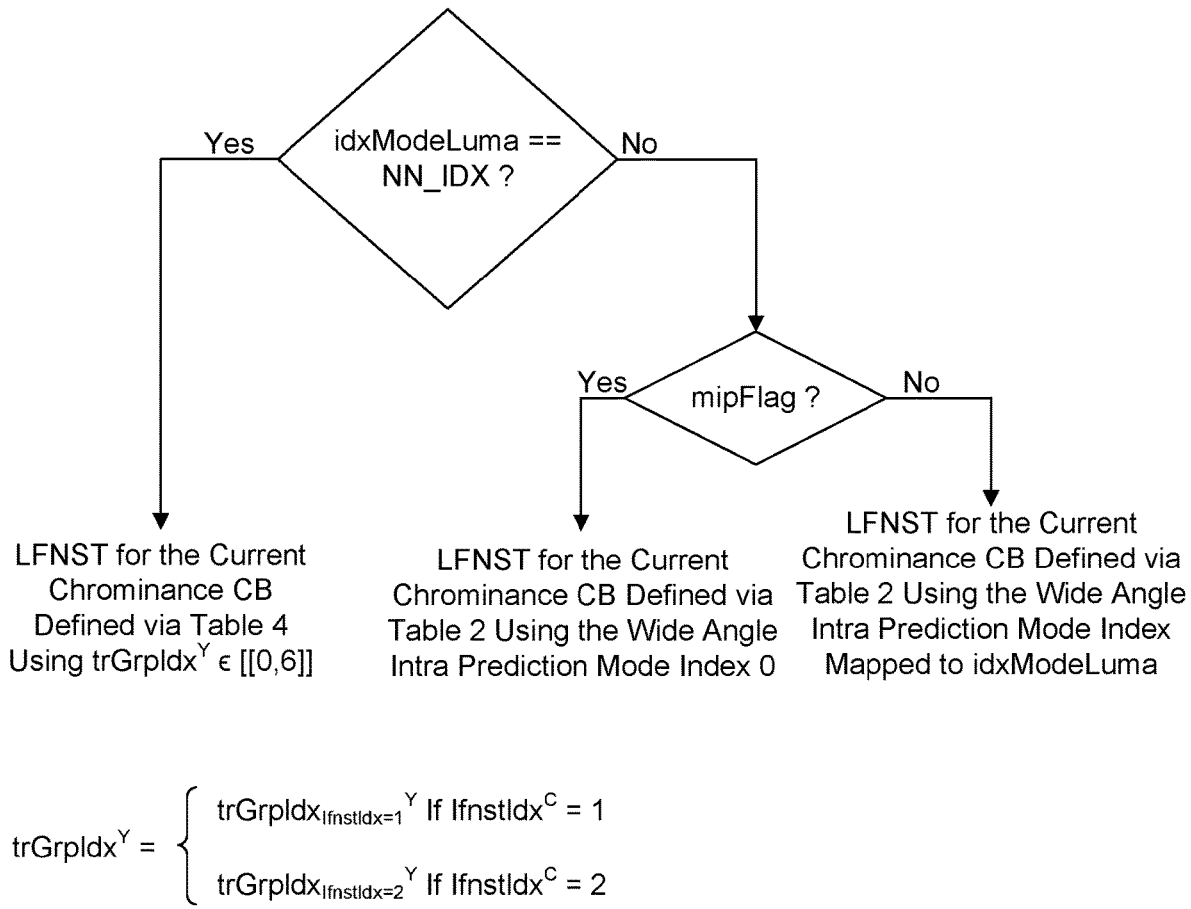

FIG. 33 illustrates a neural network-based intra prediction method inferring an information on a transform to apply in a video decoder according to the eleventh variant embodiment. For a CU in separate tree in chrominance, if the current chrominance CB is predicted by a CCLM mode, if the LFNST index for this CU lfnstIdx$^C \in \{1, 2\}$, LFNST for the current chrominance CB is defined as follows. If the index idxModeLuma of the intra prediction mode selected to predict the luminance CB that is collocated with the current chrominance CB is equal to the index NN_IDX of the neural network-based intra prediction mode, LFNST for the current chrominance CB is defined via Table 4 using the LFNST group index trGrpIdx$^Y$. If lfnstIdx$^C$=1, trGrpIdx$^Y$=trGrpIdx$_{lfnstIdx=1}^Y$. If lfnstIdx$^C$=2, trGrpIdx$^Y$=trGrpIdx$_{lfnstIdx=2}^Y$. trGrpIdx$_{lfnstIdx=1}^Y$ and trGrpIdx$_{lfnstIdx=2}^Y$ denote the LFNST group indices the neural network-based intra prediction mode inferred when predicting this collocated luminance CB. Otherwise, LFNST for the current chrominance CB is defined as in VVC, i.e. as explained under Table 2. In FIG. 33, mipFlag=1 means that this collocated luminance CB is predicted by a MIP mode. mipFlag=0 indicates that this collocated luminance CB is predicted by a non-MIP mode. Note that the eleventh variant embodiment does not deal with a CU not in separate tree as, for a CU not in separate tree, LFNST is disabled.

According to a twelfth variant embodiment, for a CU in separate tree in chrominance, if the current chrominance CB is predicted by a CCLM mode, if the LFNST index for this CU lfnstIdx$^C \in \{1, 2\}$, LFNST for the current chrominance CB is defined as follows. If the index idxModeLuma of the intra prediction mode selected to predict the luminance CB that is collocated with the current chrominance CB is equal to the index NN_IDX of the neural network-based intra prediction mode, LFNST for the current chrominance CB is defined via Table 2 using wide angle intra prediction mode index t, where t is the wide angle intra prediction mode index of any non-MIP intra prediction mode in VVC, t being fixed at both the encoder and decoder sides. Otherwise, LFNST for the current chrominance CB is defined as in VVC.

Neural Network-Based Mode Predicting the Transform Indices

In the section "Neural network-based mode inferring the transform indices", the neural network-based intra prediction mode infers from the context of the current block a prediction of this block and the needed transform indices. Differently, any transform index inferred by the neural network-based intra prediction mode can be replaced by a prediction of this transform index. This replacement can apply to any of the twelve variant embodiments in the section "Neural network-based mode inferring the transform indices". To be more precise, the third, seven, and eight variant embodiments in the section "Neural network-based mode inferring the transform indices" are adapted to the current case below.

Figure 34:
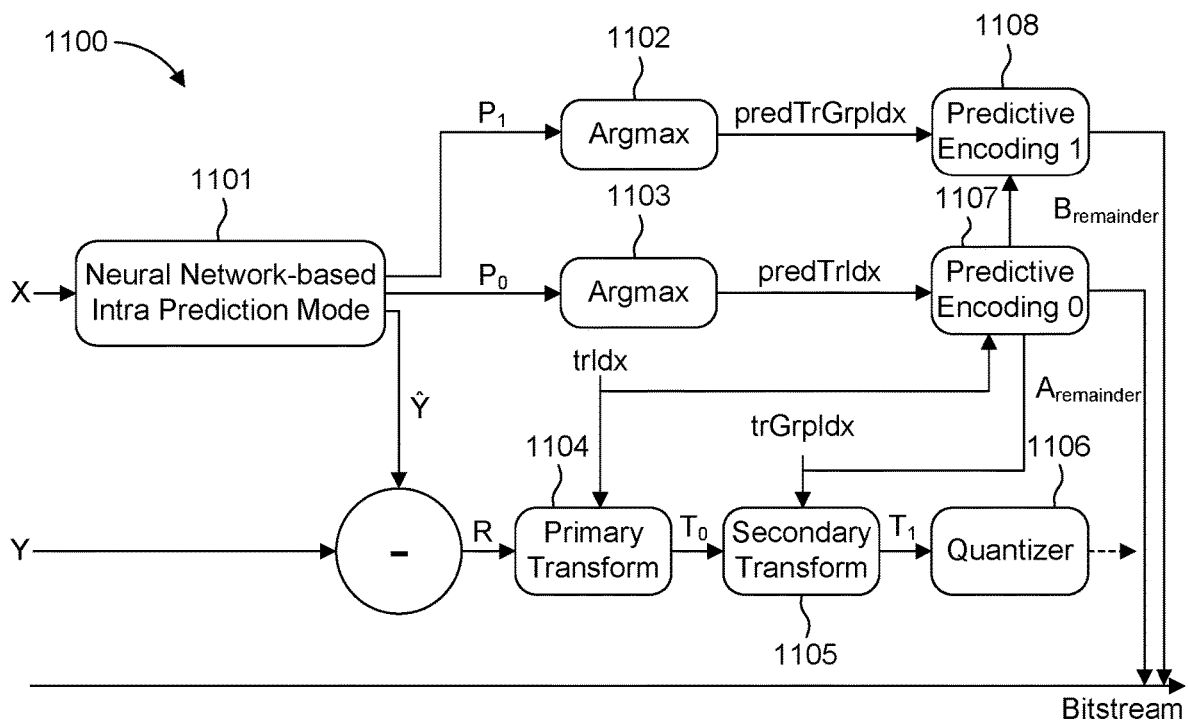
FIGS. 34, 37, 40, 42, 44, 46 illustrate different variants of a neural network-based intra prediction method inferring an information on a transform to apply in a video encoder according to at least one embodiment, wherein the information is a prediction of transform group indices and/or a prediction of transform indices.
Figure 35:
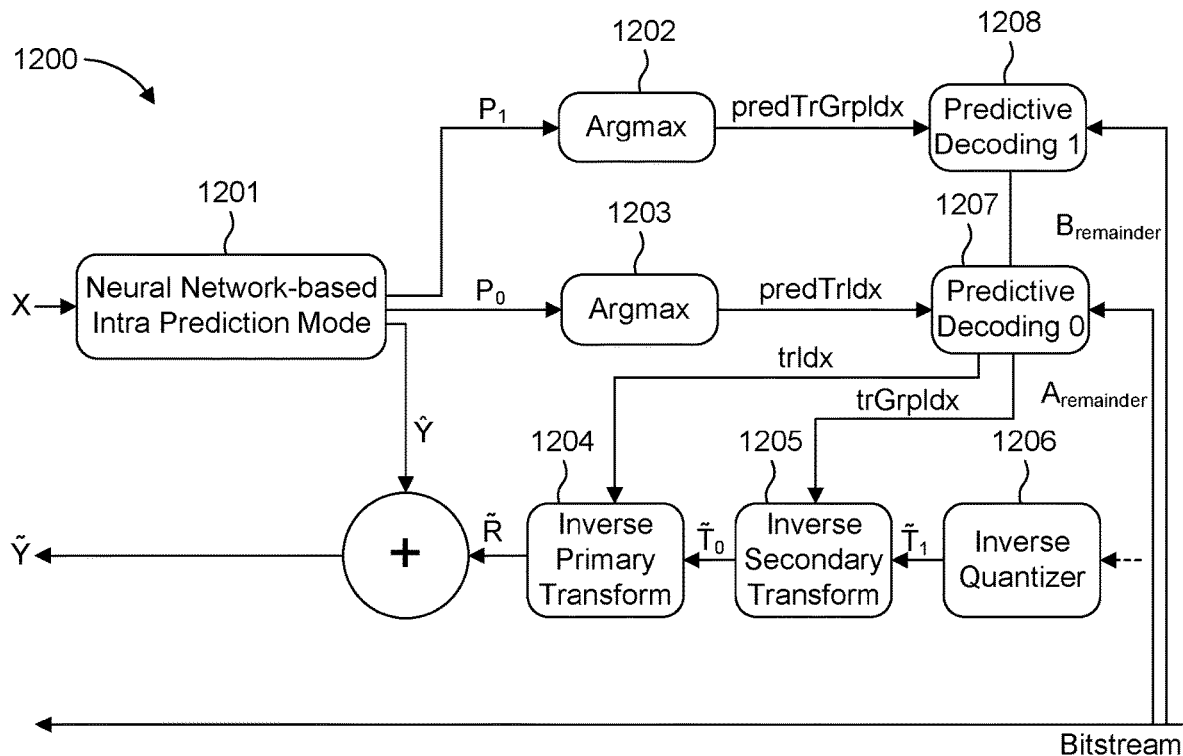
FIGS. 35, 39, 41, 43, 45, 47 illustrate different variants of a neural network-based intra prediction method inferring an information on a transform to apply in a video decoder according to at least one embodiment, wherein the information is a prediction of transform group indices and/or a prediction of transform indices.

According to a first variant embodiment of the predictive coding of transform indices, an adaptation of the third variant embodiment in the section "Neural network-based mode inferring the transform indices" is illustrated in FIG. 34 and FIG. 35.

FIG. 34 illustrates a neural network-based intra prediction mode returning both the prediction predTrIdx of trIdx and the prediction predTrGrpIdx of trGrpIdx on the encoder side. The indices trIdx and trGrpIdx in gray are found by the encoder via rate-distortion optimization. The portion of the encoder (1100) is presented in FIG. 34. The neural network-based intra prediction mode (1101) computes from the context X of the block Y a prediction Ŷ of Y, the vector $P_0 \in [0, 1]^{n_0}$ whose coefficient of index j is the probability that the prediction predTrIdx of trIdx is equal to j, and the vector $P_1 \in [0, 1]^{n_1}$ whose coefficient of index k is the probability that the prediction predTrGrpIdx of trGrpIdx is equal to k. Then, predTrIdx=argmax($P_0$) (1103). predTrGrpIdx=argmax($P_1$) (1102). The residue of prediction R=Y−Ŷ is fed into the primary transform (1104) of index trIdx found by the encoder. The resulting primary transform coefficients $T_0$ are fed into the secondary transform (1105) belonging to the group of secondary transforms of index trGrpIdx found by the encoder. In this group, the index of the used transform (belonging to [[0, p−1]]) is eventually written to the bitstream. Alternatively, it may be inferred from available information. The resulting secondary transform coefficients $T_1$ are fed into the quantizer (1106). A first predictive encoder (1107) encodes trIdx with respect to predTrIdx, yielding the bits $A_{remainder}$ written to the bitstream. A second predictive encoder (1108) encodes trGrpIdx with respect to predTrGrpIdx, yielding the bits $B_{remainder}$ written to the bitstream.

FIG. 35 illustrates a neural network-based intra prediction mode providing both the prediction predTrIdx of trIdx and the prediction predTrGrpIdx of trGrpIdx on the decoder (1200) side. The neural network-based mode (1201) computes from the context X of the current block a prediction Ŷ of this block, $P_0$, and $P_1$. Then, predTrIdx=argmax($P_0$) (1203). predTrGrpIdx=argmax($P_1$) (1202). The decoder associated to the first predictive encoder (1207) decodes trIdx using predTrIdx and the bits $A_{remainder}$ read from the bitstream. The decoder associated to the second predictive encoder (1208) decodes trGrpIdx using predTrGrpIdx and the bits $B_{remainder}$ read from the bitstream. The inverse quantizer (1206) provides the reconstructed secondary transform coefficients $\tilde{T}_1$. The inverse secondary transform (1205), belonging to the group of inverse secondary transforms of index trGrpIdx, turns $\tilde{T}_1$ into the reconstructed primary transform coefficients $\tilde{T}_0$. In this group, the index of the used inverse transform (belonging to 〚 0, p−1〛) is read from the bitstream if the encoder wrote it into the bitstream. It is inferred from available information if the encoder did so. The inverse primary transform (1204) of index trIdx computes the reconstructed residue $\tilde{R}$ from $\tilde{T}_0$. Finally, the reconstructed block is $\hat{Y}=\tilde{R}+\hat{Y}$.

Figure 36:
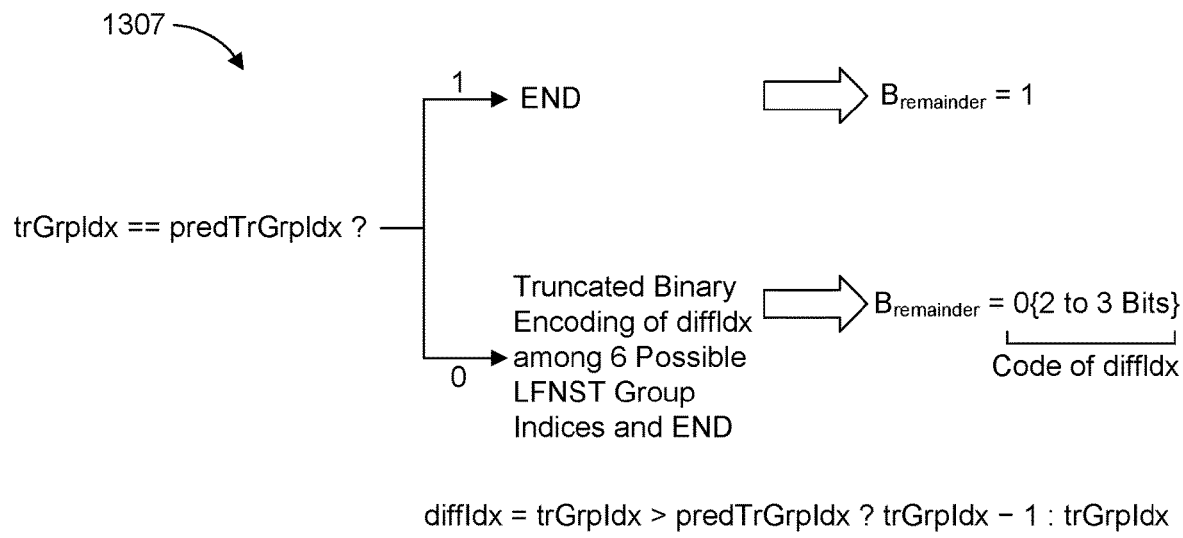
FIG. 36 shows an example of a decision tree representative of the predictive encoding of trGrpIdx with respect to predTrGrpIdx according to at least one embodiment.
Figure 37:
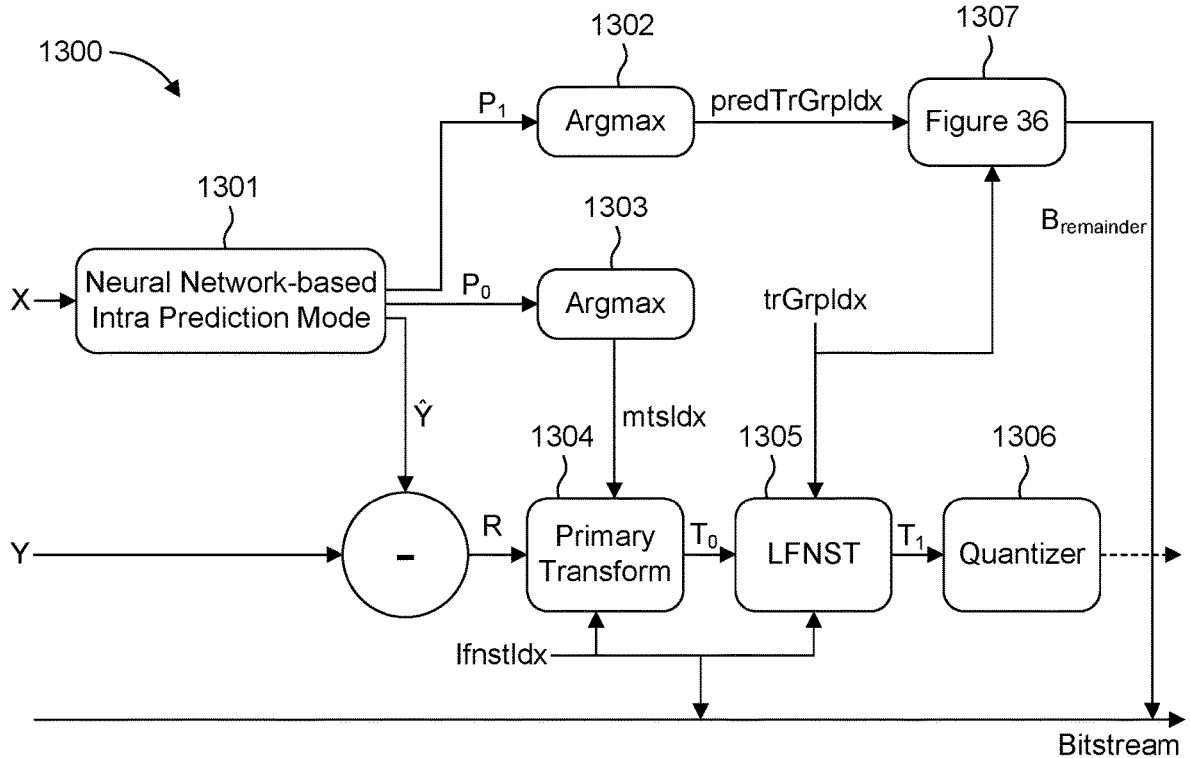

According to a second variant embodiment of the predictive coding of transform indices, an adaptation of the seventh variant embodiment in the section "Neural network-based mode inferring the transform indices" is presented in FIG. 36, FIG. 37, FIG. 38 and FIG. 39. FIG. 37 illustrates a neural network-based intra prediction mode inferring mtsIdx and providing the prediction predTrGrpIdx of trGrpIdx on the encoder (1300) side. The indices trGrpIdx and lfnstIdx in gray are found by the encoder via rate-distortion optimization. The neural network-based intra prediction mode (1301) computes from the context X of the block Y a prediction $\hat{Y}$ of Y, the vector $P_0 \in [0, 1]^5$ whose coefficient of index j is the probability that mtsIdx=j and the vector $P_1 \in [0, 1]^7$ whose coefficient of index k is the probability that the prediction predTrGrpIdx of trGrpIdx is equal to k. Then, mtsIdx=argmax($P_0$) (1303). predTrGrpIdx=argmax($P_1$) (1302). The residue of prediction $R=Y-\hat{Y}$ is fed into the primary transform (1304) of index mtsIdx. The resulting primary transform coefficients $T_0$ are fed into LFNST (1305) using the LFNST matrix of index lfnstIdx found by the encoder in the group of index trGrpIdx found by the encoder. The resulting secondary transform coefficients $T_1$ are fed into the quantizer (1306). lfnstIdx is signaled in the bitstream. The predictive encoder (1307) encodes trGrpIdx with respect to predTrGrpIdx, yielding the bits $B_{remainder}$ written to the bitstream. FIG. 36 illustrates an exemplary decision tree representative of the predictive encoding of trGrpIdx with respect to predTrGrpIdx, yielding the bits $B_{remainder}$. According to an additional variant, the predictive encoder (1307) works as shown on FIG. 36, but, any other predictive encoding scheme is compatible with the present principles.

Figure 38:
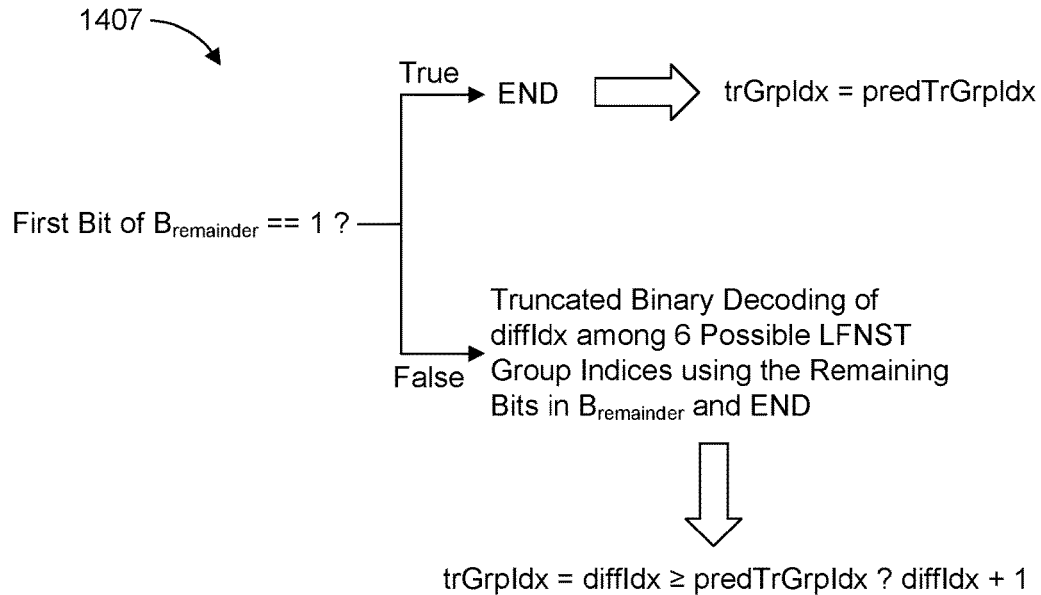
FIG. 38 shows an example of a decision tree representative of the predictive decoding of trGrpIdx with respect to predTrGrpIdx according to at least one embodiment.
Figure 39:
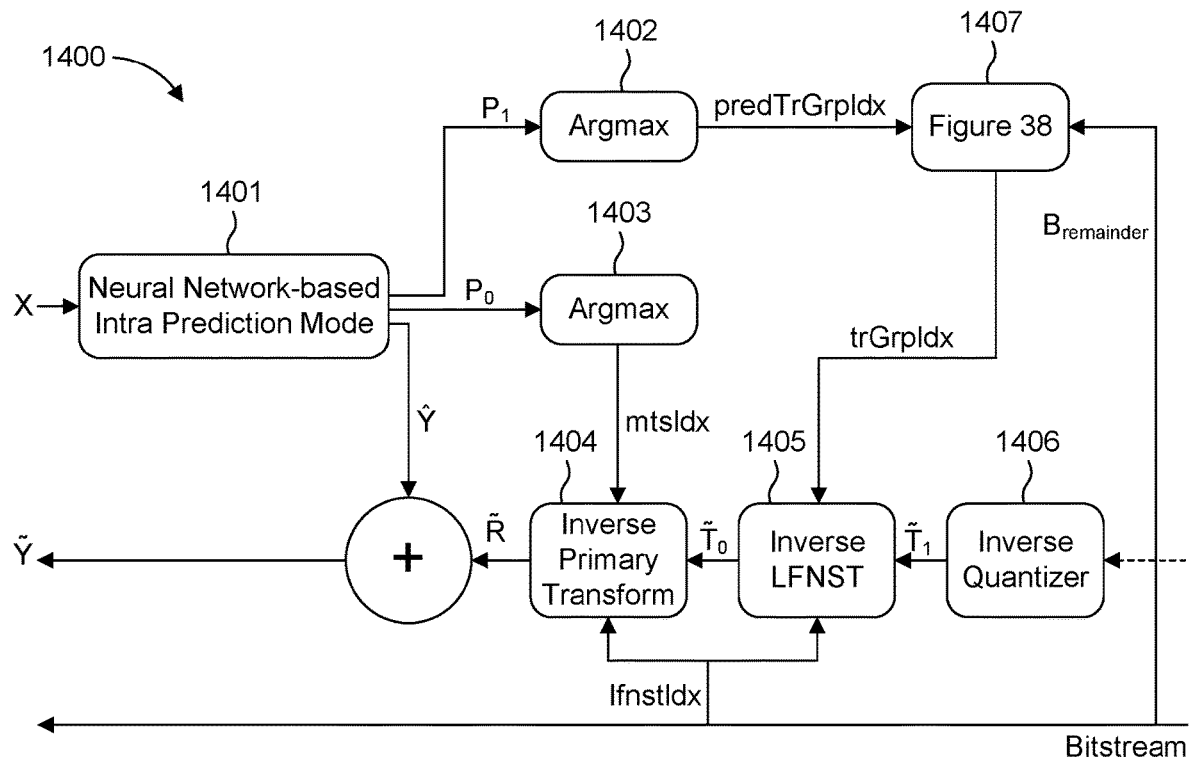

FIG. 39 illustrates neural network-based intra prediction mode inferring mtsIdx and providing the prediction predTrGrpIdx of trGrpIdx on the decoder (1400) side. lfnstIdx is read from the bitstream. The neural network-based intra prediction mode (1401) computes from the context X of the current block a prediction k of this block, $P_0$ and $P_1$. Then, mtsIdx=argmax($P_0$) (1403). predTrGrpIdx=argmax($P_1$) (1402). The decoder associated to the predictive encoder (1407) decodes trGrpIdx using predTrGrpIdx and the bits $B_{remainder}$ read from the bitstream. For instance, FIG. 38 illustrates a decision tree representative of the predictive decoding of trGrpIdx using predTrGrpIdx and the bits $B_{remainder}$. If the predictive encoder of FIG. 36 is used on the encoder side, the associated predictive decoder of FIG. 38 is used. The inverse quantizer (1406) gives the reconstructed secondary transform coefficients $\tilde{T}_1$. $\tilde{T}_1$ is turned into the reconstructed primary transform coefficients $\tilde{T}_0$ by the inverse LFNST (1405) using the LFNST matrix of index lfnstIdx in the group of index trGrpIdx. The inverse primary transform (1404) of index mtsIdx computes the reconstructed residue $\tilde{R}$ from $\tilde{T}_0$. Finally, the reconstructed block is $\tilde{Y}=\tilde{R}+\hat{Y}$.

Figure 40:
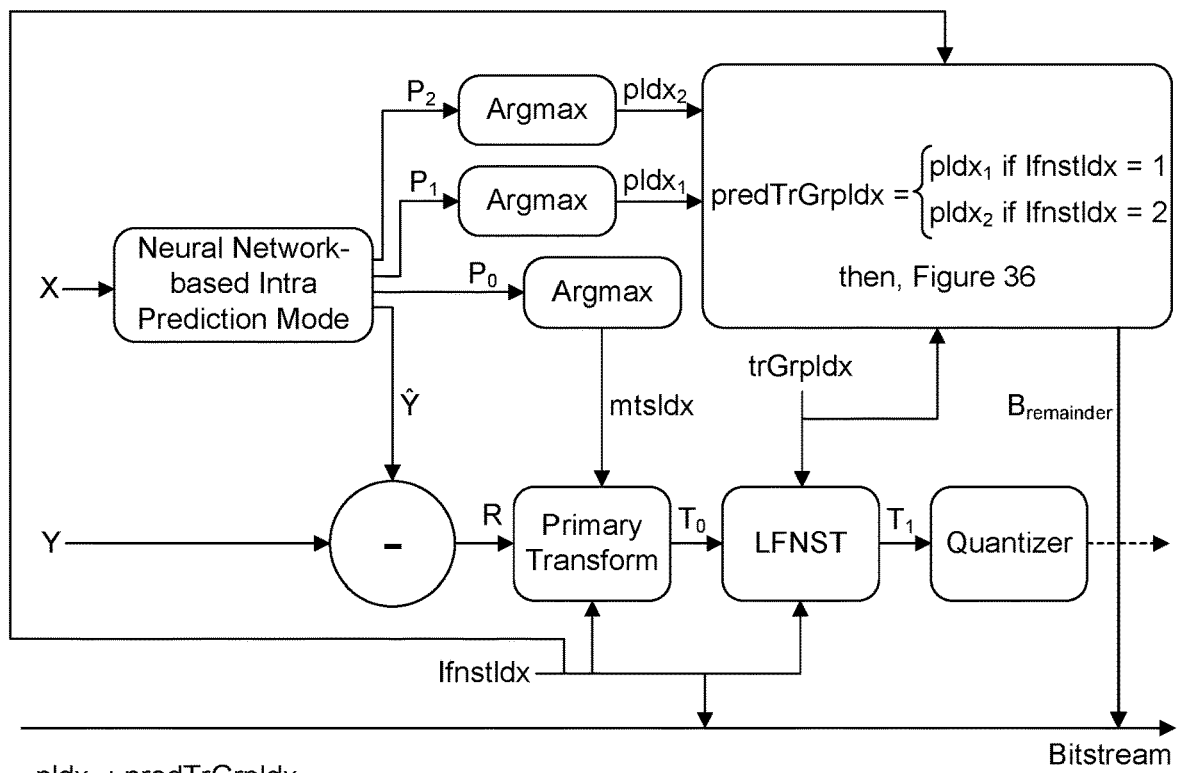
Figure 41:
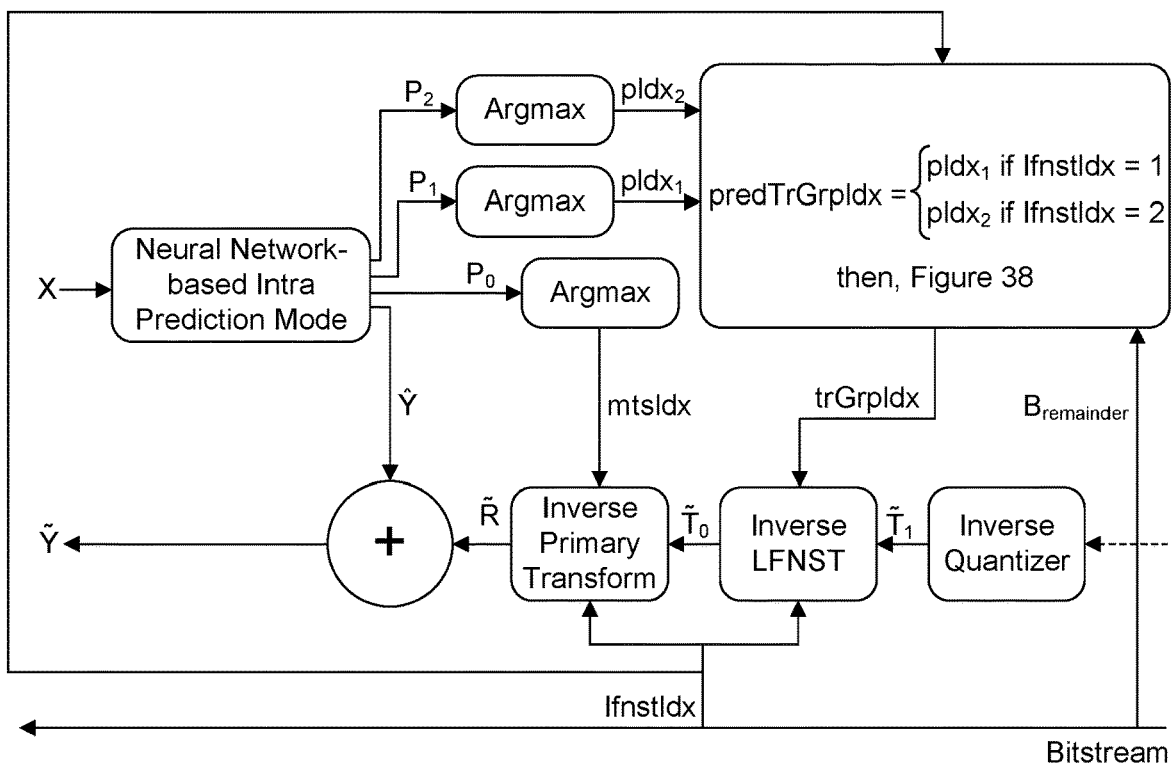

According to a third variant embodiment of the predictive coding of transform indices, an adaptation of the eighth variant embodiment in the section "Neural network-based mode inferring the transform indices" is illustrated in FIG. 40 and FIG. 41. Note that the adaptation of the seventh variant embodiment in the section "Neural network-based mode inferring the transform indices" and that of the eighth embodiment follow the same principles. FIG. 40 illustrates a neural network-based intra prediction mode inferring mtsIdx and returning the prediction predTrGrpIdx$_{lfnstIdx=1}$ of trGrpIdx$_{lfnstIdx=1}$, and the prediction predTrGrpIdx$_{lfnstIdx=2}$ of trGrpIdx$_{lfnstIdx=2}$ on the encoder side. The indices trGrpIdx and lfnstIdx in gray are found by the encoder via rate-distortion optimization.

FIG. 41 illustrates a neural network-based intra prediction mode inferring mtsIdx and returning the prediction predTrGrpIdx$_{lfnstIdx=1}$ of trGrpIdx$_{lfnstIdx=1}$, and the prediction predTrGrpIdx$_{lfnstIdx=2}$ of trGrpIdx$_{lfnstIdx=2}$ on the decoder side.

In the embodiment presented in FIG. 40 and FIG. 41, for a CU in separate tree in chrominance, the predictive coding of trGrpIdx with respect to predTrGrpIdx for each of its two chrominance CBs can be too costly. Indeed, for a CU in separate tree in chrominance, the predictive encoding of trGrpIdx$^{C_b}$ with respect to predTrGrpIdx$^{C_b}$ for its blue chrominance CB and the predictive encoding of trGrpIdx$^{C_r}$ with respect to predTrGrpIdx$^{C_r}$ for its red chrominance CB yield two sets of bits $B_{remainder}^{C_b}$ and $B_{remainder}^{C_r}$ respectively written to the bitstream. Note that, for a CU not in separate tree, as LFNST is disabled in chrominance, only the predictive encoding of trGrpIdx$^Y$ with respect to predTrGrpIdx$^Y$ for its luminance CB exists, which makes the coding cost of the proposed predictive scheme small for this CU.

To circumvent the above-mentioned large coding cost, according to a fourth variant embodiment of the predictive coding of transform indices, for a CU in separate tree in chrominance, its blue chrominance CB and its red chrominance CB share the same trGrpIdx$^C$. The predictive encoding of trGrpIdx$^C$ with respect to predTrGrpIdx$^{C_b}$ returns the bits $B_{remainder}^C$ written to the bitstream. predTrGrpIdx$^{C_r}$ is thus not used. In the fourth variant embodiment, a CU in separate tree in luminance has its own trGrpIdx$^Y$.

Figure 42:
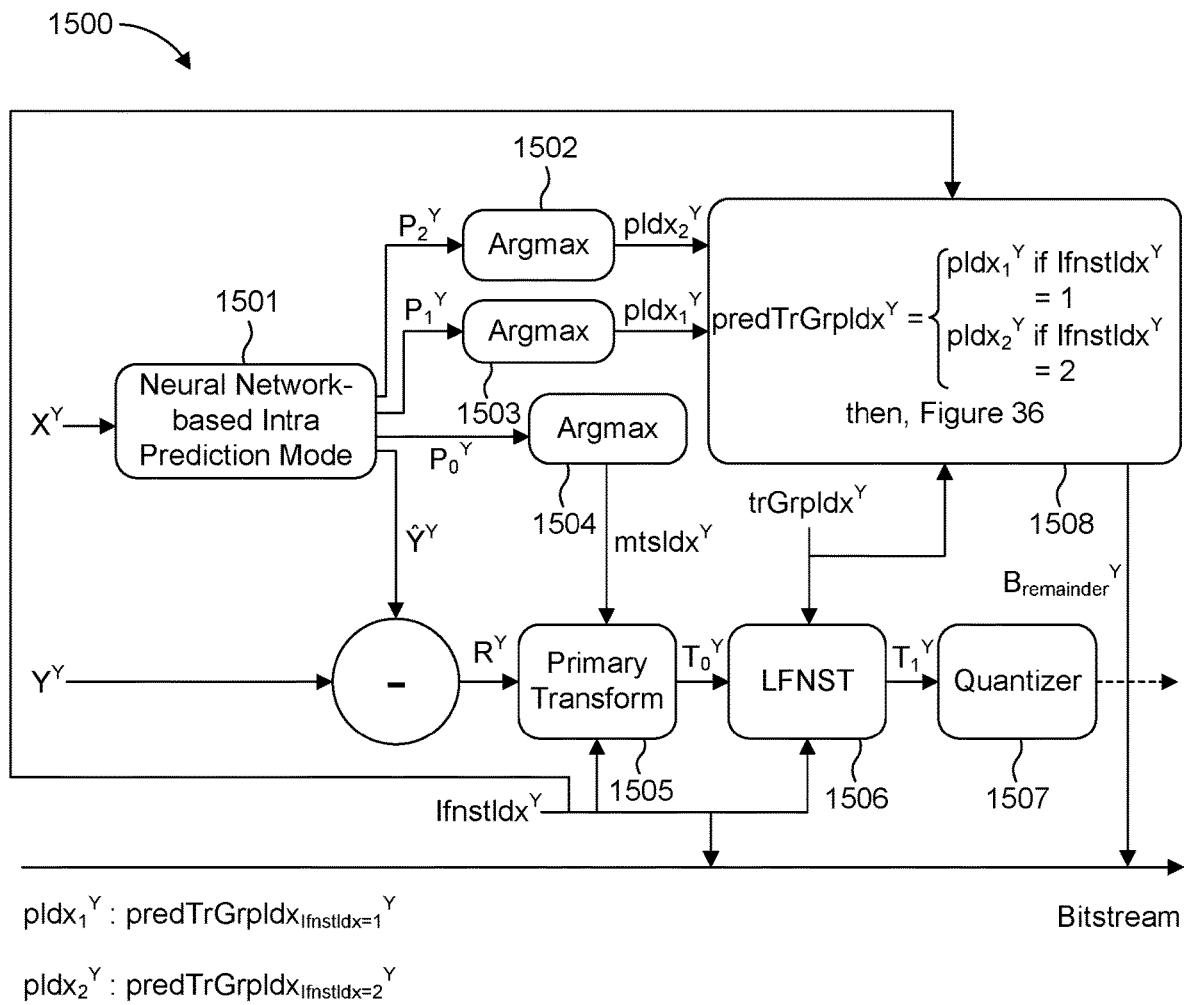

FIG. 42 illustrates the fourth variant embodiment for a CU in separate tree in luminance on the encoder (1500) side. The indices trGrpIdx$^Y$ and lfnstIdx$^Y$ in gray are found by the encoder via rate-distortion optimization. The neural network-based intra prediction mode (1501) computes from the context $X^Y$ of the luminance CB $Y^Y$ of this CU a prediction $\hat{Y}^Y$ of $Y^Y$, the vector $P_0^Y \in [0, 1]^5$ whose coefficient of index j is the probability that mtsIdx$^Y$=j and the vector $P_1^Y \in [0, 1]^7$ whose coefficient of index k is the probability that predTrGrpIdx$_{lfnstIdx=1}^Y$=k, and the vector $P_2^Y \in [0, 1]^7$ whose coefficient of index l is the probability that predTrGrpIdx$_{lfnstIdx=2}^Y$=l. Then, mtsIdx$^Y$=argmax($P_0^Y$) (1504). predTrGrpIdx$_{lfnstIdx=1}^Y$=argmax($P_1^Y$) (1503). predTrGrpIdx$_{lfnstIdx=2}^Y$=argmax($P_2^Y$) (1502). The residue of prediction $R^Y=Y^Y-\hat{Y}^Y$ is fed into the primary transform (1505) of index mtsIdx$^Y$. The resulting primary transform coefficients $T_0^Y$ are fed into LFNST (1506) using the LFNST matrix of index lfnstIdx$^Y$ found by the encoder in the group of index trGrpIdx$^Y$ found by the encoder. The resulting secondary transform coefficients $T_1^Y$ are fed into the quantizer (1507). lfnstIdx$^Y$ is signaled in the bitstream. If lfnstIdx$^Y$=1, predTrGrpIdx$^Y$=predTrGrpIdx$_{lfnstIdx=1}^Y$. If lfnstIdx$^Y$=2, predTrGrpIdx$^Y$=predTrGrpIdx$_{lfnstIdx=2}^Y$. The predictive encoder (1508) encodes trGrpIdx$^Y$ with respect to predTrGrpIdx$^Y$, yielding the bits $B_{remainder}^Y$ written to the bitstream.

Figure 43:
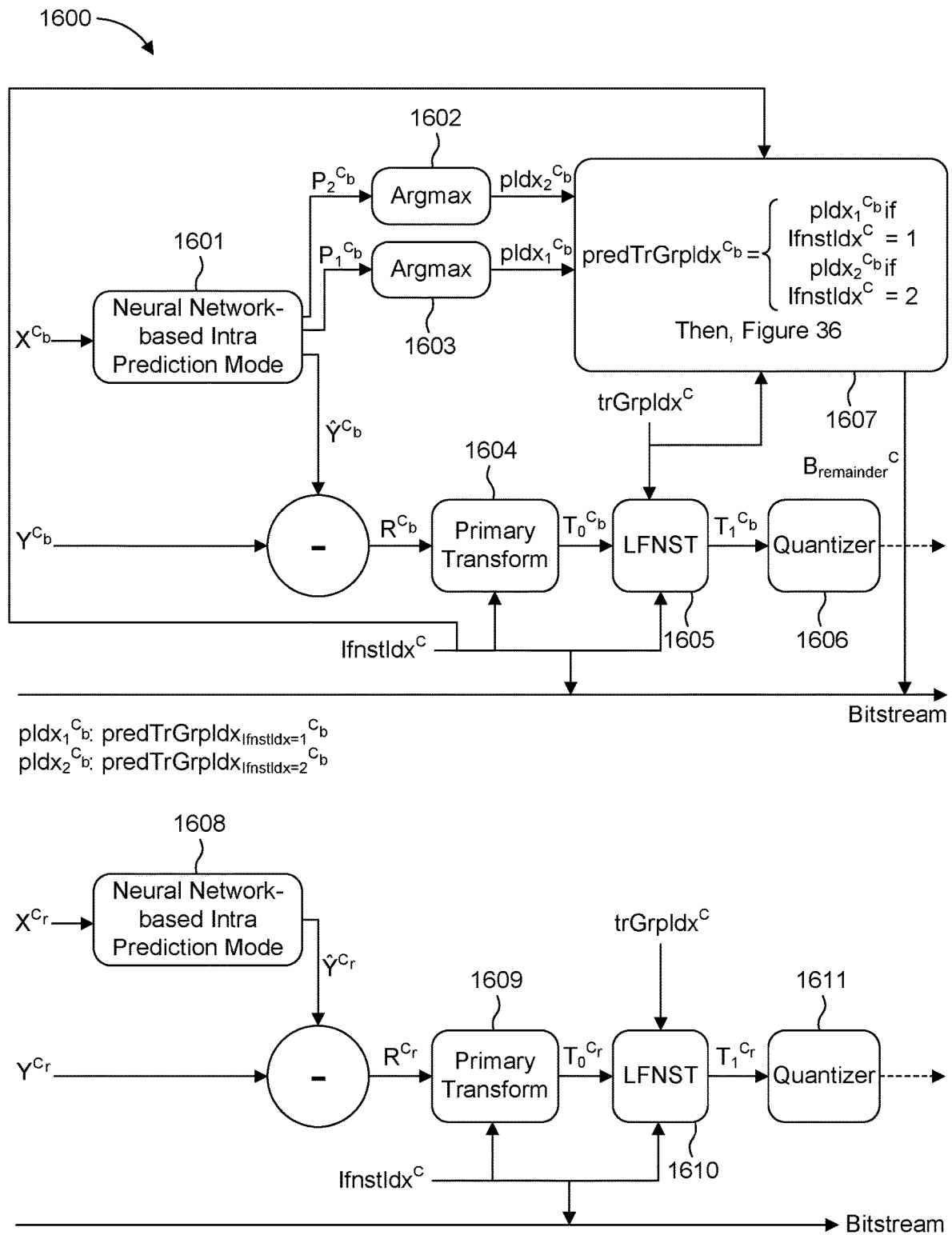

FIG. 43 illustrates the fourth variant embodiment for a CU in separate tree in chrominance on the encoder (1600) side. The neural network-based intra prediction mode (1601)

computes from the context $X^{C_b}$ of the blue chrominance CB $Y^{C_b}$ of this CU a prediction $\hat{Y}^{C_b}$ of $Y^{C_b}$, the vector $P_1^{C_b} \in [0, 1]^7$ whose coefficient of index k is the probability that $\text{predTrGrpIdx}_{lfnstIdx=1}^{C_b}=k$ and the vector $P_2^{C_b} \in [0, 1]^7$ whose coefficient of index l is the probability that $\text{predTrGrpIdx}_{lfnstIdx=2}^{C_b}=l$. Then, $\text{predTrGrpIdx}_{lfnstIdx=1}^{C_b}=\text{argmax}(P_1^{C_b})$ (1603). $\text{predTrGrpIdx}_{lfnstIdx=2}^{C_b}=\text{argmax}(P_2^{C_b})$ (1602). Note that the MTS index is not relevant, as, when Transform Skip is not considered (as mentioned in the description of FIG. 1), the primary transform for a chrominance CB always combines the DCT2 horizontally and the DCT2 vertically. The residue of prediction $R^{C_b}=Y^{C_b}-\hat{Y}^{C_b}$ is fed into the primary transform (1604). The resulting primary transform coefficients $T_0^{C_b}$ are fed into LFNST (1605) using the LFNST matrix of index $lfnstIdx^C$ found by the encoder in the group of index $trGrpIdx^C$ found by the encoder. The resulting secondary transform coefficients $T_1^{C_b}$ are fed into the quantizer (1606). The neural network-based intra prediction mode (1608) computes from the context $X^{C_r}$ of the red chrominance CB $Y^{C_r}$ of this CU a prediction $\hat{Y}^{C_r}$ of $Y^{C_r}$. The vectors $P_1^{C_r} \in [0, 1]^7$ and $P_2^{C_r} \in [0, 1]^7$ may be returned by the neural network-based intra prediction mode. But, $P_1^{C_r}$ and $P_2^{C_r}$ are not used. The residue of prediction $R^{C_r}=Y^{C_r}-\hat{Y}^{C_r}$ is fed into the primary transform (1609). The resulting primary transform coefficients $T_0^{C_r}$ are fed into LFNST (1610) using the LFNST matrix of index $lfnstIdx^C$ in the group of index $trGrpIdx^C$. The resulting secondary transform coefficients $T_1^{C_r}$ are fed into the quantizer (1611). $lfnstIdx^C$ is signaled in the bitstream. If $lfnstIdx^C=1$, $\text{predTrGrpIdx}^{C_b}=\text{predTrGrpIdx}_{lfnstIdx=1}^{C_b}$. If $lfnstIdx^C=2$, $\text{predTrGrpIdx}^{C_b}=\text{predTrGrpIdx}_{lfnstIdx=2}^{C_b}$. The predictive encoder (1607) encodes $trGrpIdx^C$ with respect to $\text{predTrGrpIdx}^{C_b}$, yielding the bits $B_{remainder}^C$ written to the bitstream.

Figure 44:
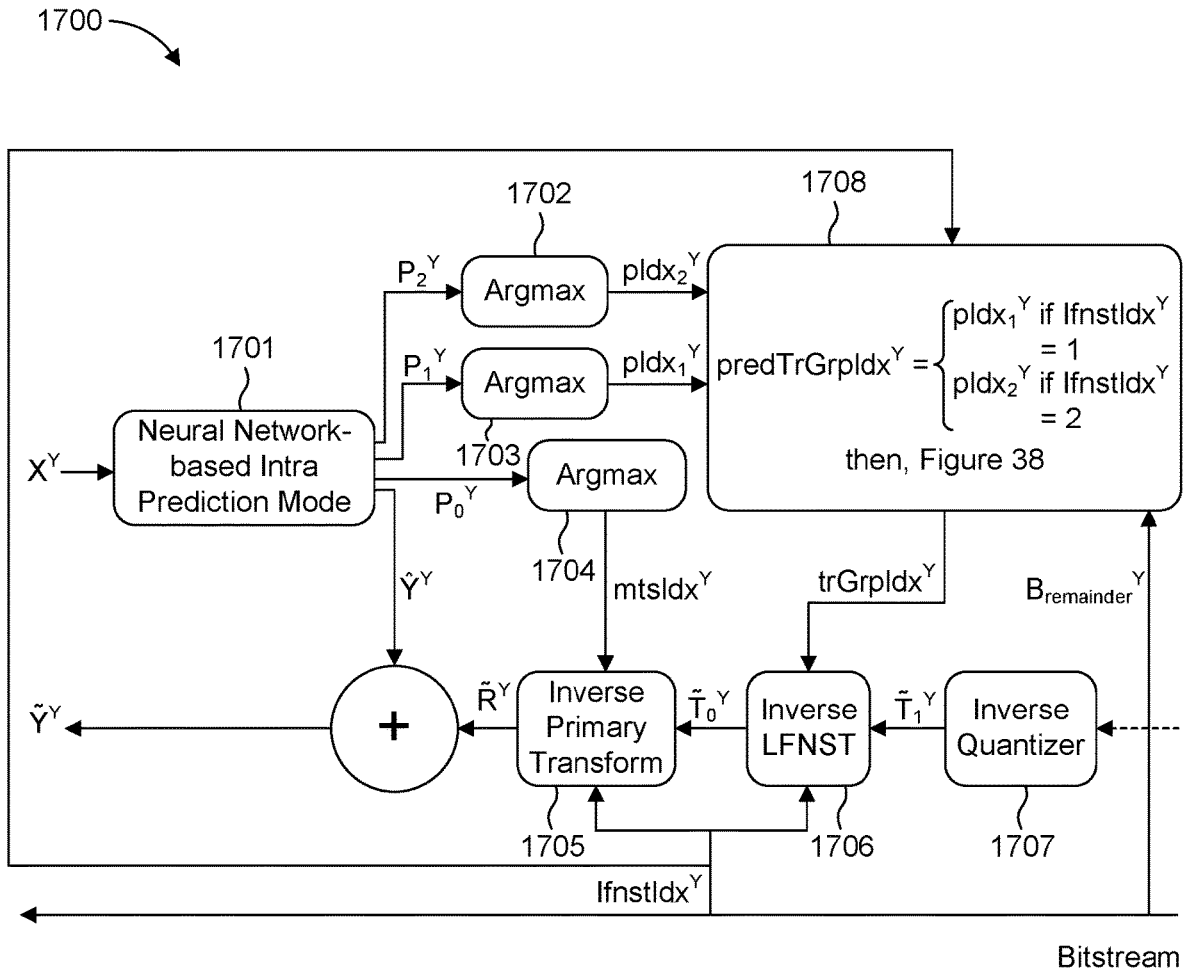

FIG. 44 illustrates the fourth variant embodiment for a CU in separate tree in luminance on the decoder (1700) side. $lfnstIdx^Y$ is read from the bitstream. The neural network-based intra prediction mode (1701) computes from the context $X^Y$ of the luminance CB $Y^Y$ of this CU a prediction a prediction $\hat{Y}^Y$ of $Y^Y$, $P_0^Y$, $P_1^Y$, and $P_2^Y$. Then, $\text{mtsIdx}^Y=\text{argmax}(P_0^Y)$ (1704). $\text{predTrGrpIdx}_{lfnstIdx=1}^Y=\text{argmax}(P_1^Y)$ (1703). $\text{predTrGrpIdx}_{lfnstIdx=2}^Y=\text{argmax}(P_2^Y)$ (1702). If $lfnstIdx^Y=1$, $\text{predTrGrpIdx}^Y=\text{predTrGrpIdx}_{lfnstIdx=1}^Y$. If $lfnstIdx^Y=2$, $\text{predTrGrpIdx}^Y=\text{predTrGrpIdx}_{lfnstIdx=2}^Y$. The decoder associated to the predictive encoder (1708) decodes $trGrpIdx^Y$ using $\text{predTrGrpIdx}^Y$ and the bits $B_{remainder}^Y$ previously read from the bitstream. The inverse quantizer (1707) gives the reconstructed secondary transform coefficients $\tilde{T}_1^Y$. $\tilde{T}_1^Y$ is turned into the reconstructed primary transform coefficients $\tilde{T}_0^Y$ by the inverse LFNST (1706) using the LFNST matrix of index $lfnstIdx^Y$ in the group of index $trGrpIdx^Y$. The inverse primary transform (1705) of index $\text{mtsIdx}^Y$ computes the reconstructed residue $\tilde{R}^Y$ from $\tilde{T}_0^Y$. Finally, the reconstructed luminance CB is $\tilde{Y}^Y=\tilde{R}^Y+\hat{Y}^Y$.

Figure 45:
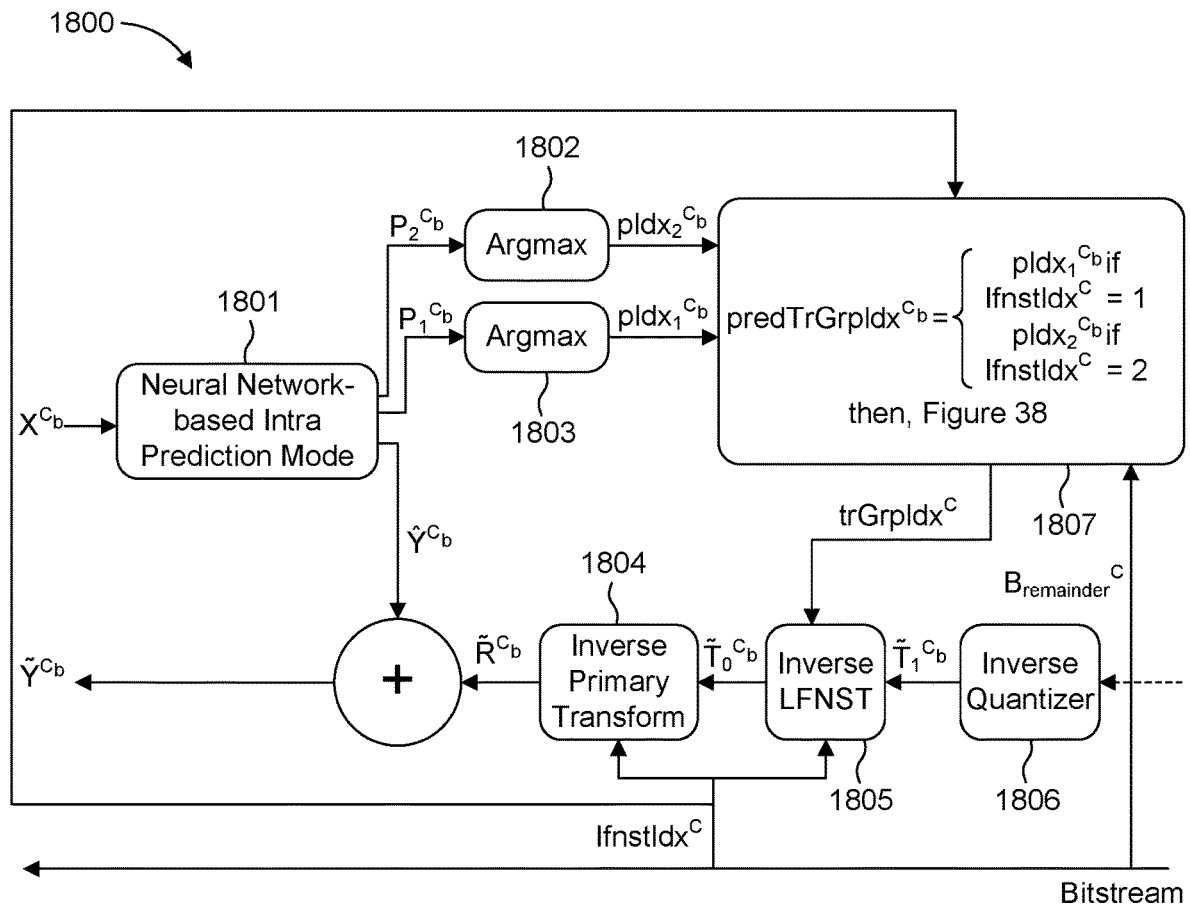
Figure 45:
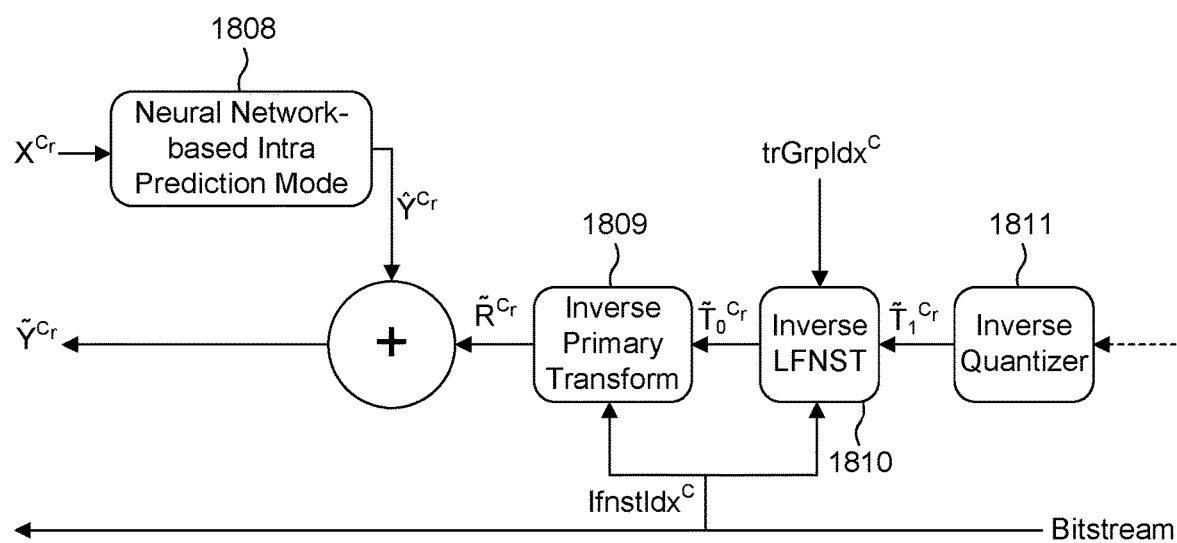

FIG. 45 illustrates the fourth variant embodiment for a CU in separate tree in chrominance on the decoder (1800) side. $lfnstIdx^C$ is read from the bitstream. The neural network-based intra prediction mode (1801) computes from the context $X^{C_b}$ of the blue chrominance CB $Y^{C_b}$ of this CU a prediction $\hat{Y}^{C_b}$ of $Y^{C_b}$, $P_1^{C_b}$ and $P_2^{C_b}$. Then, $\text{predTrGrpIdx}_{lfnstIdx=1}^{C_b}=\text{argmax}(P_1^{C_b})$ (1803). $\text{predTrGrpIdx}_{lfnstIdx=2}^{C_b}=\text{argmax}(P_2^{C_b})$ (1802). If $lfnstIdx^C=1$, $\text{predTrGrpIdx}^{C_b}=\text{predTrGrpIdx}_{lfnstIdx=1}^{C_b}$. If $lfnstIdx^C=2$, $\text{predTrGrpIdx}^{C_b}=\text{predTrGrpIdx}_{lfnstIdx=2}^{C_b}$. The decoder associated to the predictive encoder (1807) decodes $trGrpIdx^C$ using $\text{predTrGrpIdx}^{C_b}$ and the bits $B_{remainder}^C$ previously read from the bitstream. The inverse quantizer (1806) provides the reconstructed secondary transform coefficients $\tilde{T}_1^{C_b}$. $\tilde{T}_1^{C_b}$ is turned into the reconstructed primary transform coefficients $\tilde{T}_0^{C_b}$ by the inverse LFNST (1805) using the LFNST matrix of index $lfnstIdx^C$ in the group of index $trGrpIdx^C$. The inverse primary transform (1804) computes the reconstructed residue $\tilde{R}^{C_b}$ from $\tilde{T}_0^{C_b}$. Finally, the reconstructed blue chrominance CB is $\tilde{Y}^{C_b}=\tilde{R}^{C_b}+\hat{Y}^{C_b}$. The neural network-based intra prediction mode (1808) computes from the context $X^{C_r}$ of the red chrominance CB $Y^{C_r}$ of this CU a prediction $\hat{Y}^{C_r}$ of $Y^{C_r}$. $P_1^{C_r}$, and $P_2^{C_r}$ may be given by the neural network-based intra prediction mode. But, $P_1^{C_r}$ and $P_2^{C_r}$ are not used. The inverse quantizer (1811) provides the reconstructed secondary transform coefficients $\tilde{T}_1^{C_r}$. $\tilde{T}_1^{C_r}$ is turned into the reconstructed primary transform coefficients $\tilde{T}_0^{C_r}$ by the inverse LFNST (1810) using the LFNST matrix of index $lfnstIdx^C$ in the group of index $trGrpIdx^C$. The inverse primary transform (1809) computes the reconstructed residue $\tilde{R}^{C_r}$ from $\tilde{T}_0^{C_r}$. Finally, the reconstructed red chrominance CB is $\tilde{Y}^{C_r}=\tilde{R}^{C_r}+\hat{Y}^{C_r}$.

According to a fifth variant embodiment, for a CU in separate tree in chrominance, the blue chrominance CB and the red chrominance CB share the same $trGrpIdx^C$. The predictive encoding of $trGrpIdx^C$ with respect to $\text{predTrGrpIdx}^{C_r}$ returns the bits $B_{remainder}^C$ written to the bitstream. $\text{predTrGrpIdx}^{C_b}$ is therefore not used. The adaption of FIGS. 42, 43, 44, and 45 to the fifth variant embodiment is straightforward.

According to a sixth variant embodiment, the eleventh variant embodiment in "Neural network-based mode inferring the transform indices" can be adapted to the case of the neural network-based mode predicting the transform indices by simply replacing $trGrpIdx_{lfnstIdx=1}^Y$ by $\text{predTrGrpIdx}_{lfnstIdx=1}^Y$ and $trGrpIdx_{lfnstIdx=2}^Y$ by $\text{predTrGrpIdx}_{lfnstIdx=2}^Y$ in FIG. 33. $\text{predTrGrpIdx}_{lfnstIdx=1}^Y$ and $\text{predTrGrpIdx}_{lfnstIdx=2}^Y$ denote the predictions of the LFNST group indices the neural network-based intra prediction mode gave when predicting the luminance CB that is collocated with the current chrominance CB inside the CU of interest is separate tree in chrominance.

According to a seventh variant embodiment, the twelfth variant embodiment in "Neural network-based mode inferring the transform indices" can be applied to the case of the neural network-based mode predicting the transform indices without modifying the description.

Use of the Mappings in Tables 2 and 4 During the Neural Network-Based Inference/Prediction of the Transform Indices In the sections "Neural network-based mode inferring the transform indices" and "Neural network-based mode predicting the transform indices", the neural network-based intra prediction mode returns vectors from which either the transform indices or predictions of the transform indices are computed without any intermediate predefined mapping. Alternatively, the neural network-based intra prediction mode can return vectors, and either the transform indices or predictions of the transform indices are obtained from these vectors using at least one intermediate predefined mapping.

In a first variant embodiment, the neural network-based intra prediction mode returns vectors in which a coefficient represents the probability of the index of an intra prediction mode in VVC, excluding the MIP modes. Either the transform indices or predictions of the transform indices are obtained from these vectors first using the mapping in VVC from an intra prediction mode index to its wide angle intra prediction mode index, then using Tables 2 and 4.

Figure 46:
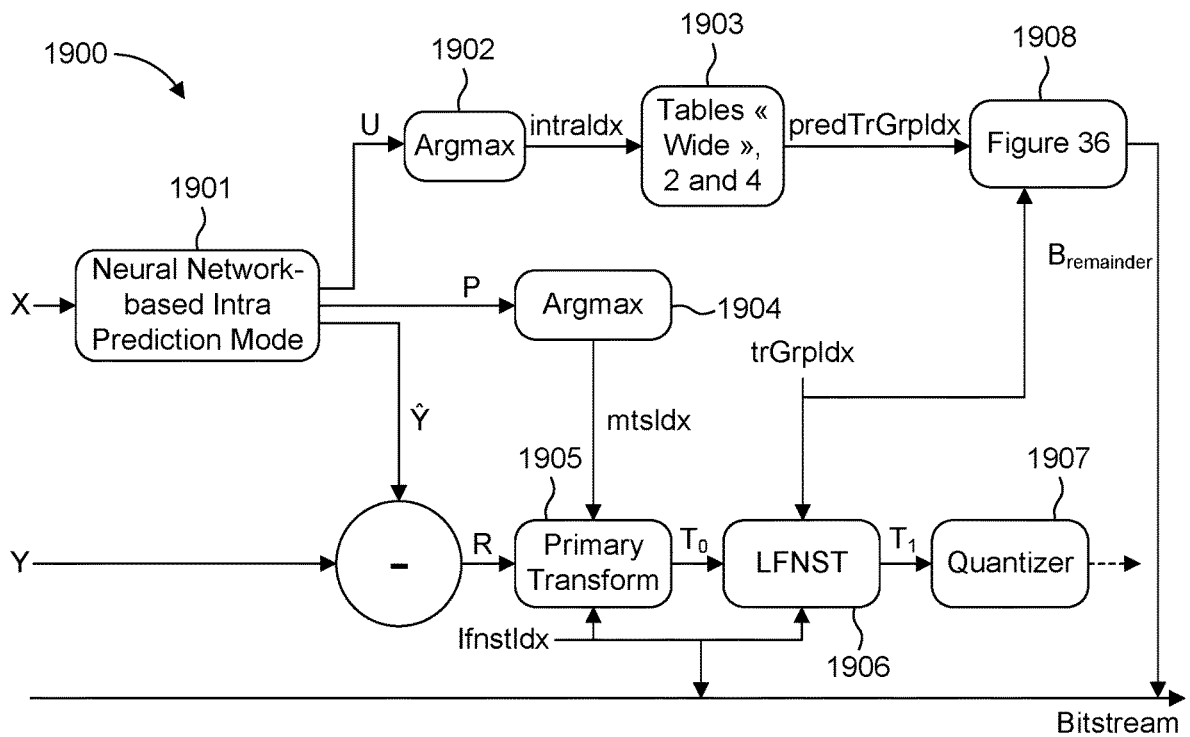

FIG. 46 illustrates an adaptation of FIG. 37 according to this first variant embodiment on the encoder (1900) side. The neural network-based intra prediction mode (1901) computes from the context X of the block Y a prediction $\hat{Y}$ of Y, the vector $P \in [0, 1]^5$ whose coefficient of index j is the probability that mtsIdx=j and the vector $U \in [0, 1]^{67}$ whose coefficient of index k is the probability that the neural network prediction $\hat{Y}$ is represented by the VVC intra prediction of index k (not including the MIP modes). Then, mtsIdx=argmax(P) (1904). intraIdx=argmax(U) (1902). Using the mapping in VVC from an intra prediction mode index to its wide angle intra prediction mode index, denoted "Table wide", the index of the wide angle intra prediction mode representing the neural network prediction $\hat{Y}$ is computed from intraIdx. Then, using Tables 2 and 4, predTrGrpIdx is deduced from this wide angle intra prediction mode index (1903). The residue of prediction $R = Y - \hat{Y}$ is fed into the primary transform (1905) of index mtsIdx. The resulting primary transform coefficients $T_0$ are fed into LFNST (1906) using the LFNST matrix of index lfnstIdx found by the encoder in the group of index trGrpIdx found by the encoder. The resulting secondary transform coefficients $T_1$ are fed into the quantizer (1907). lfnstIdx is signaled in the bitstream. The predictive encoder (1908) encodes trGrpIdx with respect to predTrGrpIdx, yielding the bits $B_{remainder}$ written to the bitstream.

Figure 47:
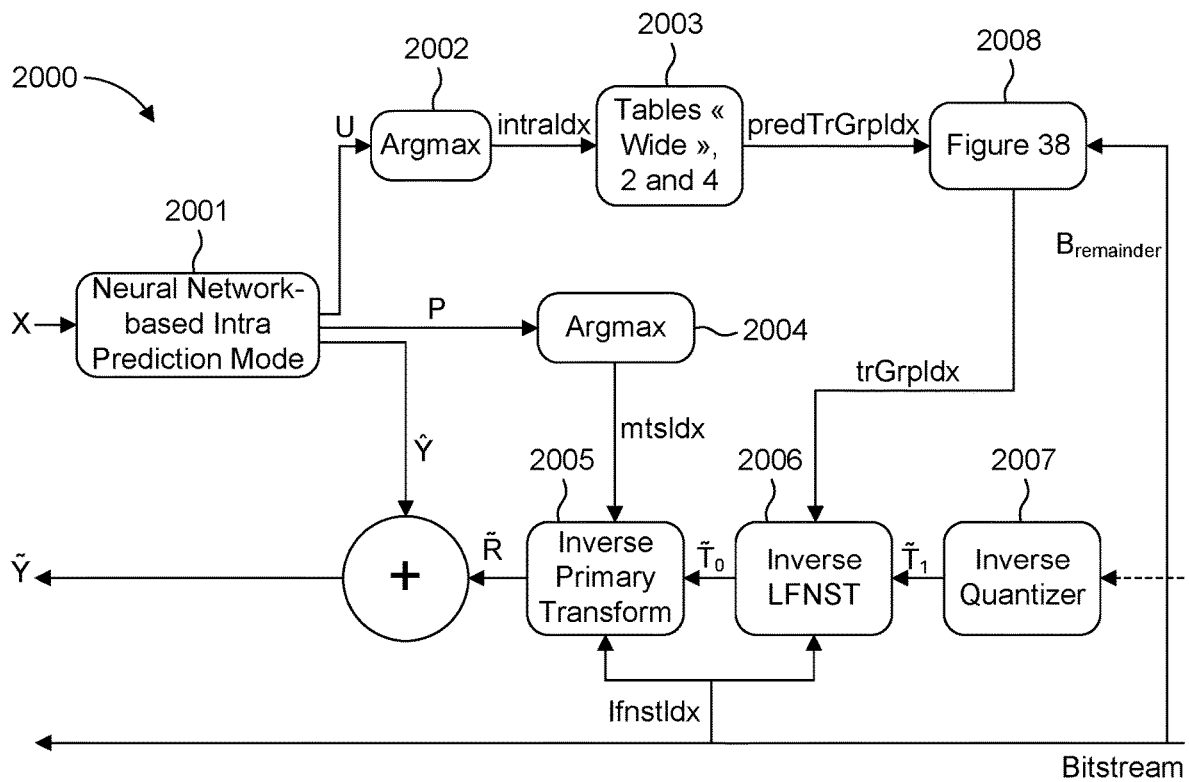

FIG. 47 illustrates an adaptation of FIG. 39 according to this first variant embodiment on the decoder (2000) side. The neural network-based intra prediction mode (2001) computes from the context X of the current block a prediction $\hat{Y}$ of this block, P and U. Then, mtsIdx=argmax(P) (2004). intraIdx=argmax(U) (2002). Using the mapping in VVC from an intra prediction mode index to its wide angle intra prediction mode index, denoted "Table wide", the index of the wide angle intra prediction mode representing the neural network prediction $\hat{Y}$ is computed from intraIdx. Then, using Tables 2 and 4, predTrGrpIdx is deduced from this wide angle intra prediction mode index (2003). The decoder associated to the predictive encoder (2008) decodes trGrpIdx using predTrGrpIdx and the bits $B_{remainder}$ read from the bitstream. The inverse quantizer (2007) gives the reconstructed secondary transform coefficients $\tilde{T}_1$. $\tilde{T}_1$ is turned into the reconstructed primary transform coefficients $\tilde{T}_0$ by the inverse LFNST (2006) using the LFNST matrix of index lfnstIdx in the group of index trGrpIdx. The inverse primary transform (2005) of index mtsIdx computes the reconstructed residue $\tilde{R}$ from $\tilde{T}_0$. Finally, the reconstructed block is $\hat{Y} = \tilde{R} + \hat{Y}$.

Acceleration of the Encoder Intra Search Involving the Neural Network-Based Intra Prediction Mode For a given block predicted via a neural network-based intra prediction mode, when the transform indices are signaled instead of being inferred from the index of the selected intra prediction mode, the encoder search for trGrpIdx increases the encoder running time. The same goes when the neural network-based mode predicts the transform indices as illustrated on FIG. 37. This increase of the encoder running time becomes especially critical if, for a given image block, the same predicted block provided by the neural network-based mode is re-computed several times as a neural network inference usually involves tons of arithmetic operations. To tackle this, for a given image block, the predicted block given by the neural network-based mode is saved to memory the first time it is computed. Then, this predicted block is loaded during each subsequent test. As the above-mentioned load and save of the predicted block is implemented only for the neural network-based mode, the load and save incurs a very limited memory cost. To reduce even more the encoder running time, for a given image block, the primary transform coefficients resulting from the application of a given primary transform to the residue of the neural network intra prediction are saved to memory the first time they are computed. Then, the primary transform coefficients are loaded during each subsequent test if needed.

According to a first variant embodiment, the acceleration of the encoder intra search involving the neural network-based intra prediction mode is applied to VVC featuring the neural network-based intra prediction mode, and the fourth variant embodiment in Section "Signaling the transform indices that are usually inferred from the selected intra prediction mode index" is re-used. Then, the tests computing the rate-distortion costs of the complete encodings of a given block predicted via the neural network-based intra prediction mode are shown in Table 5. Note that, in Table 5, all the heuristics that can stop the series of tests from "Test 0" to "Test 19" early are ignored for clarity. Note also that, in Table 5, the primary transform coefficients resulting from the application of the DCT2 horizontally and the DCT2 vertically to the residue of the neural network intra prediction are saved to memory following their first computation and loaded during each subsequent test as the combination of the DCT2 horizontally and the DCT2 vertically is the most frequently used primary transform.

TABLE 5 choice of computing/saving/loading the predicted block and computing/saving/loading the primary transform coefficients resulting from the application of the DCT2 horizontally and the DCT2 vertically to the residue of prediction in the case of a given image block predicted via the neural network-based intra prediction mode. The encoder of VTM featuring the neural network-based intra prediction mode is used.

|  | Test 0 | Test 1 | Test 2 | Test 3 + i, i $\in [0, 6]$ |
|---|---|---|---|---|
| primary transform | DCT2-DCT2 | none | DST7-DST7 | DCT2-DCT2 |
| secondary transform | none | none | none | lfnstIdx = 1 trGrpIdx = i |
| neural network prediction | computed, saved | loaded | loaded | loaded |
| DCT2-DCT2 primary transform coefficients | computed, saved | none | none | loaded |

|  | Test 10 + i, i $\in [0, 6]$ | Test 17 | Test 18 | Test 19 |
|---|---|---|---|---|
| primary transform | DCT2-DCT2 | DCT8-DST7 | DST7-DCT8 | DCT8-DCT8 |
| secondary transform | lfnstIdx = 2 trGrpIdx = i | none | none | none |

TABLE 5-continued choice of computing/saving/loading the predicted block and computing/saving/loading the primary transform coefficients resulting from the application of the DCT2 horizontally and the DCT2 vertically to the residue of prediction in the case of a given image block predicted via the neural network-based intra prediction mode. The encoder of VTM featuring the neural network-based intra prediction mode is used.

| | | | | |
|---|---|---|---|---|
| neural network prediction | loaded | loaded | loaded | loaded |
| DCT2-DCT2 primary transform coefficients | loaded | none | none | none |

According to a second variant embodiment, the acceleration of the encoder intra search involving the neural network-based intra prediction mode is applied to VVC featuring the neural network-based intra prediction mode, and the approach described in Section "Neural network-based mode predicting the transform indices" and illustrated on FIG. 34 is re-used. Then, the tests computing the rate-distortion costs of the complete encodings of a given block predicted via the neural network-based intra prediction mode are also displayed in Table 5.

According to a third variant embodiment, the acceleration of the encoder intra search involving the neural network-based intra prediction mode is applied to VVC featuring the neural network-based intra prediction mode, and the approach illustrated in FIG. 40 is re-used. This means that the neural network-based intra prediction mode provides a prediction $pIdx_1$ of trGrpIdx when lfnstIdx is equal to 1 and a prediction $pIdx_2$ of trGrpIdx when lfnstIdx is equal to 2. Besides, the neural network-based mode infers mtsIdx. But, unlike in FIG. 40 where mtsIdx$\in\{0, 1, 2, 3, 4\}$, here, mtsIdx$\in\{1, 2, 3, 4\}$. Therefore, for a given block predicted via the neural network-based intra prediction mode, this mode infers whether DST7-DST7 or DST7-DCT8 or DCT8-DST7 or DCT8-DCT8 is used. Yet, the encoder must test the DCT2-DCT2 and the primary transform of index the inferred mtsIdx. In this case, the tests computing the rate-distortion costs of the complete encodings of a given block predicted via the neural network-based intra prediction mode are in Table 6.

TABLE 6 choice of computing/saving/loading the predicted block and computing/saving/loading the primary transform coefficients resulting from the application of the DCT2 horizontally and the DCT2 vertically to the residue of prediction in the case of a given block predicted via the neural network-based intra prediction mode and the third variant embodiment. The encoder of VTM featuring the neural network-based intra prediction mode is used.

| | Test 0 | Test 1 | Test 2 | Test 3 + i, i $\in$ [0, 6] |
|---|---|---|---|---|
| primary transform | DCT2-DCT2 | none | inferred mtsIdx | DCT2-DCT2 |
| secondary transform | none | none | none | lfnstIdx = 1 |
| | | | | trGrpIdx = i |
| neural network prediction | computed, saved | loaded | loaded | loaded |
| DCT2-DCT2 primary transform coefficients | computed, saved | none | none | loaded |

| | Test 10 + i, i $\in$ [0, 6] |
|---|---|
| primary transform | DCT2-DCT2 |
| secondary transform | lfnstIdx = 2 |
| | trGrpIdx = i |
| neural network prediction | loaded |
| DCT2-DCT2 primary transform coefficients | loaded |

From the above three variant embodiments, the proposed acceleration of the encoder intra search involving the neural network-based intra prediction mode can be straightforwardly extended to any case described in this disclosure.

ADDITIONAL EMBODIMENTS AND INFORMATION

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 48:
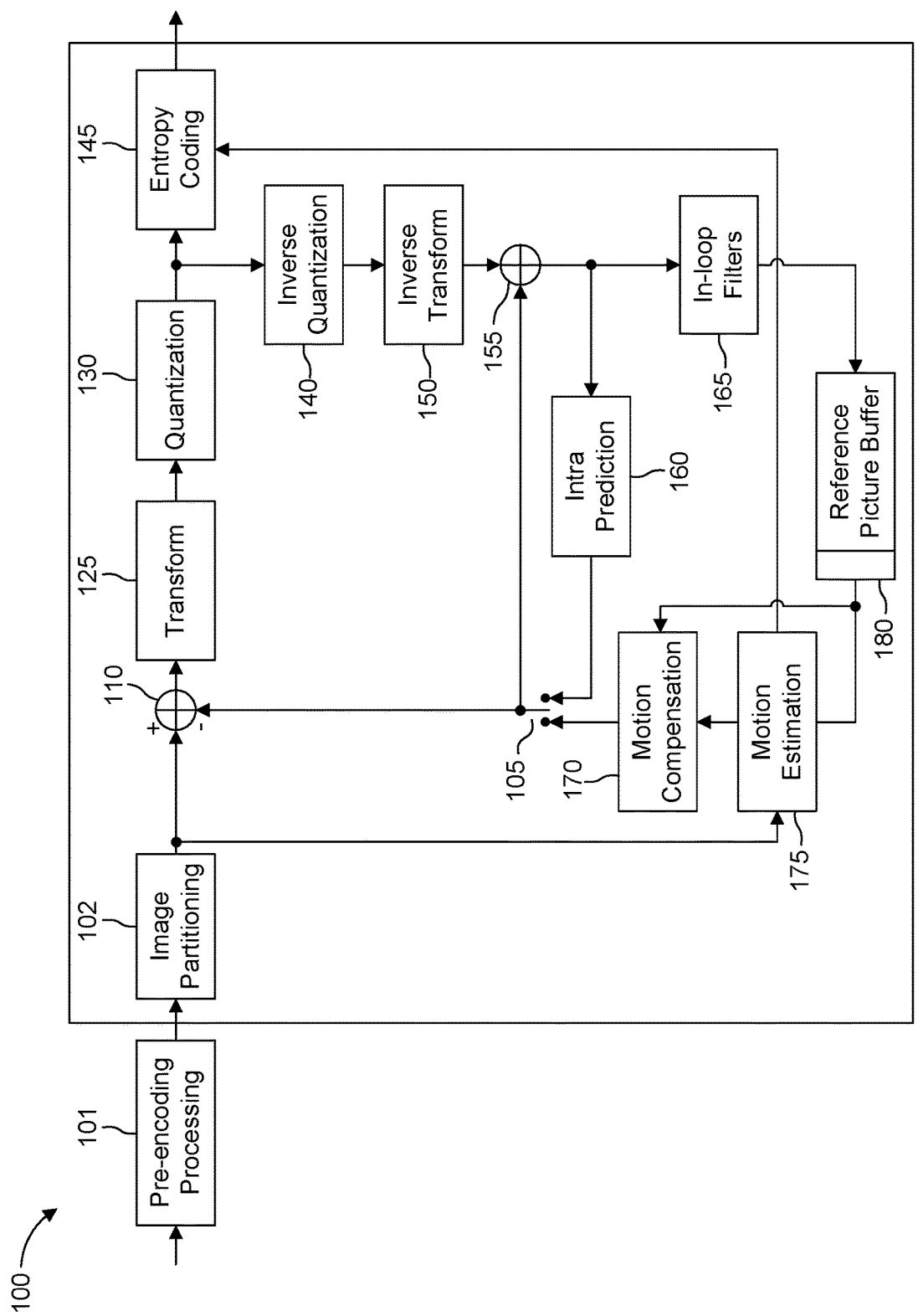
FIG. 48 illustrates a block diagram of an embodiment of video encoder in which various aspects of the embodiments may be implemented.
Figure 49:
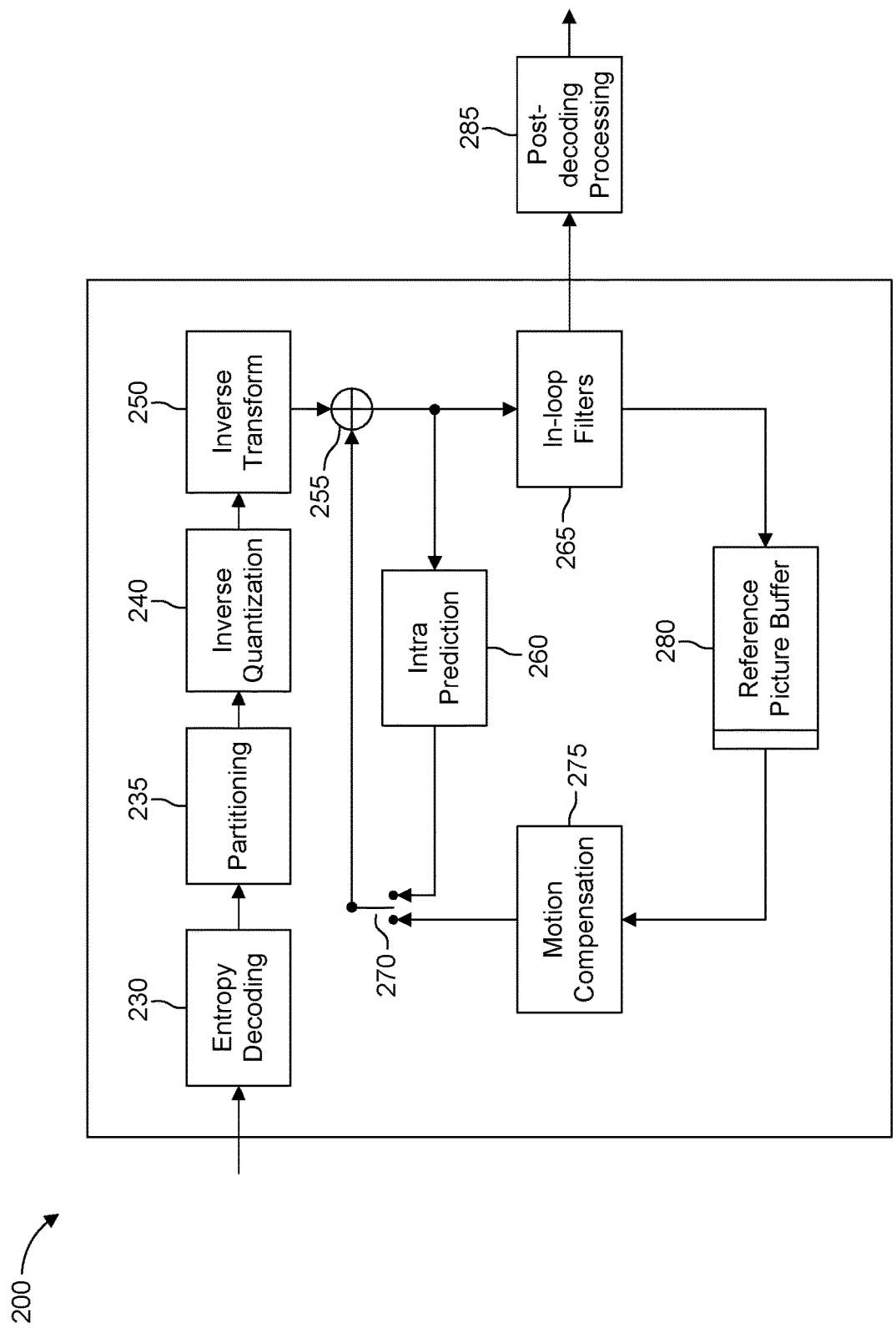
FIG. 49 illustrates a block diagram of an embodiment of video decoder in which various aspects of the embodiments may be implemented.

The aspects described and contemplated in this application can be implemented in many different forms. FIG. 46, FIG. 47 and FIG. 48 below provide some embodiments, but other embodiments are contemplated and the discussion of FIG. 46, FIG. 47 and FIG. 48 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Various methods and other aspects described in this application can be used to modify modules, for example, the intra prediction, transform modules, and/or inverse transform modules (160, 260, 125, 150, 250), of a video encoder 100 and decoder 200 as shown in FIG. 46 and FIG. 47. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application, for example, the number of transforms, the number of transform level, the indices of transforms. The specific values are for example purposes and the aspects described are not limited to these specific values. FIG. 46 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 47 illustrates a block diagram of a video decoder 200. In the decoder 200, a bitstream is decoded by the decoder elements as described below. Video decoder 200 generally performs a decoding pass reciprocal to the encoding pass as described in FIG. 47. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 48 illustrates a block diagram of an example of a system in which various aspects and embodiments are implemented. System 2000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 2000, singly or in combination, can be embodied in a single integrated circuit (IC), multiple ICs, and/or discrete components. For example, in at least one embodiment, the processing and encoder/decoder elements of system 2000 are distributed across multiple ICs and/or discrete components. In various embodiments, the system 2000 is communicatively coupled to one or more other systems, or other electronic devices, via, for example, a communications bus or through dedicated input and/or output ports. In various embodiments, the system 2000 is configured to implement one or more of the aspects described in this document.

The system 2000 includes at least one processor 2010 configured to execute instructions loaded therein for implementing, for example, the various aspects described in this document. Processor 2010 can include embedded memory, input output interface, and various other circuitries as known in the art. The system 2000 includes at least one memory 2020 (e.g., a volatile memory device, and/or a non-volatile memory device). System 2000 includes a storage device 2040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 2040 can include an internal storage device, an attached storage device (including detachable and non-detachable storage devices), and/or a network accessible storage device, as non-limiting examples.

System 2000 includes an encoder/decoder module 2030 configured, for example, to process data to provide an encoded video or decoded video, and the encoder/decoder module 2030 can include its own processor and memory. The encoder/decoder module 2030 represents module(s) that can be included in a device to perform the encoding and/or decoding functions. As is known, a device can include one or both of the encoding and decoding modules. Additionally, encoder/decoder module 2030 can be implemented as a separate element of system 2000 or can be incorporated within processor 2010 as a combination of hardware and software as known to those skilled in the art.

Program code to be loaded onto processor 2010 or encoder/decoder 2030 to perform the various aspects described in this document can be stored in storage device 2040 and subsequently loaded onto memory 2020 for execution by processor 2010. In accordance with various embodiments, one or more of processor 2010, memory 2020, storage device 2040, and encoder/decoder module 2030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 2010 and/or the encoder/decoder module 2030 is used to store instructions and to provide working memory for processing that is needed during encoding or decoding. In other embodiments, however, a memory external to the processing device (for example, the processing device can be either the processor 2010 or the encoder/decoder module 2030) is used for one or more of these functions. The external memory can be the memory 2020 and/or the storage device 2040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 2000 can be provided through various input devices as indicated in block 2005. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 48, include composite video.

In various embodiments, the input devices of block 2005 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 2000 to other electronic devices across USB and/or HDMI connections. It is to be understood that various aspects of input processing, for example, Reed-Solomon error correction, can be implemented, for example, within a separate input processing IC or within processor 2010 as necessary. Similarly, aspects of USB or HDMI interface processing can be implemented within separate interface ICs or within processor 2010 as necessary. The demodulated, error corrected, and demultiplexed stream is provided to various processing elements, including, for example, processor 2010, and encoder/decoder 2030 operating in combination with the memory and storage elements to process the datastream as necessary for presentation on an output device.

Various elements of system 2000 can be provided within an integrated housing, Within the integrated housing, the various elements can be interconnected and transmit data therebetween using suitable connection arrangement 2015, for example, an internal bus as known in the art, including the Inter-IC (12C) bus, wiring, and printed circuit boards. The system 2000 includes communication interface 2050 that enables communication with other devices via communication channel 2090. The communication interface 2050 can include, but is not limited to, a transceiver configured to transmit and to receive data over communication channel 2090. The communication interface 2050 can include, but is not limited to, a modem or network card and the communication channel 2090 can be implemented, for example, within a wired and/or a wireless medium.

Data is streamed, or otherwise provided, to the system 2000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 2090 and the communications interface 2050 which are adapted for Wi-Fi communications. The communications channel 2090 of these embodiments is typically connected to an access point or router that provides access to external networks including the Internet for allowing streaming applications and other over-the-top communications. Other embodiments provide streamed data to the system 2000 using a set-top box that delivers the data over the HDMI connection of the input block 2005. Still other embodiments provide streamed data to the system 2000 using the RF connection of the input block 2005. As indicated above, various embodiments provide data in a non-streaming manner. Additionally, various embodiments use wireless networks other than Wi-Fi, for example a cellular network or a Bluetooth network.

The system 2000 can provide an output signal to various output devices, including a display 2065, speakers 2075, and other peripheral devices 2085. The display 2065 of various embodiments includes one or more of, for example, a touchscreen display, an organic light-emitting diode (OLED) display, a curved display, and/or a foldable display. The display 2065 can be for a television, a tablet, a laptop, a cell phone (mobile phone), or other device. The display 2065 can also be integrated with other components (for example, as in a smart phone), or separate (for example, an external monitor for a laptop). The other peripheral devices 2085 include, in various examples of embodiments, one or more of a stand-alone digital video disc (or digital versatile disc) (DVR, for both terms), a disk player, a stereo system, and/or a lighting system. Various embodiments use one or more peripheral devices 2085 that provide a function based on the output of the system 2000. For example, a disk player performs the function of playing the output of the system 2000.

In various embodiments, control signals are communicated between the system 2000 and the display 2065, speakers 2075, or other peripheral devices 2085 using signaling such as AV.Link, Consumer Electronics Control (CEC), or other communications protocols that enable device-to-device control with or without user intervention. The output devices can be communicatively coupled to system 2000 via dedicated connections through respective interfaces 2065, 2075, and 2085. Alternatively, the output devices can be connected to system 2000 using the communications channel 2090 via the communications interface 2050. The display 2065 and speakers 2075 can be integrated in a single unit with the other components of system 2000 in an electronic device such as, for example, a television. In various embodiments, the display interface 2065 includes a display driver, such as, for example, a timing controller (T Con) chip.

The display 2065 and speaker 2075 can alternatively be separate from one or more of the other components, for example, if the RF portion of input 2005 is part of a separate set-top box. In various embodiments in which the display 2065 and speakers 2075 are external components, the output signal can be provided via dedicated output connections, including, for example, HDMI ports, USB ports, or COMP outputs.

The embodiments can be carried out by computer software implemented by the processor 2010 or by hardware, or by a combination of hardware and software. As a non-limiting example, the embodiments can be implemented by one or more integrated circuits. The memory 2020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 2010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, comprising intra predicting an image block using at least one neural network from a context comprising pixels surrounding said image block, wherein said intra predicting further comprises obtaining an information relative to at least a transform to apply to the image block, and wherein, for a decoder, obtaining such transform information comprises decoding an information signaled in the bitstream or inferring transforms using the at least one neural network for intra prediction or any combination of both features.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, intra predicting an image block using at least one neural network from a context comprising pixels surrounding said image block, wherein said intra predicting further comprises obtaining an information relative to at least a transform to apply to the image block, and wherein, for an encoder, obtaining such transform information comprises signaling an information in the bitstream or inferring transforms using the at least one neural network for intra prediction or any combination of both features.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, for example, mappingIntraTrGrp, trGrpIdx, nnFlag are descriptive terms. As such, they do not preclude the use of other syntax element names. When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters for transform. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments.

It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination, across various claim categories and types. Further, embodiments can include one or more of the following features, devices, or aspects, alone or in any combination, across various claim categories and types:

Adapting transform process to neural network intra prediction mode in the decoder and/or encoder.

Selecting a transform process to apply in the decoder and/or encoder with a neural network intra prediction.

Signaling an information relative to the transform process to apply in the decoder with a neural network intra prediction.

Deriving an information relative to a transform process to apply from a modified neural network intra prediction process, the deriving being applied in the decoder and/or encoder.

Inserting in the signaling syntax elements that enable the decoder to identify the transform process to use, such as transform indices.

Selecting, based on these syntax elements, the at least one transform to apply at the decoder.

Applying the modified neural network intra prediction mode for deriving the at least one transform at the decoder.

A bitstream or signal that includes one or more of the described syntax elements, or variations thereof.

A bitstream or signal that includes syntax conveying information generated according to any of the embodiments described.

Inserting in the signaling syntax elements that enable the decoder to apply inverse transform to coefficients in a manner corresponding to that used by an encoder.

Creating and/or transmitting and/or receiving and/or decoding a bitstream or signal that includes one or more of the described syntax elements, or variations thereof.

Creating and/or transmitting and/or receiving and/or decoding according to any of the embodiments described.

A method, process, apparatus, medium storing instructions, medium storing data, or signal according to any of the embodiments described.

A TV, set-top box, cell phone, tablet, or other electronic device that performs a transform process adapted to neural network intra prediction mode according to any of the embodiments described.

A TV, set-top box, cell phone, tablet, or other electronic device that performs a transform process adapted to neural network intra prediction mode according to any of the embodiments described, and that displays (e.g. using a monitor, screen, or other type of display) a resulting image.

A TV, set-top box, cell phone, tablet, or other electronic device that selects (e.g. using a tuner) a channel to receive a signal including an encoded image, and performs a transform process adapted to neural network intra prediction mode according to any of the embodiments described.

A TV, set-top box, cell phone, tablet, or other electronic device that receives (e.g. using an antenna) a signal over the air that includes an encoded image, and performs a transform process adapted to neural network intra prediction mode according to any of the embodiments described.

The invention claimed is:

1. A method comprising:

determining an intra prediction of an image block and a vector by applying at least one neural network to a context comprising pixels adjacent to the image block, wherein an ith element of the vector indicates a relative relevance that a respective group of transforms corresponding to an index i includes a transform that is applied to the image block and wherein the index i identifies the respective group of transforms from among a plurality of groups of transforms;

inferring an index corresponding to a higher relative relevance of the vector, wherein the index identifies a particular group of transforms from among a plurality of groups of transforms;

obtaining a block of residue for the image block by at least applying an inverse transform to transform coefficients of the image block, the inverse transform belonging to the particular group of transforms identified by the index; and decoding the image block based on the intra prediction and the block of residue.

2. The method of claim 1, further comprising:

decoding an explicit transform index, wherein the explicit transform index indicates a particular transform applied to the image block among the particular group of transforms.

3. The method of claim 1, wherein the at least one neural network comprises one or more input data among:

a Quantization Parameter used to decode some of the pixels that belongs to the context;

an index of an intra prediction mode used to predict the image block that is located at a top-right of the context if the image block at the top-right of the context is predicted in intra; and an index of an intra prediction mode used to predict an image block that is located at a bottom-left of the context if the image block at the bottom-left of the context is predicted in intra.

4. The method of claim 1, wherein obtaining a block of residue for the image block further comprises:

applying an inverse secondary transform to the transform coefficients; and applying an inverse primary transform after the inverse secondary transform to obtain the block of residue, wherein the inverse secondary transform belongs to the particular group of transforms identified by the index.

5. The method of claim 1, wherein obtaining a block of residue for the image block further comprises:

applying an inverse secondary Low Frequency Non-Separable Transform LFNST to the transform coefficients; and applying an inverse primary transform to the inverse secondary transform coefficients, wherein a group of transforms includes 2 LFNST matrices with a decision of transposing primary transform coefficients.

6. The method of claim 5, further comprising:

decoding an index of a Low Frequency Non-Separable Transform in the group of 2 LFNST matrices.

7. An apparatus comprising at least one processor configured to:

determine an intra prediction of an image block and a vector by applying at least one neural network to a context comprising pixels adjacent to the image block, wherein an ith element of the vector indicates a relative relevance that a respective group of transforms corresponding to an index i includes a transform that is applied to the image block and wherein the index i identifies the respective group of transforms from among a plurality of groups of transforms;

infer an index corresponding to a higher relative relevance of the vector, wherein the index identifies a particular group of transforms from among a plurality of groups of transforms;

obtain a block of residue for the image block by at least applying a particular inverse transform to transform coefficients of the image block, the particular inverse transform belonging to the particular group of transforms identified by the index; and decode the image block based on the intra prediction and the block of residue.

8. The apparatus of claim 7, the at least one processor further configured to:

decode an explicit transform index, wherein the explicit transform index indicates a particular transform applied to the image block among the particular group of transforms.

9. The apparatus of claim 7, wherein the at least one neural network comprises one or more input data among:

a Quantization Parameter used to decode some of the pixels that belongs to the context;

an index of an intra prediction mode used to predict the image block that is located at a top-right of the context if the image block at the top-right of the context is predicted in intra; and an index of an intra prediction mode used to predict an image block that is located at a bottom-left of the context if the image block at the bottom-left of the context is predicted in intra.

10. The apparatus of claim 7, the at least one processor further configured to:

apply an inverse secondary transform to the transform coefficients; and apply an inverse primary transform after the inverse secondary transform to obtain the block of residue, wherein the inverse secondary transform belongs to the particular group of transforms identified by the index.

11. The apparatus of claim 7, the at least one processor further configured to:

apply an inverse secondary Low Frequency Non-Separable Transform LFNST to the transform coefficients; and apply an inverse primary transform to the inverse secondary transform coefficients to obtain the block of residue, wherein the group of transforms includes 2 LFNST matrices with a decision of transposing primary transform coefficients.

12. The apparatus of claim 11, the at least one processor further configured to:

decode an index of a Low Frequency Non-Separable Transform in the group of 2 LFNST matrices.

13. A method comprising:

determining an intra prediction of an image block and a vector by applying at least one neural network to a context comprising pixels adjacent to the image block, wherein an ith element of the vector indicates a relative relevance that a respective group of transforms corresponding to an index i includes a transform that is applied to the image block and wherein the index i identifies the respective group of transforms from among a plurality of groups of transforms;

inferring an index corresponding to a higher relative relevance of the vector, wherein the index identifies a particular group of transforms from among a plurality of groups of transforms;

at least applying a particular transform to a block of residue for the image block to obtain transform coefficients of the image block, the particular transform belonging to the particular group of transforms identified by the index; and encoding the block of transform coefficients.

14. The method of claim 13, further comprising:
encoding an explicit transform index, wherein the explicit transform index indicates the particular transform applied to the image block among the particular group of transforms.

15. The method of claim 13, wherein the at least one neural network comprises one or more input data among:
a Quantization Parameter used to encode the image block that either partially or fully belongs to the context;
an index of an intra prediction mode used to predict the image block that is located at a top-right of the context if the image block at the top-right of the context is predicted in intra; and
an index of an intra prediction mode used to predict an image block that is located at a bottom-left of the context if the image block at the bottom-left of the context is predicted in intra.

16. The method of claim 13, wherein obtaining a block of transform coefficient for the image block further comprises:
applying a primary transform to the block of residue; and
applying a secondary transform after the primary transform to obtain to the block of transform coefficients, wherein the secondary transform belongs to the particular group of transforms identified by the index.

17. The method of claim 13, wherein obtaining a block of transform coefficient for the image block further comprises:
applying a primary transform to the block of residue; and
applying a secondary Low Frequency Non-Separable Transform LFNST to the block of primary transform coefficients, wherein a group of transforms includes 2 LFNST matrices with a decision of transposing primary transform coefficients.

18. The method of claim 17, further comprising:
encoding an index of a Low Frequency Non-Separable Transform in the group of 2 LFNST matrices.

19. An apparatus comprising at least one processor configured to:
determine an intra prediction of an image block and a vector by applying least one neural network applied to a context comprising pixels adjacent to the image block, wherein an ith element of the vector indicates a relative relevance that a respective group of transforms corresponding to an index i includes a transform that is applied to the image block and wherein the index i identifies the respective group of transforms from among a plurality of groups of transforms;
infer an index corresponding to a higher relative relevance of the vector, wherein the index identifies a particular group of transforms from among a plurality of groups of transforms;
at least apply a particular transform to a block of residue to obtain transform coefficients of the image block, the particular transform belonging to the particular group of transforms identified by the index; and
encode the block of transform coefficients.

20. The apparatus of claim 19, the at least one processor further configured to:
encode an explicit transform index, wherein the explicit transform index indicates the particular transform applied to the image block among the particular group of transforms.

21. The apparatus of claim 19, wherein the at least one neural network comprises one or more input data among:
a Quantization Parameter used to encode the image block that either partially or fully belongs to the context;
an index of an intra prediction mode used to predict the image block that is located at a top-right of the context if the image block at the top-right of the context is predicted in intra; and
an index of an intra prediction mode used to predict an image block that is located at a bottom-left of the context if the image block at the bottom-left of the context is predicted in intra.

22. The apparatus of claim 19, the at least one processor further configured to:
apply a primary transform to the block of residue; and
apply a secondary transform after the primary transform to obtain to the block of transform coefficients, wherein the secondary transform belongs to the particular group of transforms identified by the index.

23. The apparatus of claim 19, the at least one processor further configured to:
apply a primary transform to the block of residue; and
apply a secondary Low Frequency Non-Separable Transform LFNST to the block of primary transform coefficients, wherein the group of transforms includes 2 LFNST matrices with a decision of transposing primary transform coefficients.

24. The apparatus of claim 23, the at least one processor further configured to encode an index of a Low Frequency Non-Separable Transform in the group of 2 LFNST matrices.

* * * * *